(12) United States Patent
Grube

(10) Patent No.: US 12,335,406 B2
(45) Date of Patent: *Jun. 17, 2025

(54) VERIFYING AUTHENTICITY OF CONTENT TO PRODUCE KNOWLEDGE

(71) Applicant: entigenlogic LLC, Schaumburg, IL (US)

(72) Inventor: Gary W. Grube, Barrington Hills, IL (US)

(73) Assignee: entigenlogic LLC, Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/375,462

(22) Filed: Sep. 30, 2023

(65) Prior Publication Data
US 2024/0039735 A1   Feb. 1, 2024

Related U.S. Application Data

(63) Continuation of application No. 17/245,495, filed on Apr. 30, 2021, now Pat. No. 11,799,664, which is a continuation-in-part of application No. 16/360,701, filed on Mar. 21, 2019, now Pat. No. 10,997,368.

(60) Provisional application No. 62/648,354, filed on Mar. 26, 2018.

(51) Int. Cl.
*H04L 9/32* (2006.01)
*H04L 9/00* (2022.01)
*H04L 9/06* (2006.01)
*H04L 9/08* (2006.01)

(52) U.S. Cl.
CPC .......... *H04L 9/3247* (2013.01); *H04L 9/0643* (2013.01); *H04L 9/0833* (2013.01); *H04L 9/3242* (2013.01); *H04L 9/50* (2022.05); *H04L 2209/56* (2013.01)

(58) Field of Classification Search
None
See application file for complete search history.

(56) References Cited

U.S. PATENT DOCUMENTS

| 6,175,834 B1 | 1/2001 | Cai |
| 9,645,999 B1 | 5/2017 | Ciulla |
| 10,997,368 B2 * | 5/2021 | Williams .............. G06F 40/284 |

(Continued)

FOREIGN PATENT DOCUMENTS

JP    2004287710 A   *   3/2003

*Primary Examiner* — Taghi T Arani
*Assistant Examiner* — Joshua Raymond White
(74) *Attorney, Agent, or Firm* — Gary W. Grube

(57) ABSTRACT

A method includes a computing device verifying authenticity of a blockchain-encoded record representing a statement of words and an entigen group to produce an authenticity indicator where a set of identigens is determined utilizing a knowledge database for each word to produce sets of identigens and where the sets of identigens is interpreted to produce the entigen group. When the authenticity indicator indicates an authentic status, the method further includes interpreting, based on an updated knowledge database, updated sets of identigens to produce an updated entigen group. The method further includes updating the blockchain-encoded record to represent the statement and the updated entigen group to facilitate subsequent utilization of an updated validated interpretation of the statement as the updated entigen group.

18 Claims, 63 Drawing Sheets

(56) References Cited

U.S. PATENT DOCUMENTS

| | | | |
|---|---|---|---|
| 11,799,664 B2* | 10/2023 | Grube | G06F 40/247 |
| 2003/0097251 A1 | 5/2003 | Yamada | |
| 2005/0080780 A1* | 4/2005 | Colledge | G06F 40/247 |
| 2008/0208569 A1 | 8/2008 | Simpson | |
| 2011/0238408 A1 | 9/2011 | Larcheveque | |
| 2013/0117024 A1 | 5/2013 | Glass | |
| 2014/0015855 A1 | 1/2014 | Denney | |
| 2014/0052716 A1* | 2/2014 | Chakra | G06F 16/951 |
| | | | 707/723 |
| 2016/0012818 A1* | 1/2016 | Faizakof | G10L 15/063 |
| | | | 704/245 |
| 2016/0019885 A1 | 1/2016 | Romano | |
| 2016/0147979 A1 | 5/2016 | Kato | |
| 2018/0060305 A1 | 3/2018 | Deleris | |
| 2018/0081871 A1 | 3/2018 | Williams | |
| 2018/0341631 A1* | 11/2018 | Verma | G06F 40/30 |
| 2019/0043533 A1 | 2/2019 | Srinivasan | |
| 2019/0205322 A1 | 7/2019 | Dobrynin | |
| 2019/0205325 A1 | 7/2019 | Dobrynin | |
| 2020/0257975 A1 | 8/2020 | Chang | |

\* cited by examiner synonym words table 570

| textual words 572 | identigen 518 | | entigens 520 |
|---|---|---|---|
| | meaning ID 538 | instance ID 540 | |
| car | 50 | 001 | e1000 |
| automobile | | 002 | |
| auto | | 003 | |
| bil (Swedish) | | 004 | |
| carro (Spanish) | | 005 | |
| bil (Danish) | | 006 | |

FIG. 7C polysemous words table 576

| textual words 572 | identigen 518 | | entigens 520 |
|---|---|---|---|
| | meaning ID 538 | instance ID 540 | |
| duck (bird) | 116937 | 001 | e2000 |
| duck (fabric) | 116938 | 001 | e2001 |
| duck (to submerge) | 112195 | 056 | e2002 |
| duck (to elude) | 010654 | 051 | e2003 |

FIG. 7D words table 580

| textual words 572 | identigen (IDN) 518 | | | entigens (ENI) 520 |
|---|---|---|---|---|
| | meaning ID 538 | instance ID 540 | type ID 542 | |
| pilot (flyer) | 150 | 001 | itenym (item) | e717 |
| pilot (to fly) | 291 | 001 | actenym (action) | e4320 |
| Tom (person) | 457 | 001 | itenym (item) | e61 |
| Tom (male animal) | 648 | 001 | itenym (item) | e930 |
| tall (attribute - height) | 823 | 001 | attrenym (attribute) | e90 |
| tall (attribute - unlikely) | 399 | 001 | attrenym (attribute) | e729 |

⇒ apply rules to identigens of word strings to validate

| pilot (to fly) | Tom (male an) | IDN 291.001 | IDN 648.001 | ✗ |
| pilot (flyer) | Tom (male an) | IDN 150.001 | IDN 648.001 | ✗ |
| pilot (to fly) | Tom (person) | IDN 291.001 | IDN 457.001 | ✗ |
| pilot (flyer) | Tom (person) | IDN 150.001 | IDN 457.001 | ✓ |

| tall (attribute - height) | Tom (male an) | IDN 823.001 | IDN 648.001 | ✓ |
| tall (attribute - unlikely) | Tom (male an) | IDN 399.001 | IDN 648.001 | ✗ |
| tall (attribute - height) | Tom (person) | IDN 823.001 | IDN 457.001 | ✓ |
| tall (attribute - unlikely) | Tom (person) | IDN 399.001 | IDN 457.001 | ✗ |

⇒ list valid groupings groupings table 584

| grouping ID 586 | word strings 588 | identigens (IDN) 518 | | | entigens (ENI) 520 | | |
|---|---|---|---|---|---|---|---|
| 3001 | pilot Tom | IDN 150.001 | IDN 457.001 | | e717 | e61 | |
| 3040 | tall Tom | IDN 823.001 | IDN 648.001 | | e90 | e930 | |
| 3041 | tall Tom | IDN 823.001 | IDN 457.001 | | e90 | e61 | |
| 3070 | tall pilot Tom | IDN 823.001 | IDN 150.001 | IDN 457.001 | e90 | e717 | e61 |

FIG. 7E groupings table 620

| grouping (GRP) ID 586 | word strings 588 | IF string 622 | | THEN string 624 | |
|---|---|---|---|---|---|
| | | IDN string 626 | ENI 628 | IDN string 626 | ENI 628 |
| 5493 | If someone has a tumor, then someone is sick. | someone has | 12aa | someone sick | 12js |
| | | tumor has | 06aa | | |
| 5494 | If someone is sick, then someone is possibly sad. | someone sick | 12js | someone sad | 12ja | new knowledge inference 630

| 5495 | If someone has a tumor, then someone is possibly sad. | someone has | 12aa | someone sad | 12ja |
|---|---|---|---|---|---|
| | | tumor has | 06aa | possibly sad | 05b |

FIG. 8B

VERIFYING AUTHENTICITY OF CONTENT TO PRODUCE KNOWLEDGE

CROSS REFERENCE TO RELATED PATENTS

The present U.S. Utility Patent Application claims priority pursuant to 35 U.S.C. § 120 as a continuation of U.S. Utility application Ser. No. 17/245,495, entitled "VERIFYING AUTHENTICITY OF CONTENT TO PRODUCE KNOWLEDGE" filed Apr. 30, 2021, allowed, which claims priority pursuant to 35 U.S.C. § 120 as a continuation in part of U.S. Utility application Ser. No. 16/360,701, entitled "RESOLVING AMBIGUITY IN A STATEMENT" filed Mar. 21, 2019, issued May 4, 2021 as U.S. Pat. No. 10,997,368, which claims priority pursuant to 35 U.S.C. § 119(e) to U.S. Provisional Application No. 62/648,354, entitled "VERIFYING CONTENT AUTHENTICITY WHEN EXTRACTING KNOWLEDGE," filed Mar. 26, 2018, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to generating data representations of data and analyzing the data utilizing the data representations.

Description of Related Art

It is known that data is stored in information systems, such as files containing text. It is often difficult to produce useful information from this stored data due to many factors. The factors include the volume of available data, accuracy of the data, and variances in how text is interpreted to express knowledge. For example, many languages and regional dialects utilize the same or similar words to represent different concepts.

Computers are known to utilize pattern recognition techniques and apply statistical reasoning to process text to express an interpretation in an attempt to overcome ambiguities inherent in words. One pattern recognition technique includes matching a word pattern of a query to a word pattern of the stored data to find an explicit textual answer. Another pattern recognition technique classifies words into major grammatical types such as functional words, nouns, adjectives, verbs and adverbs. Grammar based techniques then utilize these grammatical types to study how words should be distributed within a string of words to form a properly constructed grammatical sentence where each word is forced to support a grammatical operation without necessarily identifying what the word is actually trying to describe.

BRIEF DESCRIPTION OF THE SEVERAL VIEWS OF THE DRAWING(S)

FIG. 7C is a diagram of an embodiment of a synonym words table within a computing system in accordance with the present invention;

FIG. 7D is a diagram of an embodiment of a polysemous words table within a computing system in accordance with the present invention;

FIG. 7E is a diagram of an embodiment of transforming words into groupings within a computing system in accordance with the present invention;

FIG. 8B is a diagram of an embodiment of a groupings table within a computing system in accordance with the present invention;

Figure 9A:
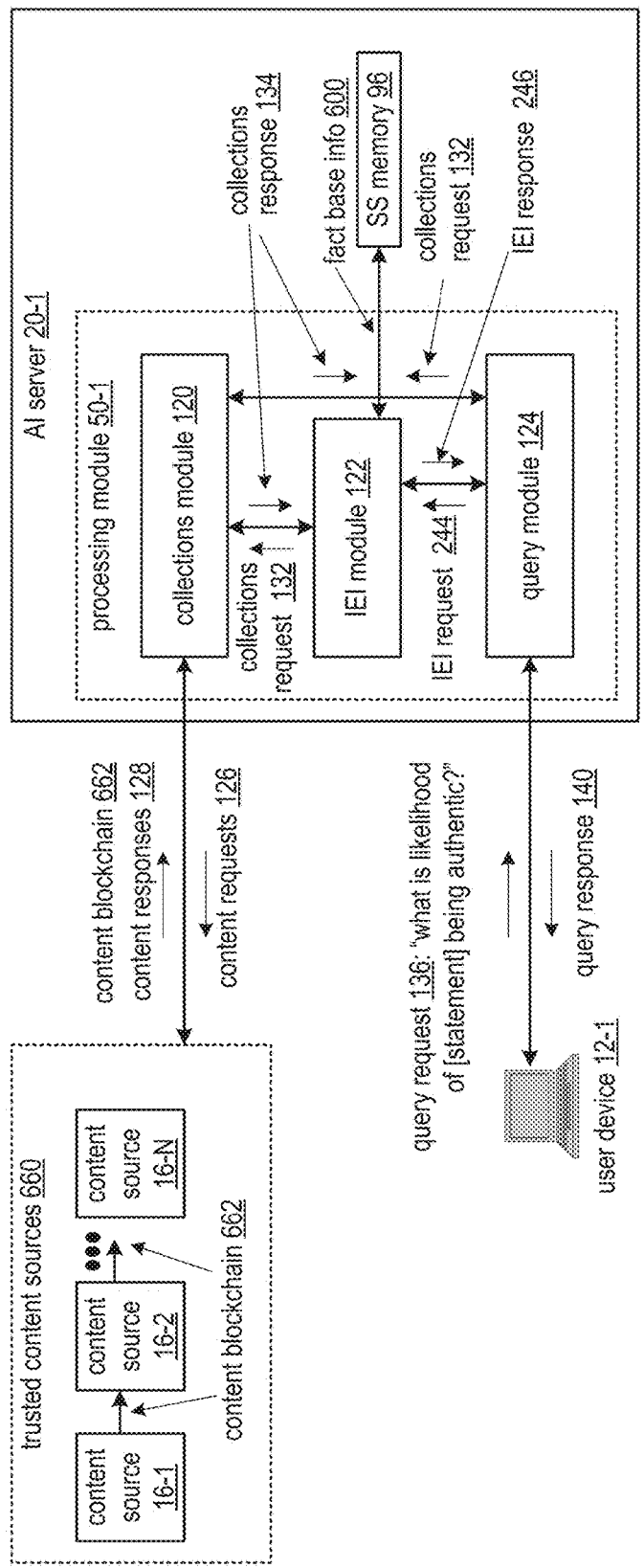
FIG. 9A is a schematic block diagram of another embodiment of a computing system in accordance with the present invention.
Figure 9B:
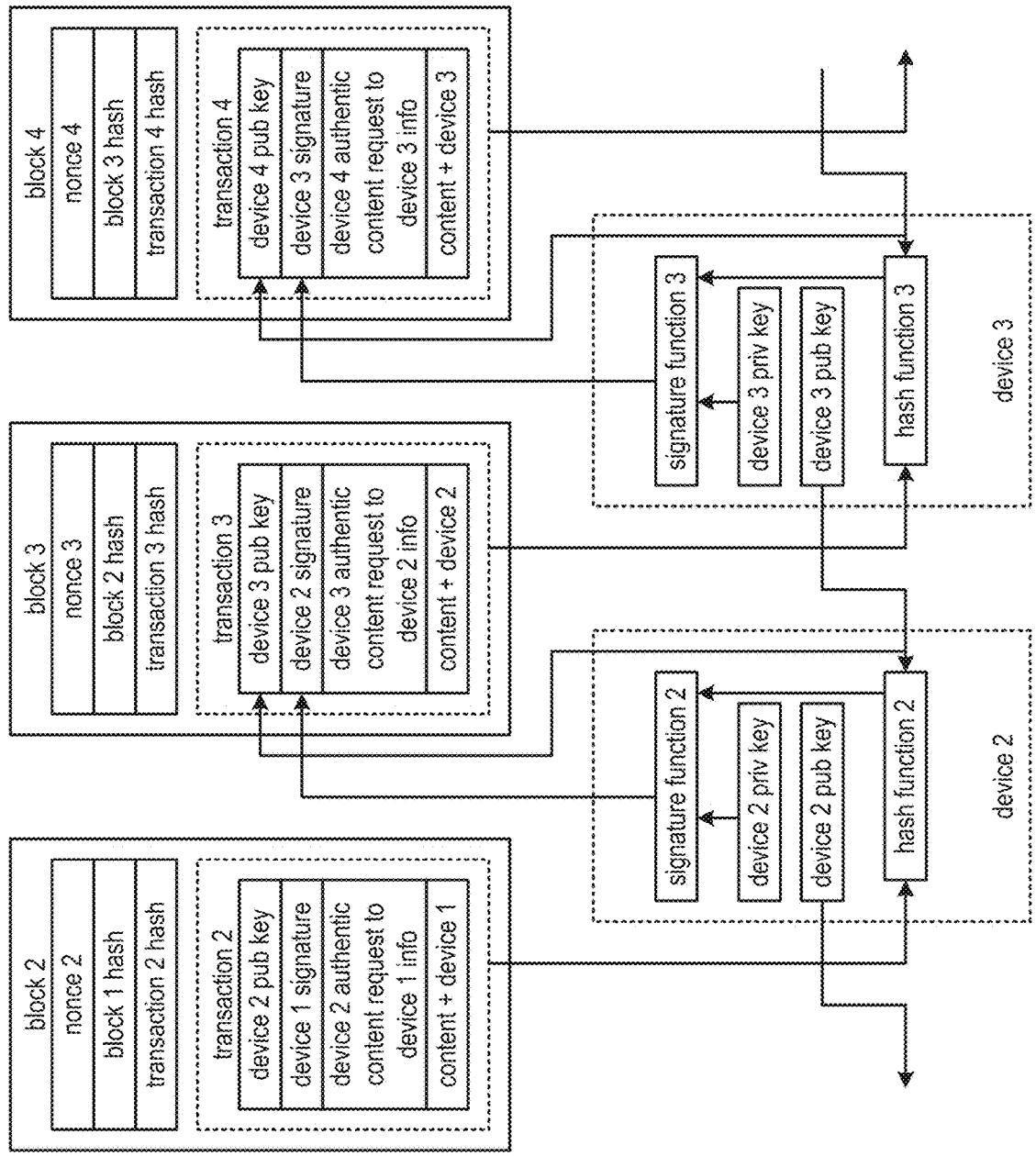
FIG. 9B is a schematic block diagram of an embodiment of a content blockchain in accordance with the present invention.
Figure 9C:
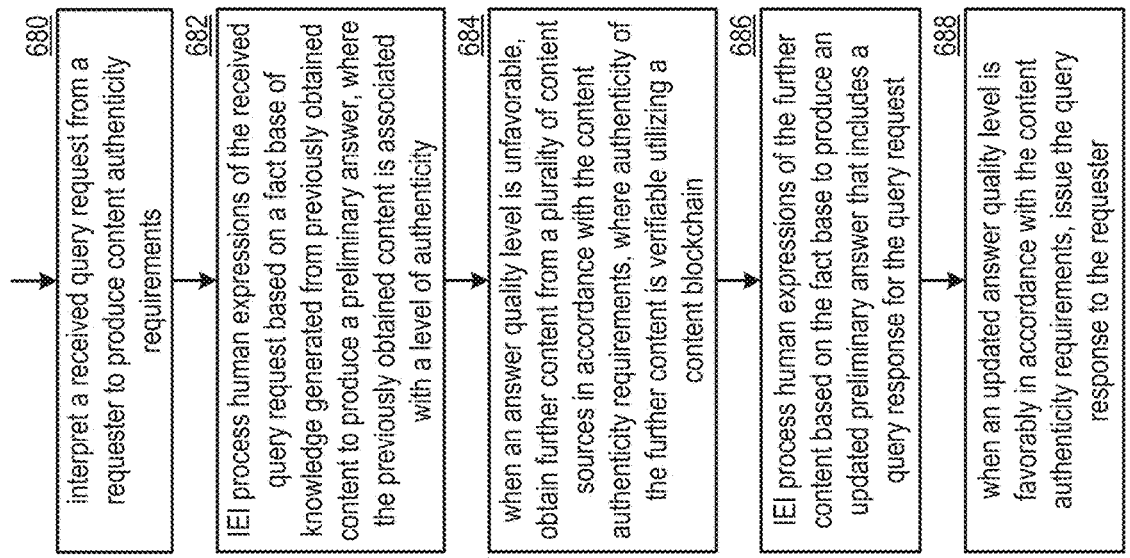
FIG. 9C is a logic diagram of an embodiment of a method for verifying authenticity of content that is utilized to create knowledge within a computing system in accordance with the present invention.
Figure 9D:
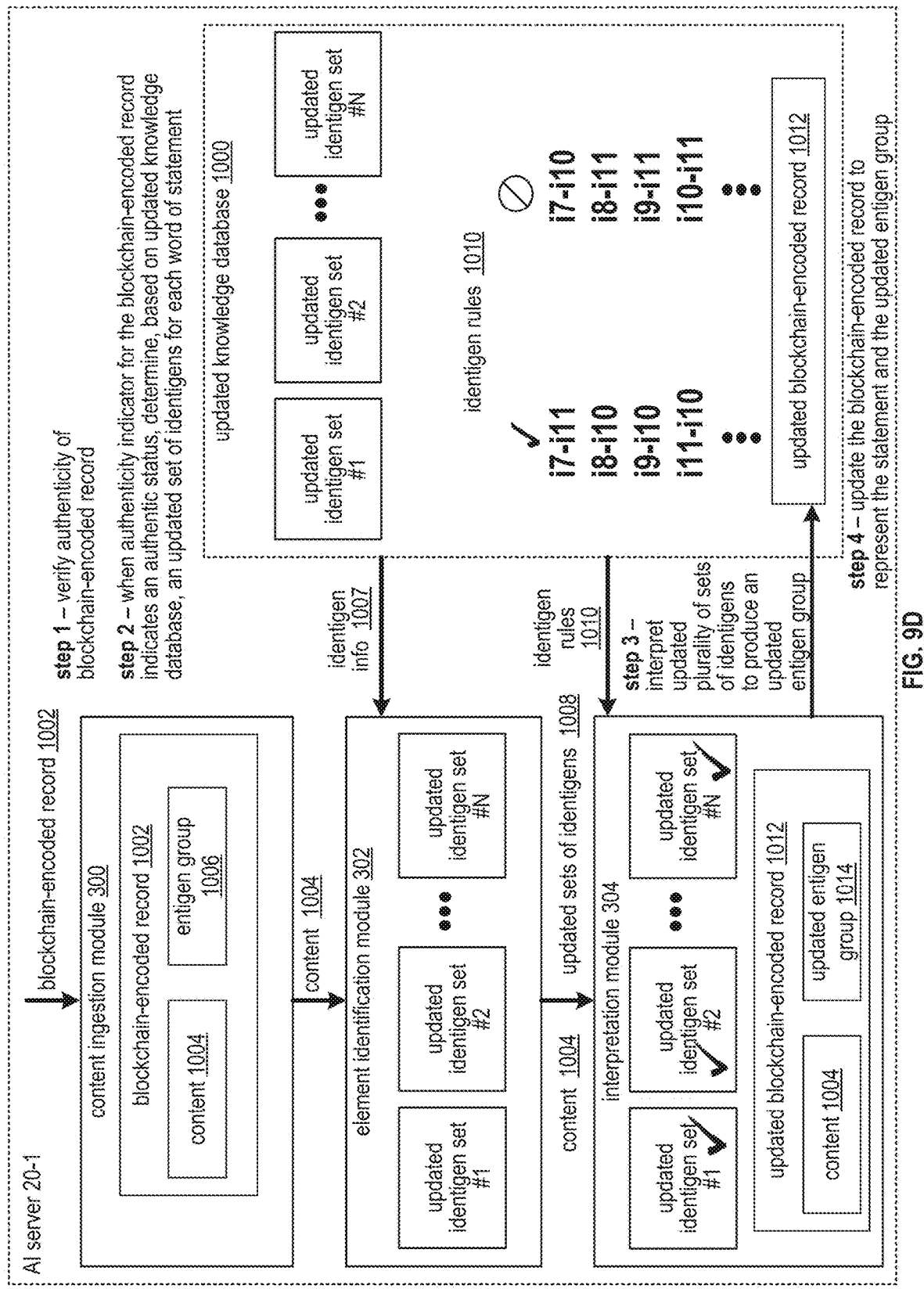
Figure 9E:
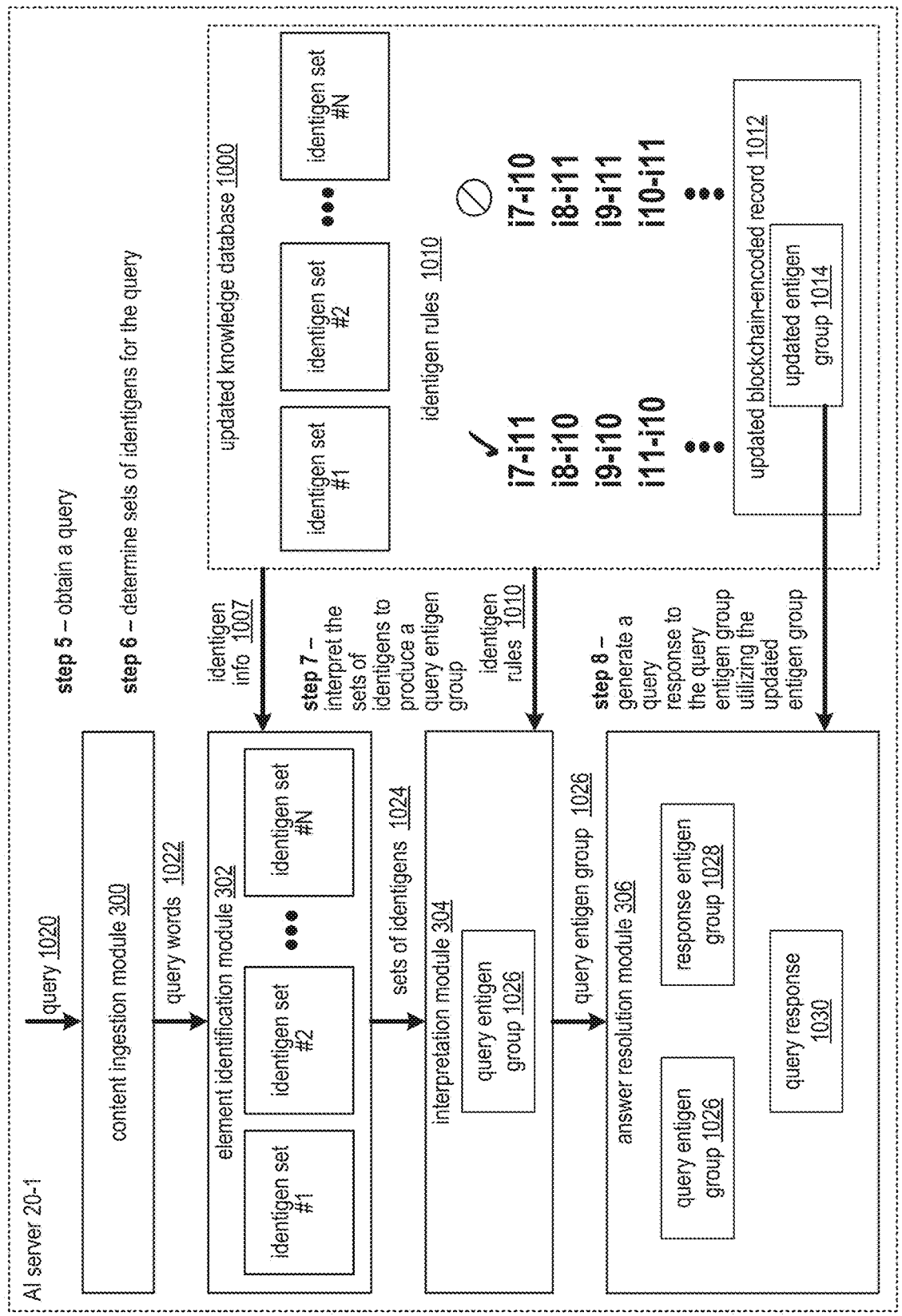
Figure 9F:
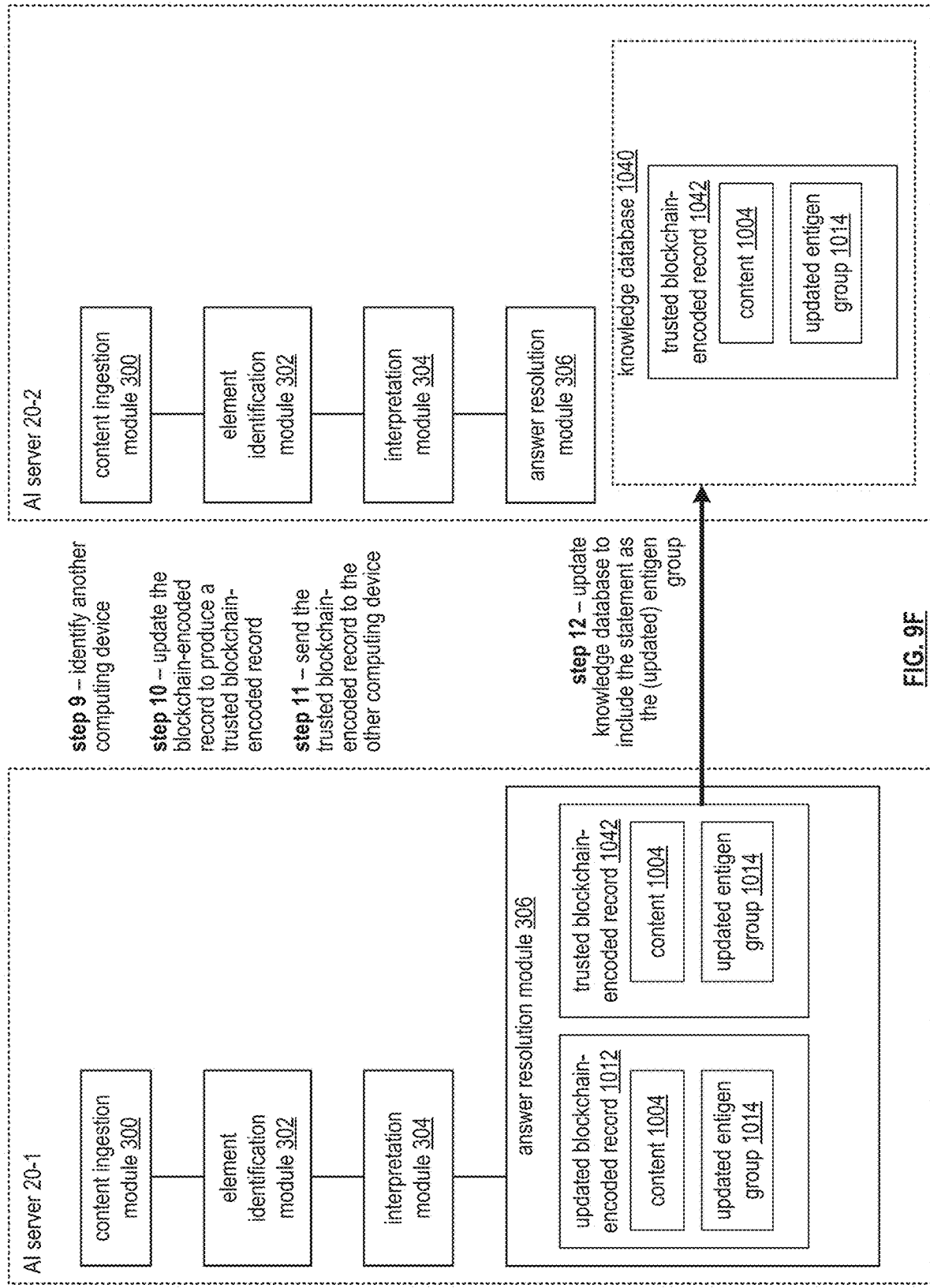
Figure 10A:
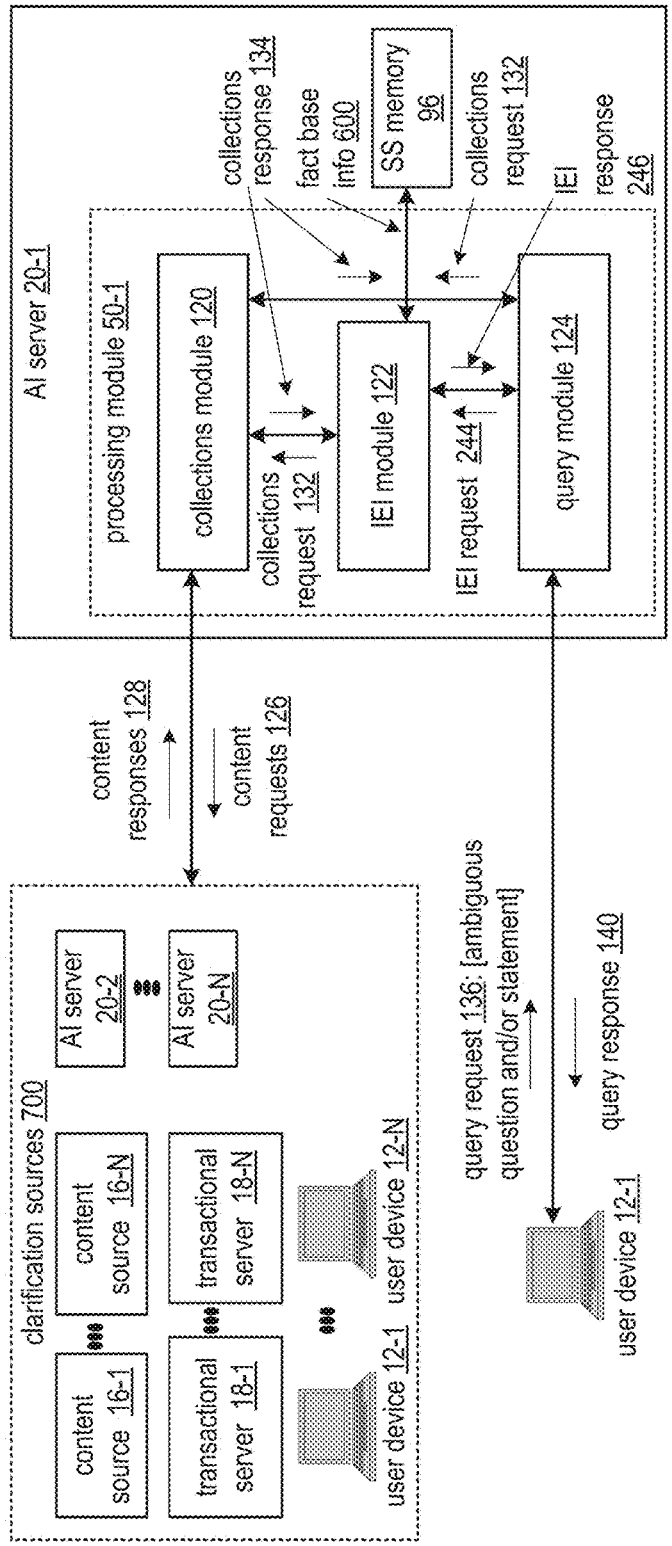
Figure 10B:
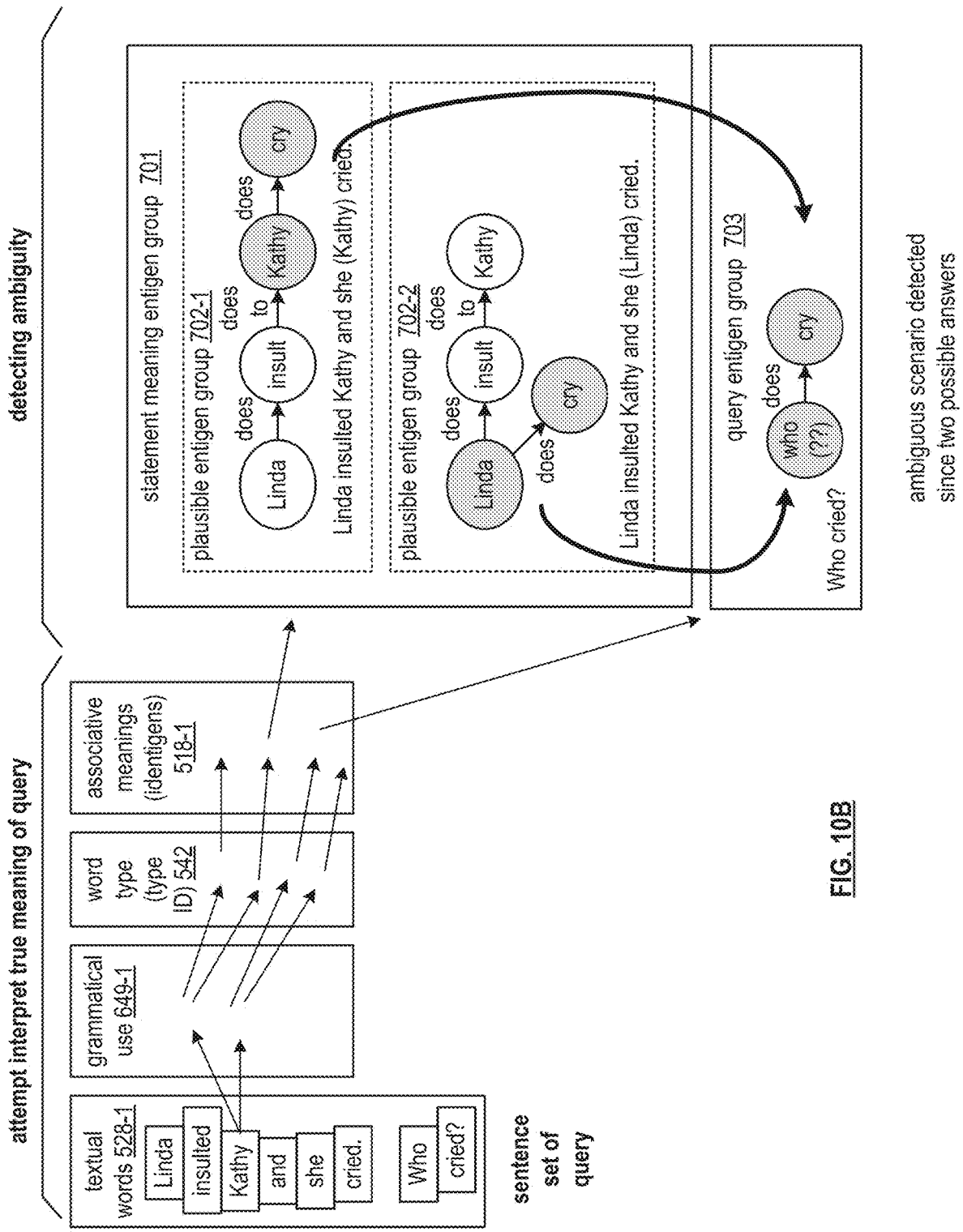
Figure 10C:
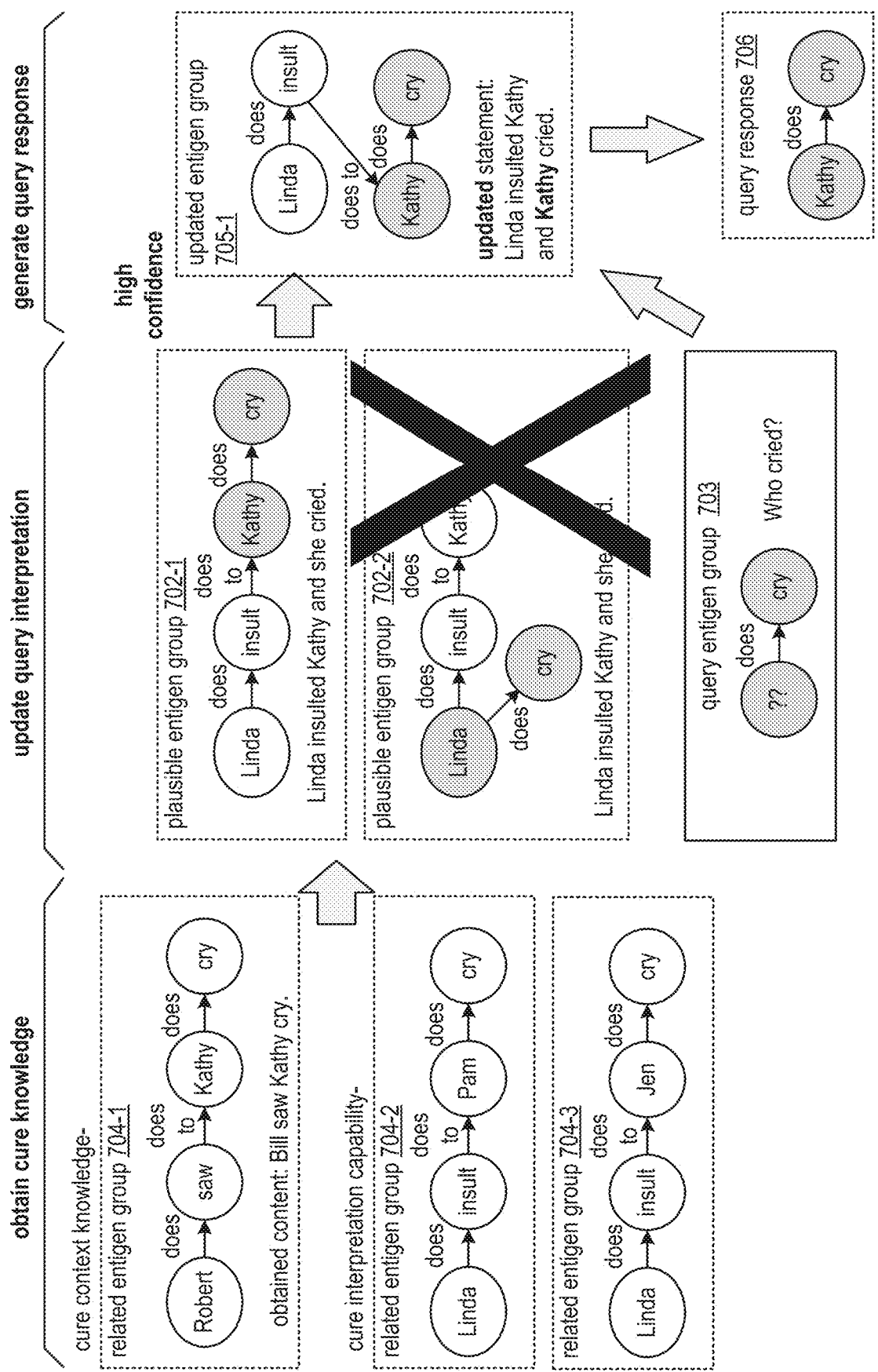
Figure 10D:
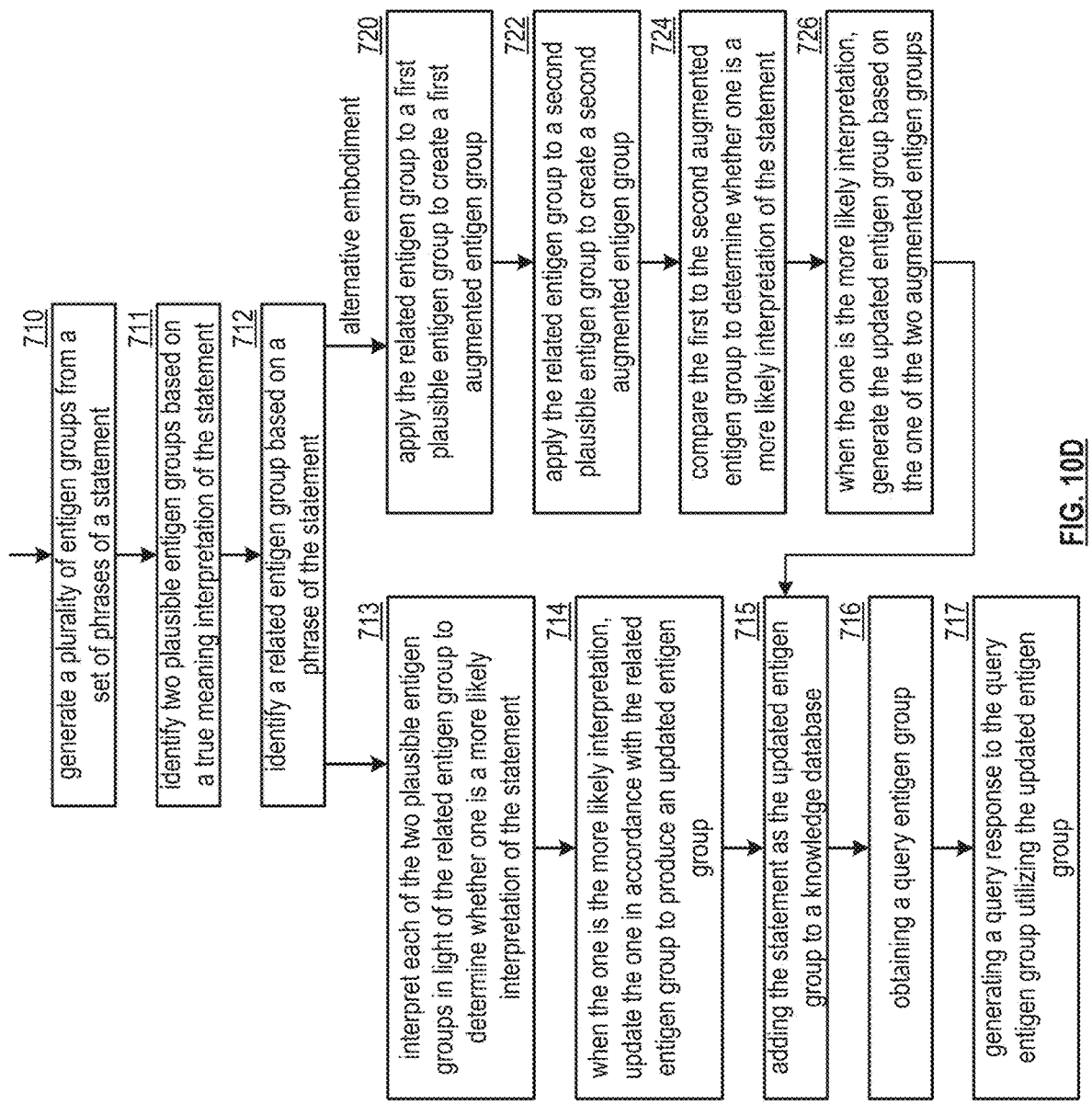
Figure 11A:
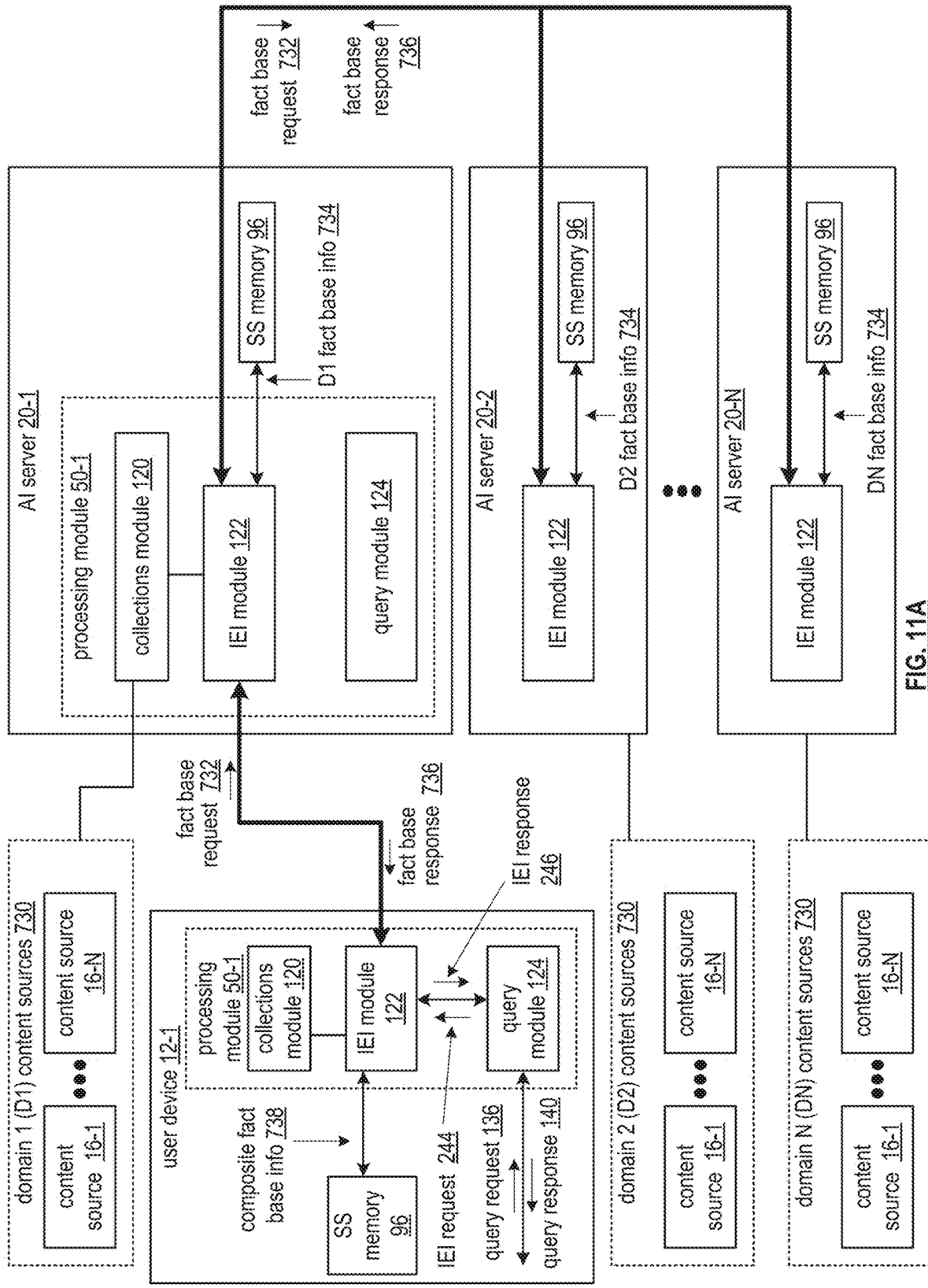
Figure 11B:
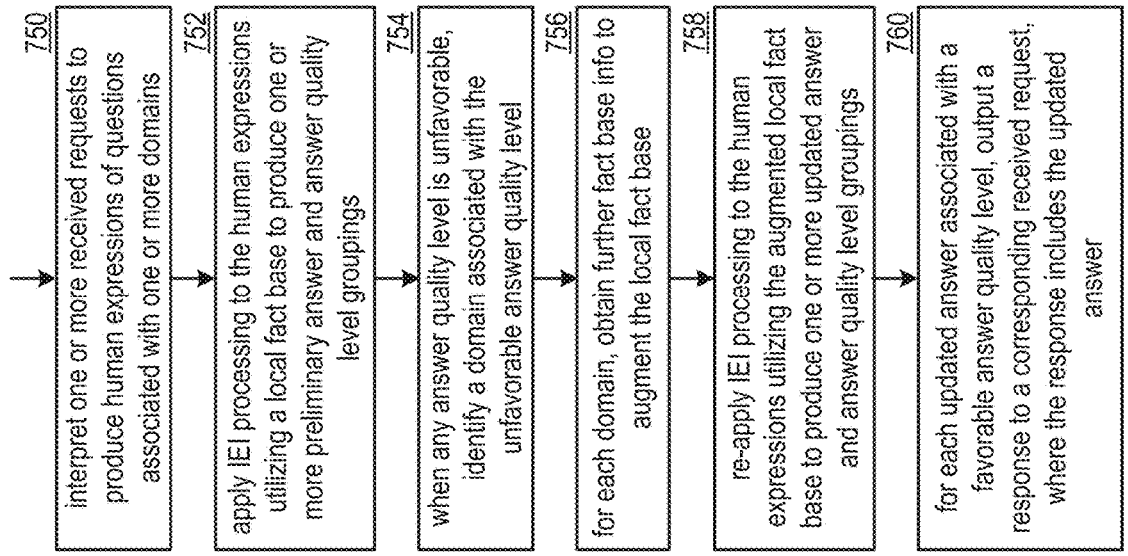
Figure 12A:
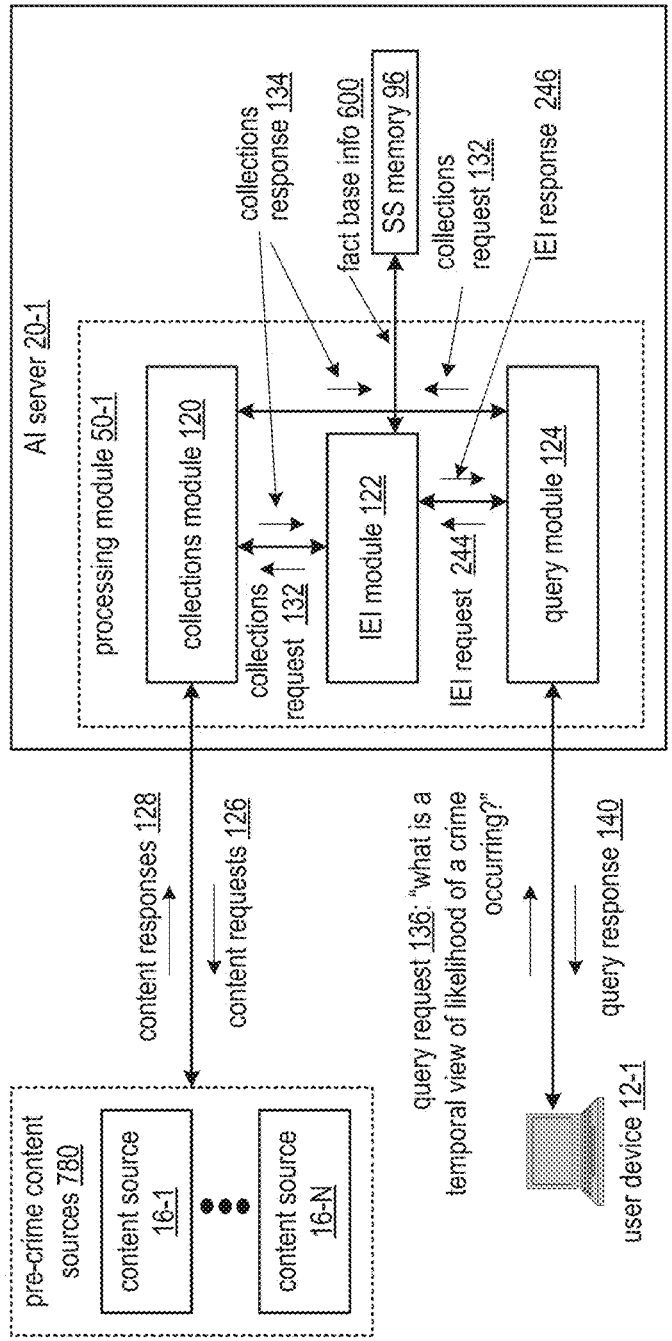
Figure 12B:
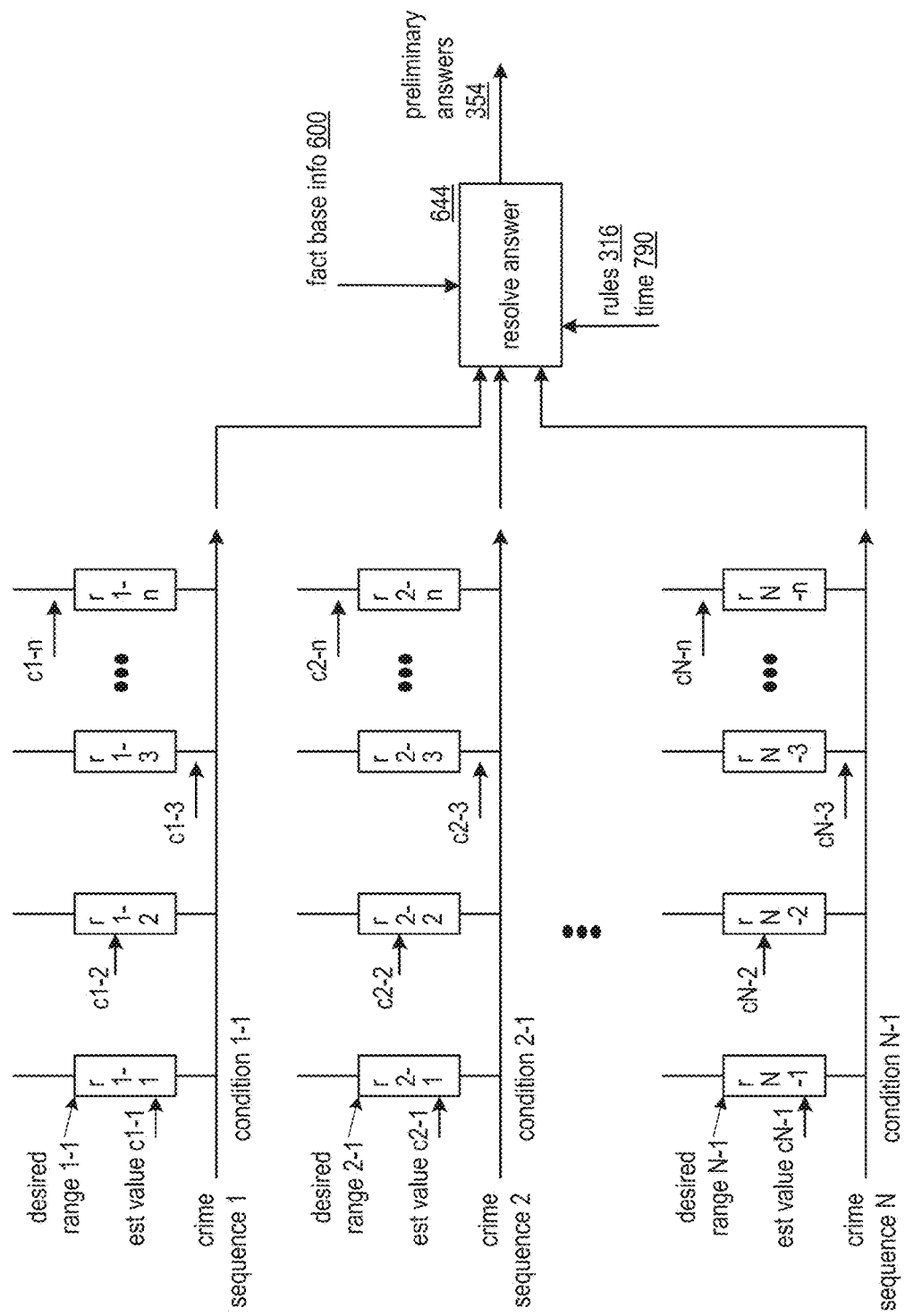
Figure 12C:
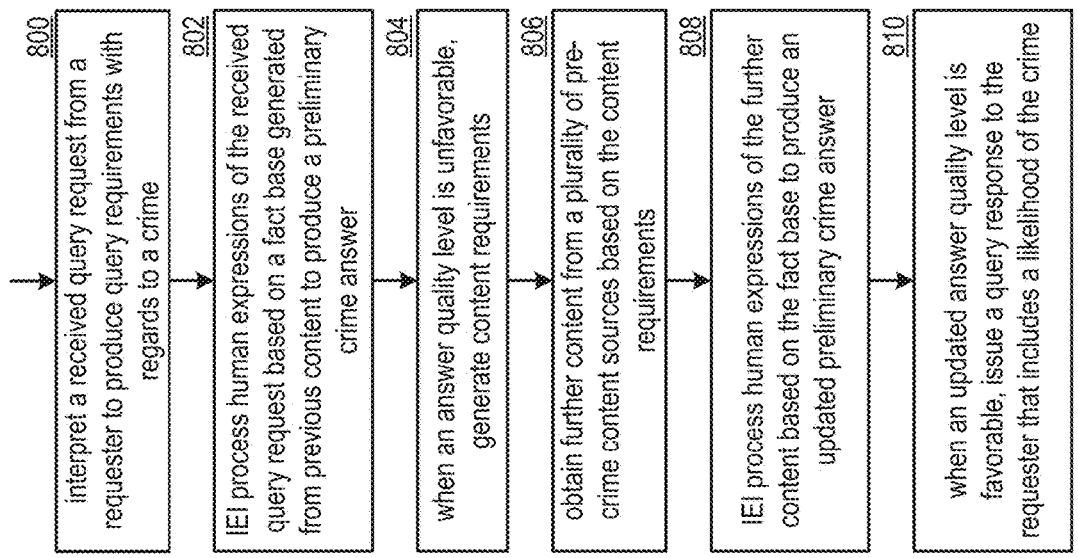
Figure 13A:
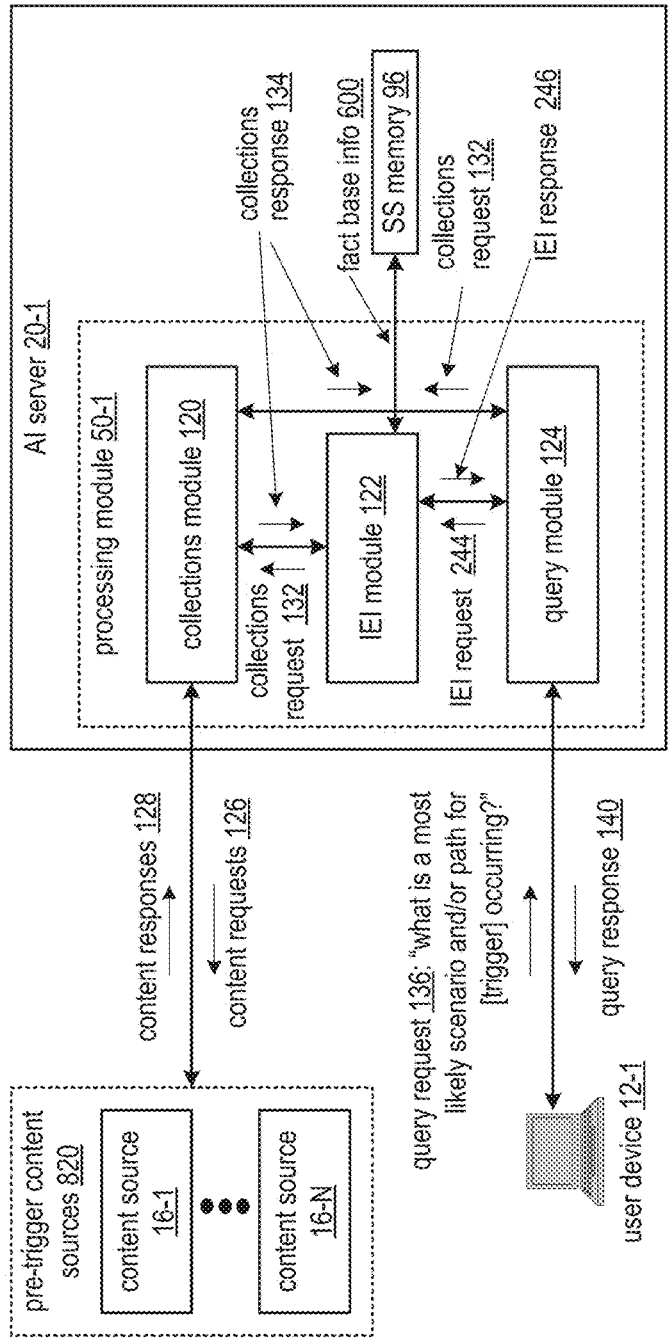
Figure 13B:
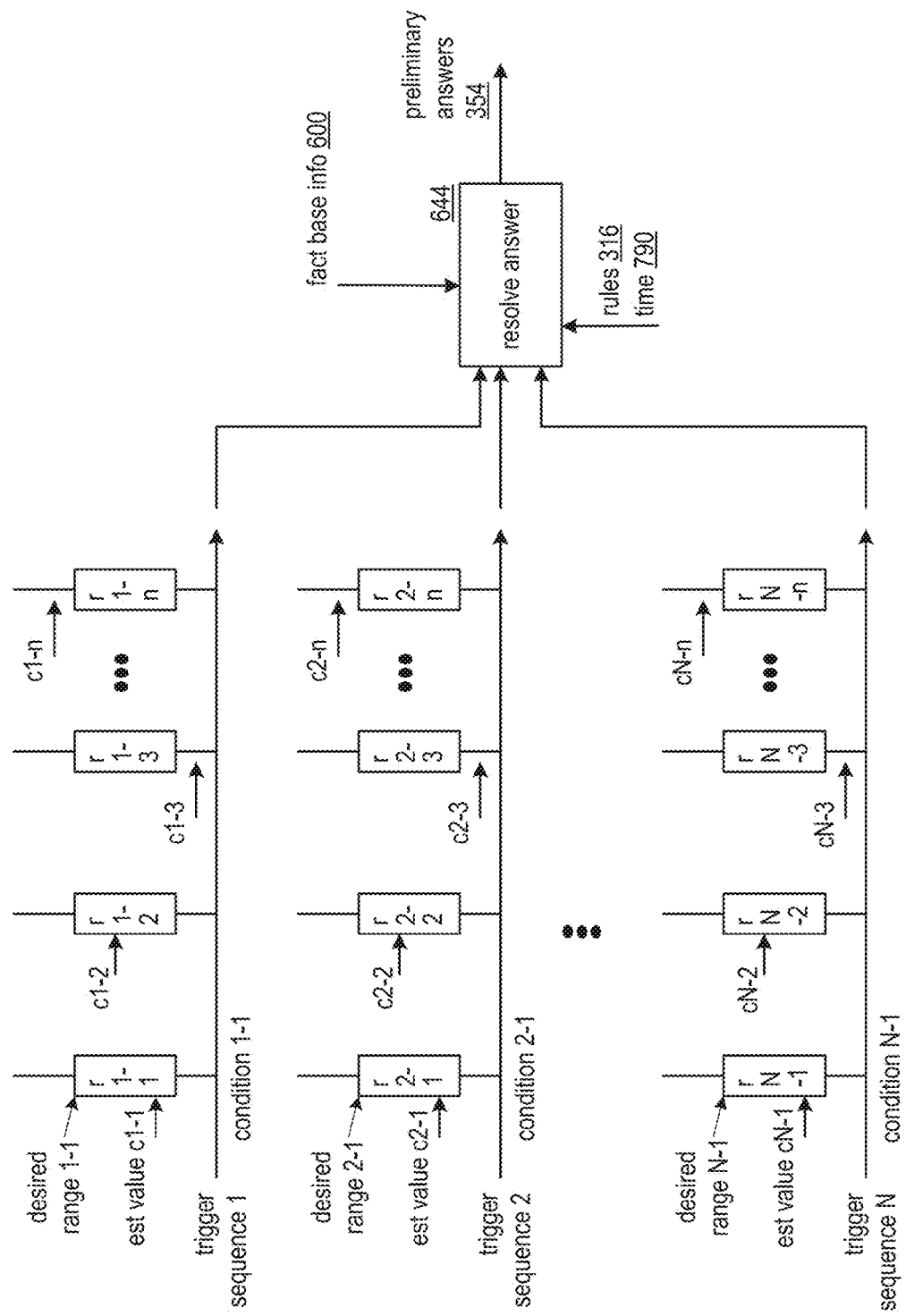
Figure 13C:
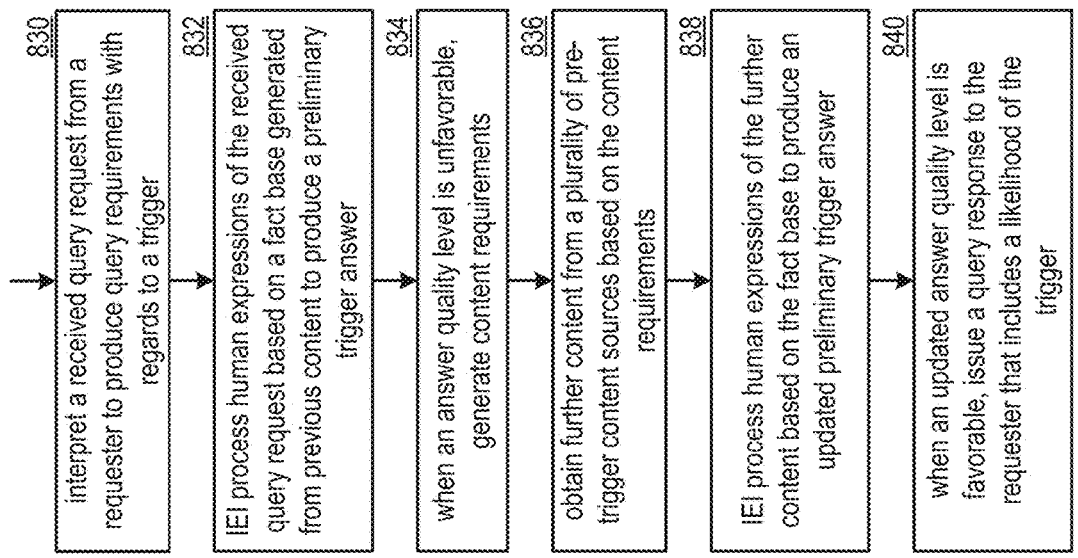
Figure 14A:
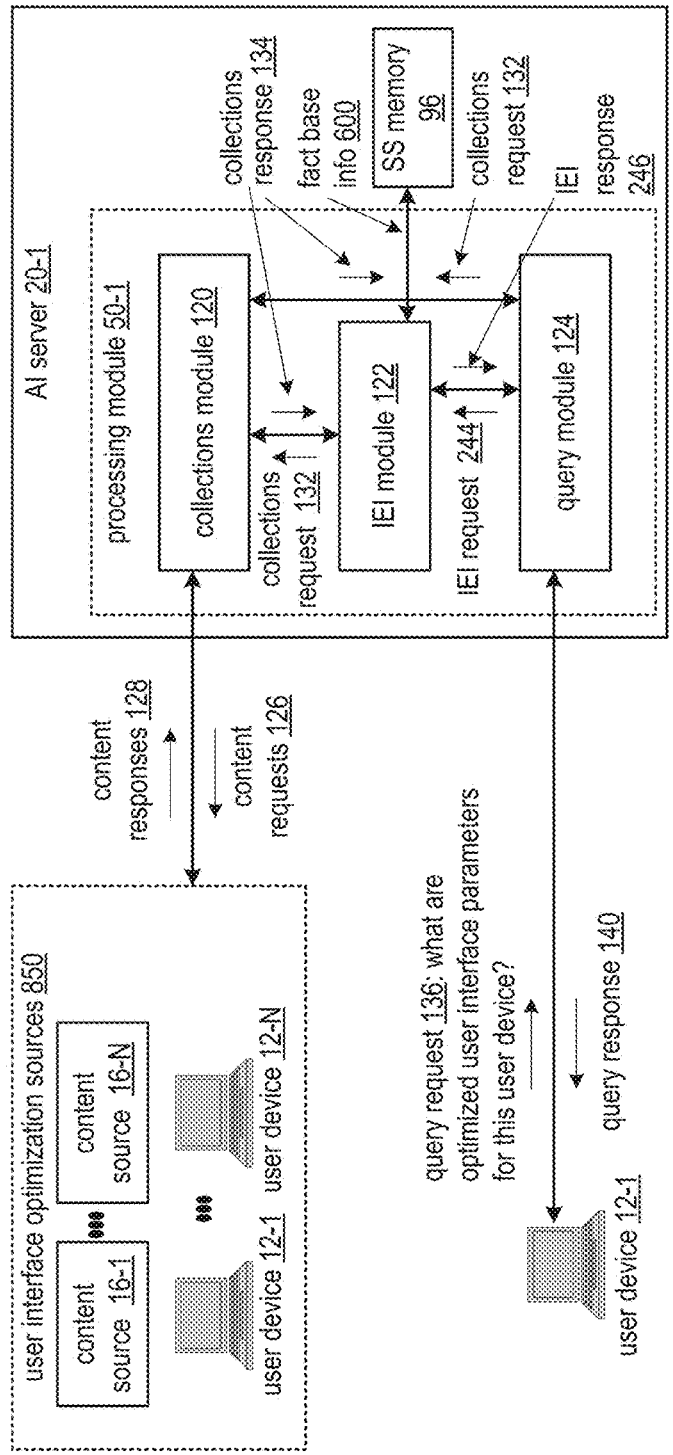
Figure 14B:
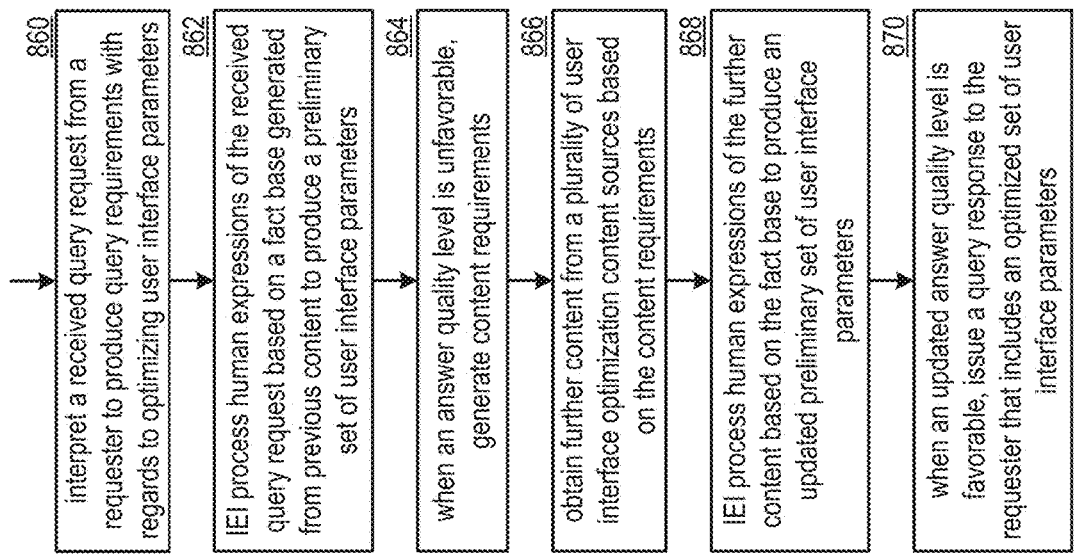
Figure 15A:
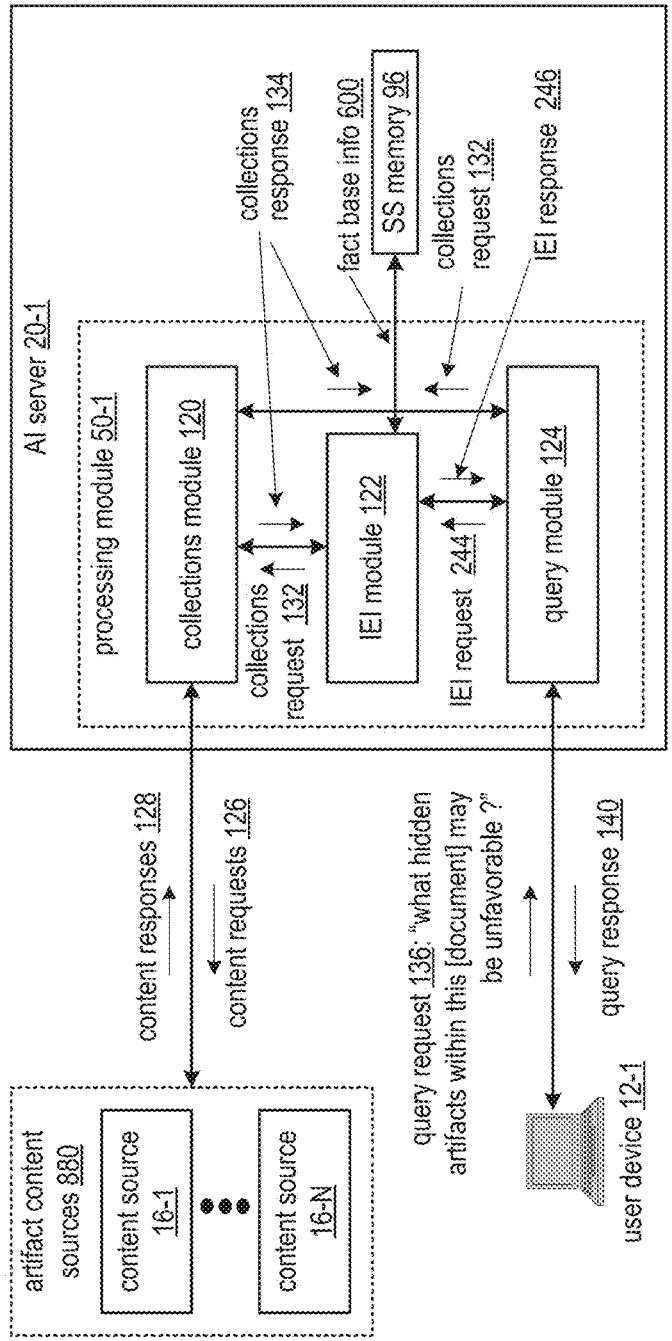
Figure 15B:
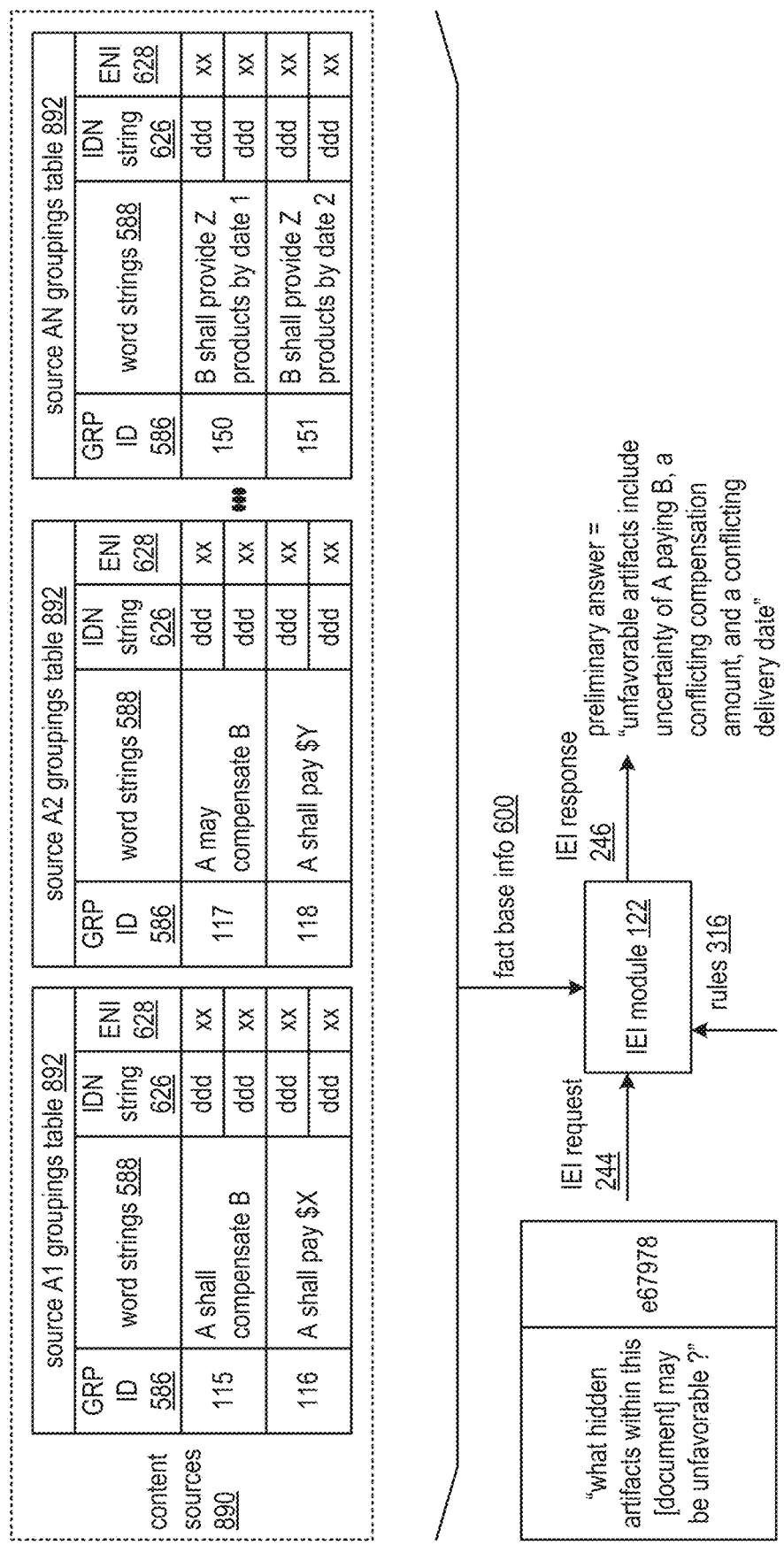
Figure 15C:
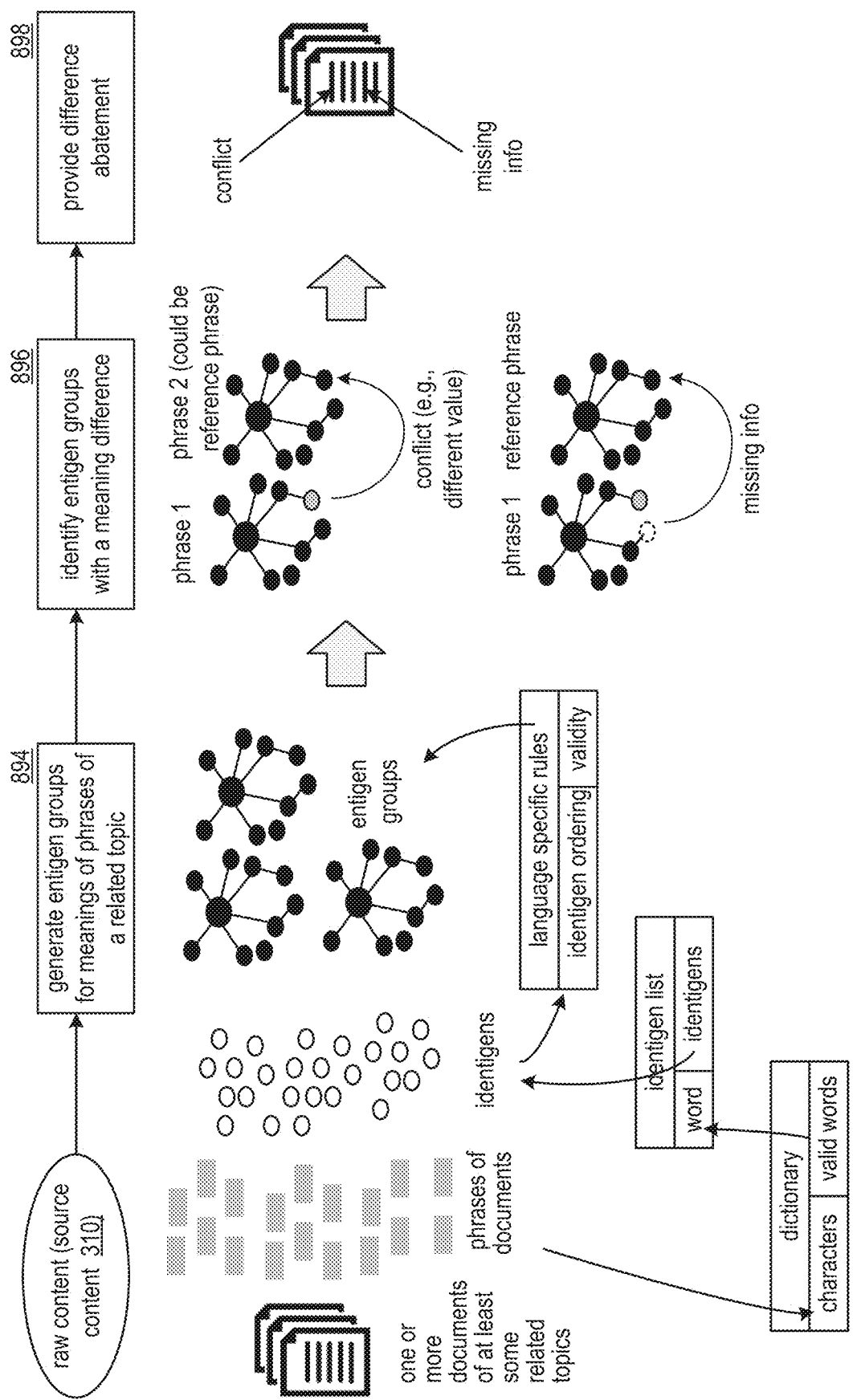
Figure 15D:
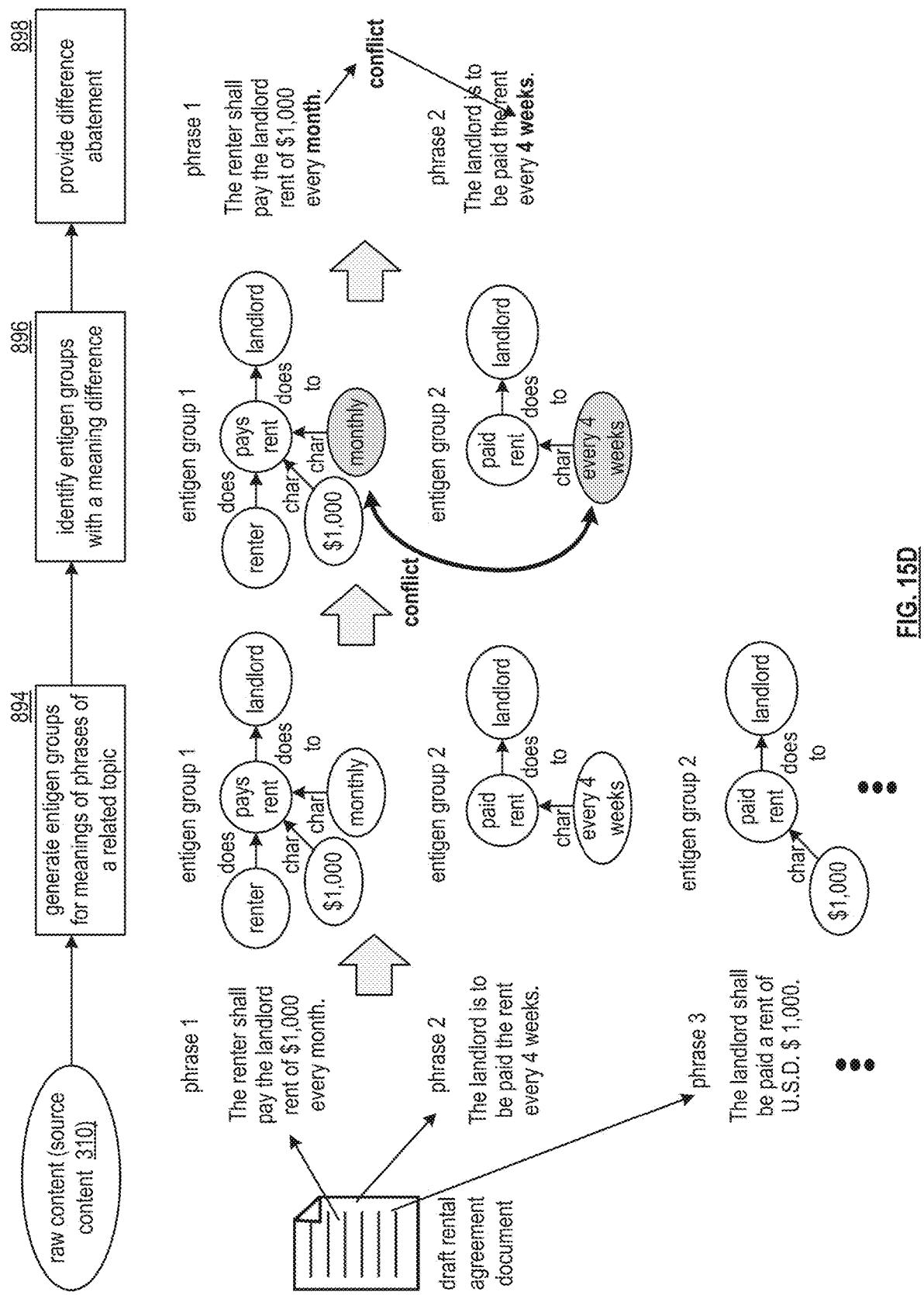
Figure 15E:
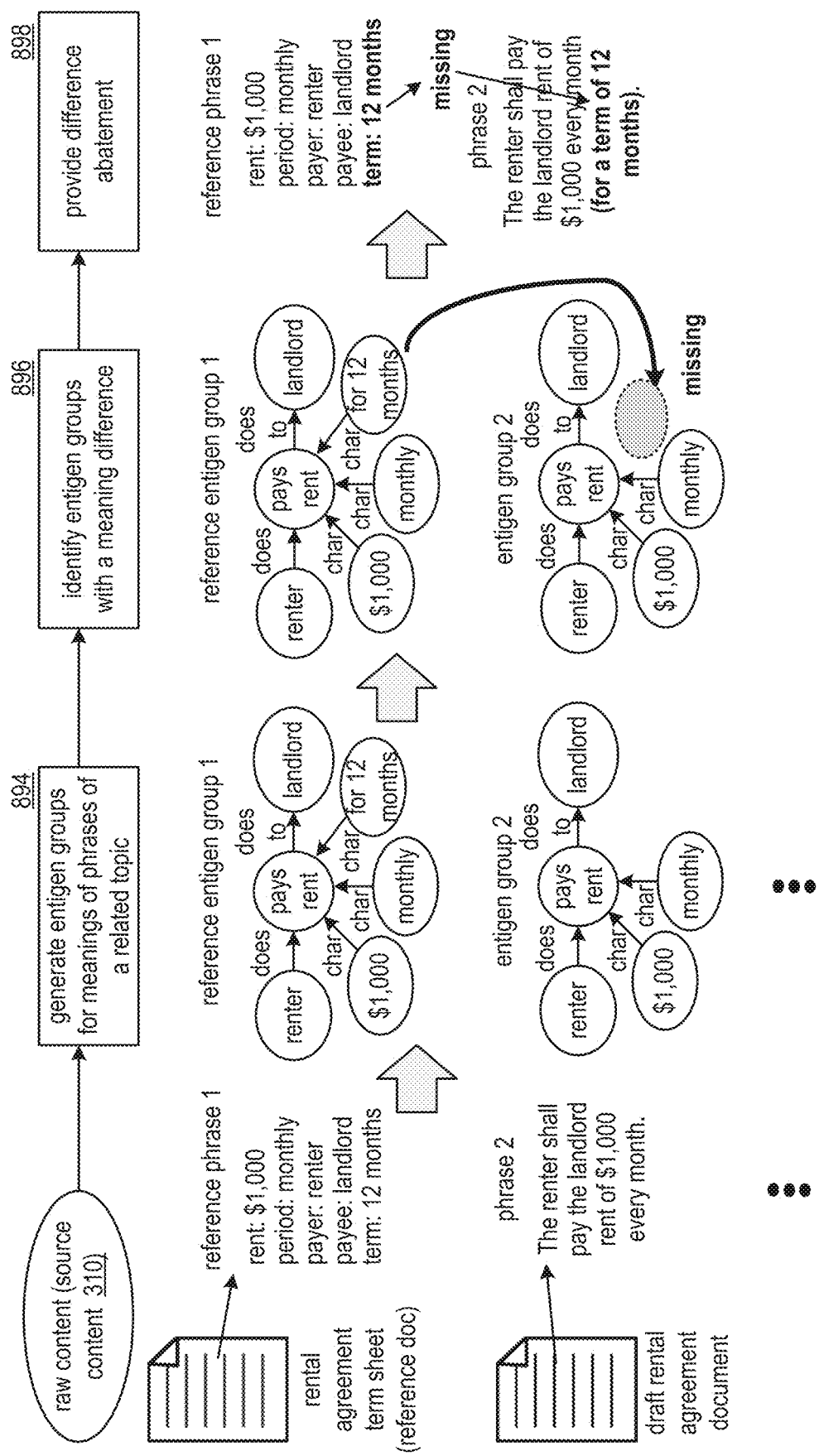

FIGS. 9D, 9E, and 9F are schematic block diagrams of another embodiment of a computing system illustrating another embodiment of a method for verifying authenticity of content that is utilized to create knowledge within the computing system in accordance with the present invention;

FIG. 10A is a schematic block diagram of another embodiment of a computing system in accordance with the present invention;

FIGS. 10B-10C are data flow diagrams of embodiments of a method to process ambiguity within a computing system in accordance with the present invention;

FIG. 10D is a logic diagram of an embodiment of a method for processing ambiguity within a computing system in accordance with the present invention;

FIG. 11A is a schematic block diagram of another embodiment of a computing system in accordance with the present invention;

FIG. 11B is a logic diagram of an embodiment of a method for optimizing a knowledge base within a computing system in accordance with the present invention;

FIG. 12A is a schematic block diagram of another embodiment of a computing system in accordance with the present invention;

FIG. 12B is a data flow diagram for providing an answer to a question with regards to likelihood of a crime within a computing system in accordance with the present invention;

FIG. 12C is a logic diagram of an embodiment of a method for providing an answer to a question with regards to likelihood of a crime within a computing system in accordance with the present invention;

FIG. 13A is a schematic block diagram of another embodiment of a computing system in accordance with the present invention;

FIG. 13B is a data flow diagram for providing an answer to a question with regards to likelihood of a sequence trigger detection within a computing system in accordance with the present invention;

FIG. 13C is a logic diagram of an embodiment of a method for providing an answer to a question with regards to likelihood of a sequence trigger detection within a computing system in accordance with the present invention;

FIG. 14A is a schematic block diagram of another embodiment of a computing system in accordance with the present invention;

FIG. 14B is a logic diagram of an embodiment of a method for providing an answer to a question with regards to optimizing user interface parameters within a computing system in accordance with the present invention;

FIG. 15A is a schematic block diagram of another embodiment of a computing system in accordance with the present invention;

FIG. 15B is a data flow diagram for an example of operation of a first embodiment of identifying an undesired document artifact within the computing system in accordance with the present invention;

FIGS. 15C-15E are further data flow diagrams for examples of operation of a second embodiment of identifying the undesired document artifact within the computing system.

Figure 15F:
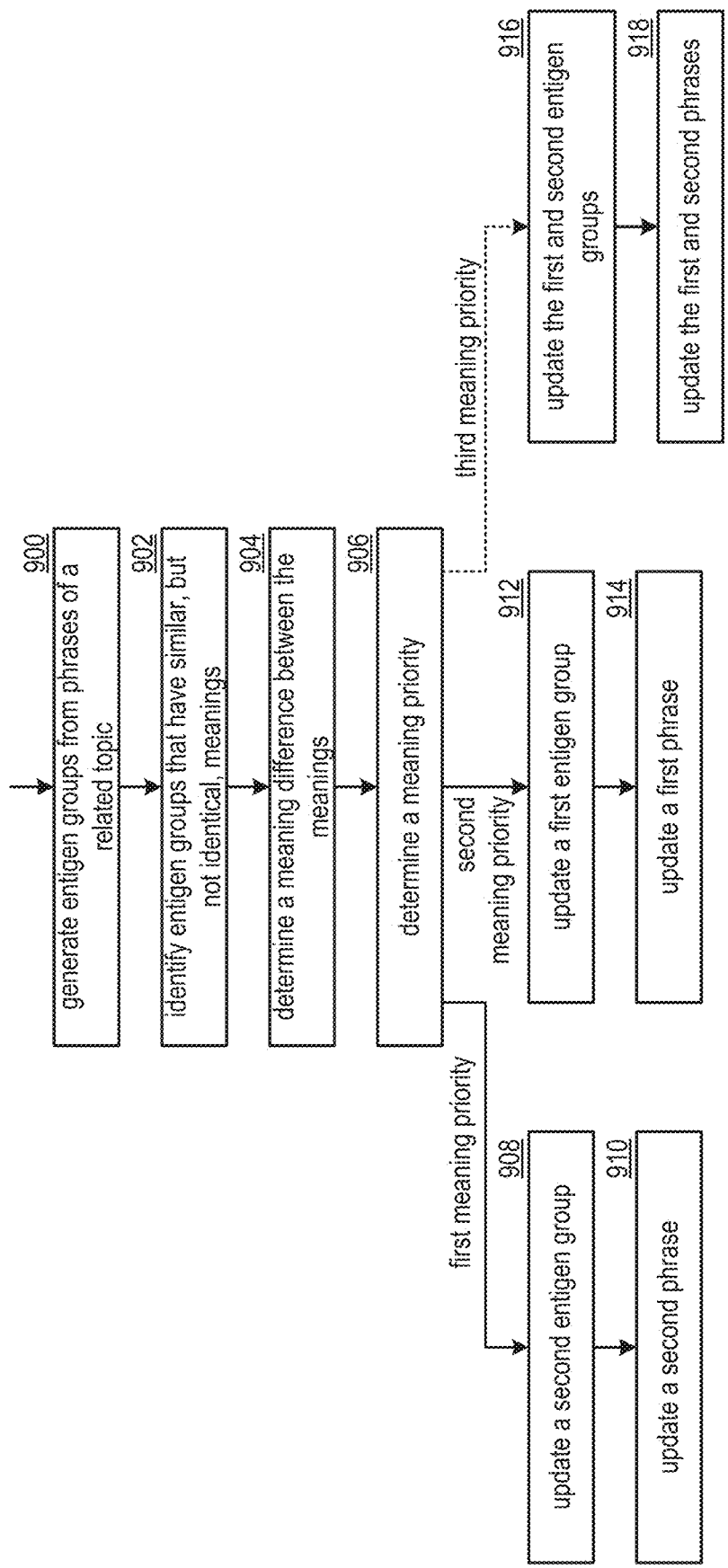
Figure 16A:
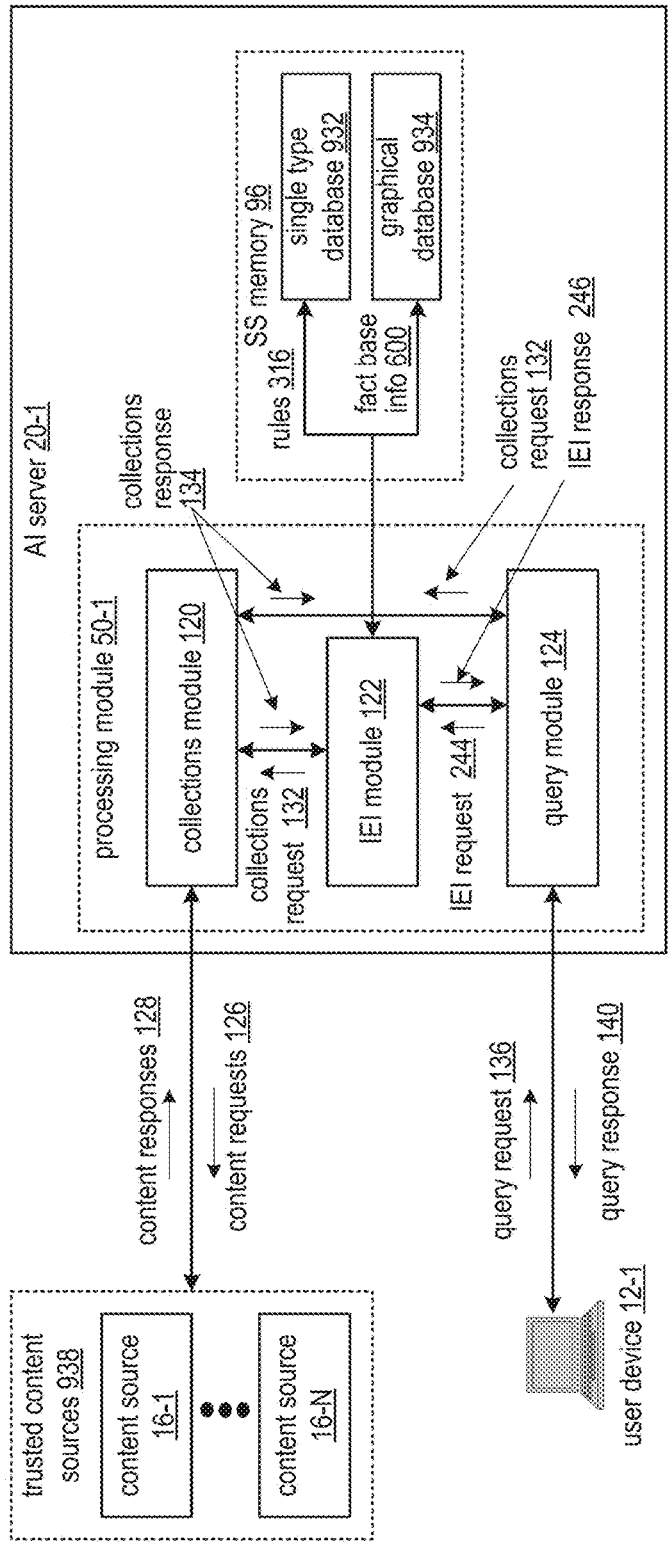
Figure 16B:
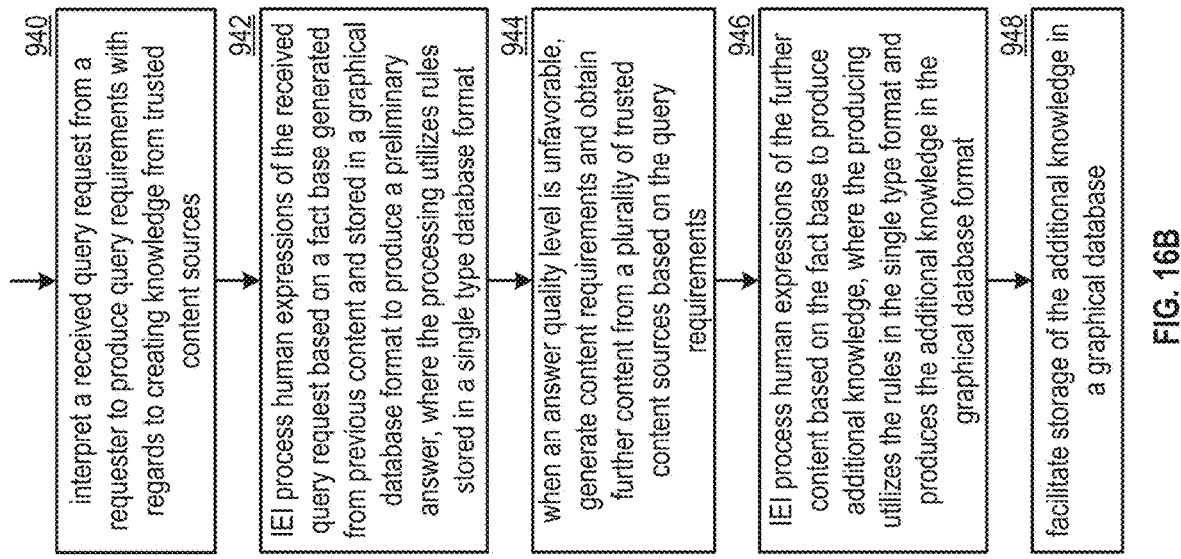
Figure 17A:
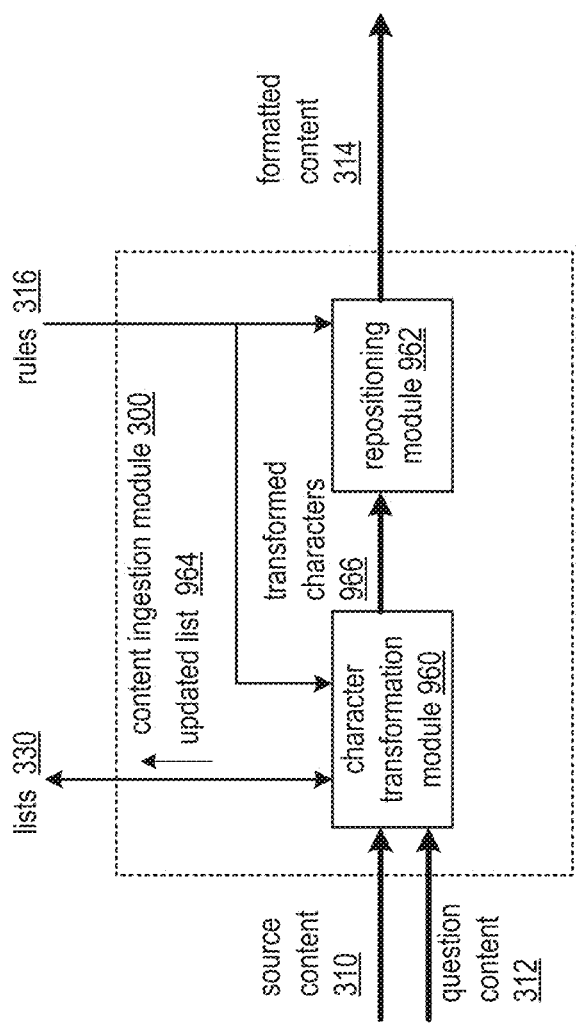
Figure 17B:
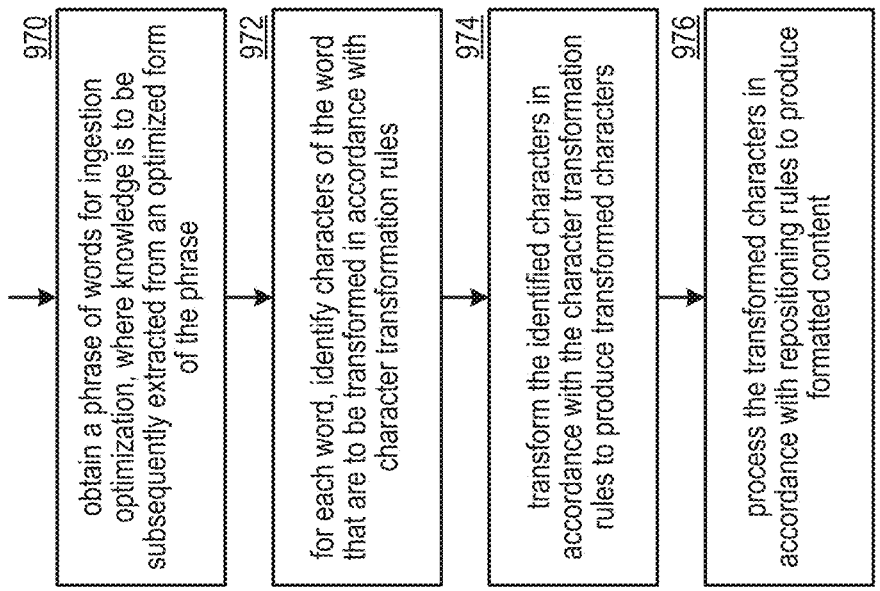
Figure 18A:
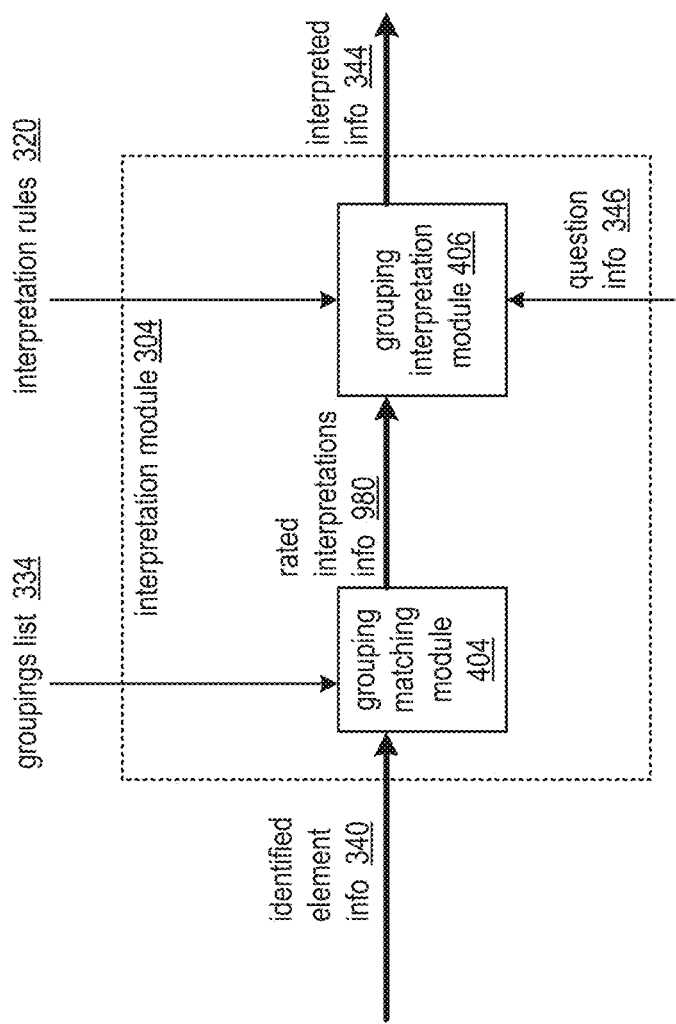
Figure 18B:
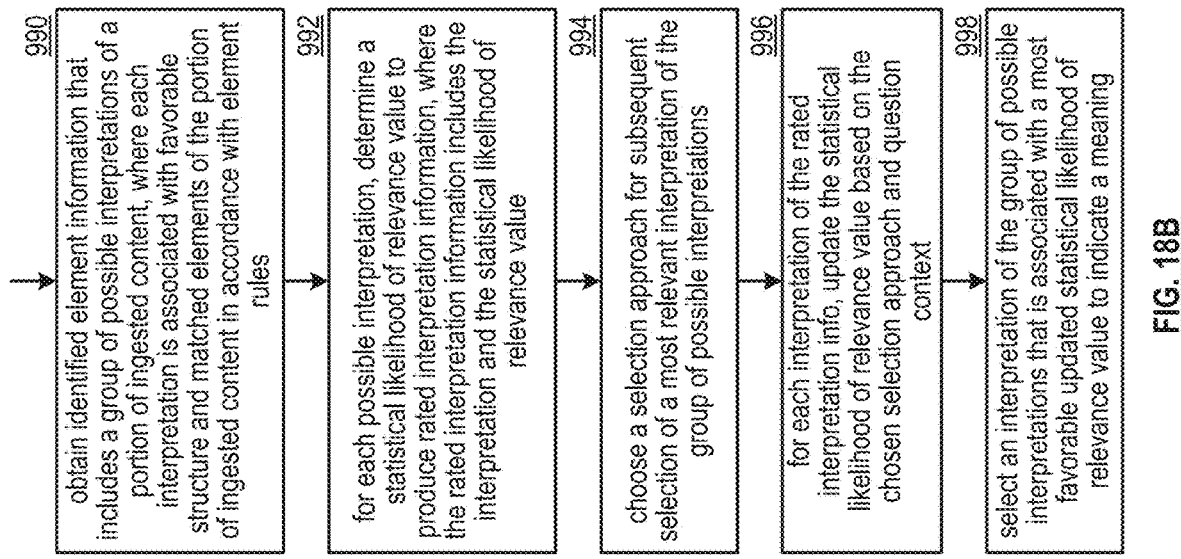

FIG. 15F is a logic diagram of an embodiment of a method identifying an undesired document artifact within a computing system in accordance with the present invention;

FIG. 16A is a schematic block diagram of another embodiment of a computing system in accordance with the present invention;

FIG. 16B is a logic diagram of an embodiment of a method for utilizing multiple database formats when creating knowledge from content within a computing system in accordance with the present invention;

FIG. 17A is a schematic block diagram of another embodiment of a content ingestion module within a computing system in accordance with the present invention;

FIG. 17B is a logic diagram of an embodiment of a method for ingesting content when creating knowledge from content within a computing system in accordance with the present invention;

FIG. 18A is a schematic block diagram of another embodiment of an interpretation module within a computing system in accordance with the present invention; and FIG. 18B is a logic diagram of an embodiment of a method for interpreting content when creating knowledge from content within a computing system in accordance with the present invention.

DETAILED DESCRIPTION OF THE INVENTION

Figure 1:
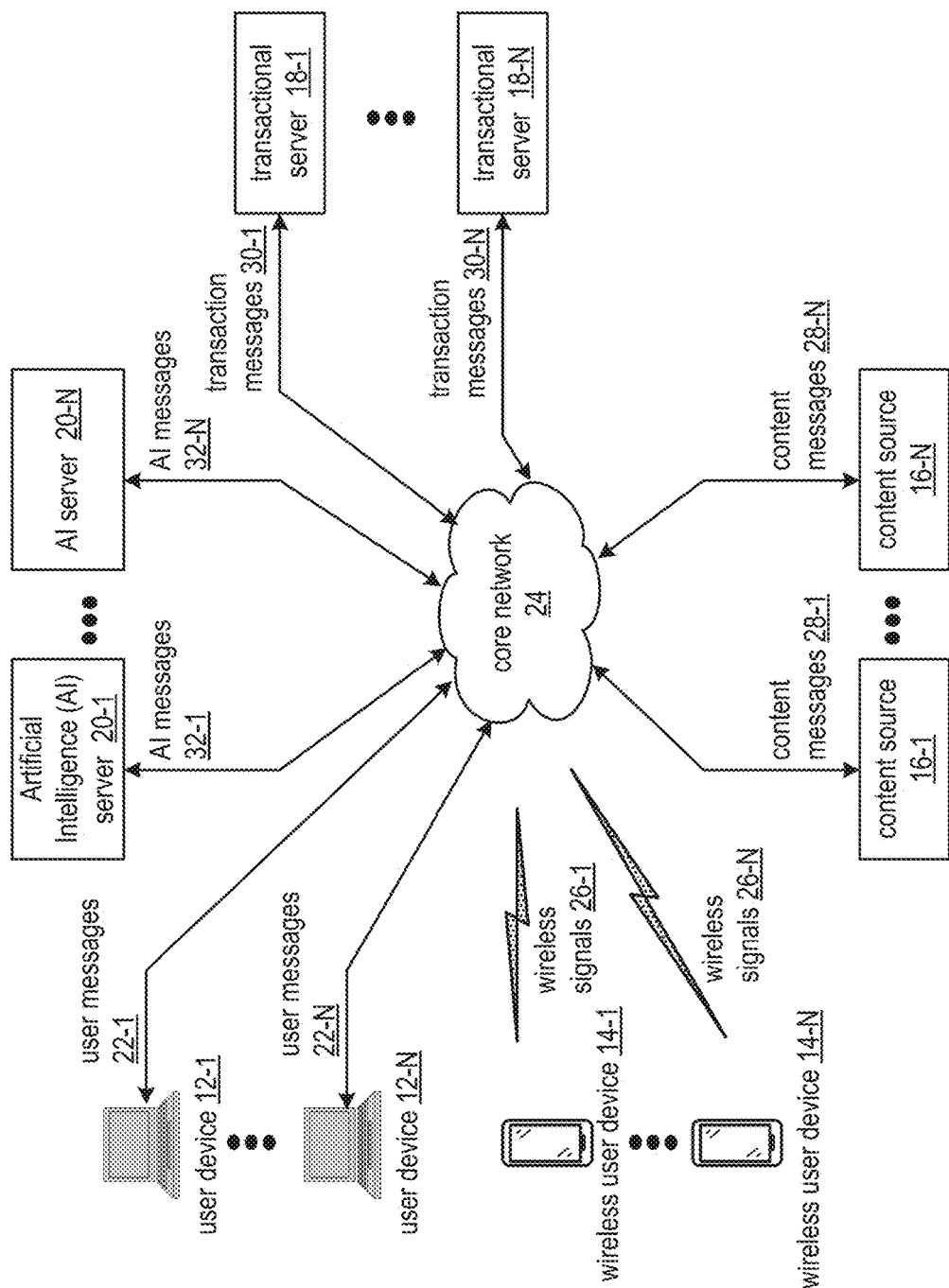
FIG. 1 is a schematic block diagram of an embodiment of a computing system in accordance with the present invention.

FIG. 1 is a schematic block diagram of an embodiment of a computing system 10 that includes a plurality of user devices 12-1 through 12-N, a plurality of wireless user devices 14-1 through 14-N, a plurality of content sources 16-1 through 16-N, a plurality of transactional servers 18-1 through 18-N, a plurality of artificial intelligence (AI) servers 20-1 through 20-N, and a core network 24. The core network 24 includes at least one of the Internet, a public radio access network (RAN), and any private network. Hereafter, the computing system 10 may be interchangeably referred to as a data network, a data communication network, a system, a communication system, and a data communication system. Hereafter, the user device and the wireless user device may be interchangeably referred to as user devices, and each of the transactional servers and the AI servers may be interchangeably referred to as servers.

Each user device, wireless user device, transactional server, and AI server includes a computing device that includes a computing core. In general, a computing device is any electronic device that can communicate data, process data, and/or store data. A further generality of a computing device is that it includes one or more of a central processing unit (CPU), a memory system, a sensor (e.g., internal or external), user input/output interfaces, peripheral device interfaces, communication elements, and an interconnecting bus structure.

As further specific examples, each of the computing devices may be a portable computing device and/or a fixed computing device. A portable computing device may be an embedded controller, a smart sensor, a smart pill, a social networking device, a gaming device, a cell phone, a smart phone, a robot, a personal digital assistant, a digital music player, a digital video player, a laptop computer, a handheld computer, a tablet, a video game controller, an engine controller, a vehicular controller, an aircraft controller, a maritime vessel controller, and/or any other portable device that includes a computing core. A fixed computing device may be security camera, a sensor device, a household appliance, a machine, a robot, an embedded controller, a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the various servers is discussed in greater detail with reference to FIG. 2. An embodiment of the various devices is discussed in greater detail with reference to FIG. 3.

Each of the content sources 16-1 through 16-N includes any source of content, where the content includes one or more of data files, a data stream, a tech stream, a text file, an audio stream, an audio file, a video stream, a video file, etc. Examples of the content sources include a weather service, a multi-language online dictionary, a fact server, a big data storage system, the Internet, social media systems, an email server, a news server, a schedule server, a traffic monitor, a security camera system, audio monitoring equipment, an information server, a service provider, a data aggregator, and airline traffic server, a shipping and logistics server, a banking server, a financial transaction server, etc. Alternatively, or in addition to, one or more of the various user devices may provide content. For example, a wireless user device may provide content (e.g., issued as a content message) when the wireless user device is able to capture data (e.g., text input, sensor input, etc.).

Generally, an embodiment of this invention presents solutions where the computing system 10 supports the generation and utilization of knowledge extracted from content. For example, the AI servers 20-1 through 20-N ingest content from the content sources 16-1 through 16-N by receiving, via the core network 24 content messages 28-1 through 28-N as AI messages 32-1 through 32-N, extract the knowledge from the ingested content, and interact with the various user devices to utilize the extracted knowledge by facilitating the issuing, via the core network 24, user messages 22-1 through 22-N to the user devices 12-1 through 12-N and wireless signals 26-1 through 26-N to the wireless user devices 14-1 through 14-N.

Each content message 28-1 through 28-N includes a content request (e.g., requesting content related to a topic, content type, content timing, one or more domains, etc.) or a content response, where the content response includes real-time or static content such as one or more of dictionary information, facts, non-facts, weather information, sensor data, news information, blog information, social media content, user daily activity schedules, traffic conditions, community event schedules, school schedules, user schedules airline records, shipping records, logistics records, banking records, census information, global financial history information, etc. Each AI message 32-1 through 32-N includes one or more of content messages, user messages (e.g., a query request, a query response that includes an answer to a query request), and transaction messages (e.g., transaction information, requests and responses related to transactions). Each user message 22-1 through 22-N includes one or more of a query request, a query response, a trigger request, a trigger response, a content collection, control information, software information, configuration information, security information, routing information, addressing information, presence information, analytics information, protocol information, all types of media, sensor data, statistical data, user data, error messages, etc.

When utilizing a wireless signal capability of the core network 24, each of the wireless user devices 14-1 through 14-N encodes/decodes data and/or information messages (e.g., user messages such as user messages 22-1 through 22-N) in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.) to produce wireless signals 26-1 through 26-N. Having encoded/decoded the data and/or information messages, the wireless user devices 14-1 through 14-N and/receive the wireless signals to/from the wireless capability of the core network 24.

As another example of the generation and utilization of knowledge, the transactional servers 18-1 through 18-N communicate, via the core network 24, transaction messages 30-1 through 30-N as further AI messages 32-1 through 32-N to facilitate ingesting of transactional type content (e.g., real-time crypto currency transaction information) and to facilitate handling of utilization of the knowledge by one or more of the transactional servers (e.g., for a transactional function) in addition to the utilization of the knowledge by the various user devices. Each transaction message 30-1 through 30-N includes one or more of a query request, a query response, a trigger request, a trigger response, a content message, and transactional information, where the transactional information may include one or more of consumer purchasing history, crypto currency ledgers, stock market trade information, other investment transaction information, etc.

In another specific example of operation of the generation and utilization of knowledge extracted from the content, the user device 12-1 issues a user message 22-1 to the AI server 20-1, where the user message 22-1 includes a query request and where the query request includes a question related to a first domain of knowledge. The issuing includes generating the user message 22-1 based on the query request (e.g., the question), selecting the AI server 20-1 based on the first domain of knowledge, and sending, via the core network 24, the user message 22-1 as a further AI message 32-1 to the AI server 20-1. Having received the AI message 32-1, the AI server 20-1 analyzes the question within the first domain, generates further knowledge, generates a preliminary answer, generates a quality level indicator of the preliminary answer, and determines to gather further content when the quality level indicator is below a minimum quality threshold level.

When gathering the further content, the AI server 20-1 issues, via the core network 24, a still further AI message 32-1 as a further content message 28-1 to the content source 16-1, where the content message 28-1 includes a content request for more content associated with the first domain of knowledge and in particular the question. Alternatively, or in addition to, the AI server 20-1 issues the content request to another AI server to facilitate a response within a domain associated with the other AI server. Further alternatively, or in addition to, the AI server 20-1 issues the content request to one or more of the various user devices to facilitate a response from a subject matter expert.

Having received the content message 28-1, the contents or 16-1 issues, via the core network 24, a still further content message 28-1 to the AI server 20-1 as a yet further AI message 32-1, where the still further content message 28-1 includes requested content. The AI server 20-1 processes the received content to generate further knowledge. Having generated the further knowledge, the AI server re-analyzes the question, generates still further knowledge, generates another preliminary answer, generates another quality level indicator of the other preliminary answer, and determines to issue a query response to the user device 12-1 when the quality level indicator is above the minimum quality threshold level. When issuing the query response, the AI server 20-1 generates an AI message 32-1 that includes another user message 22-1, where the other user message 22-1 includes the other preliminary answer as a query response including the answer to the question. Having generated the AI message 32-1, the AI server 20-1 sends, via the core network 24, the AI message 32-1 as the user message 22-1 to the user device 12-1 thus providing the answer to the original question of the query request.

Figure 2:
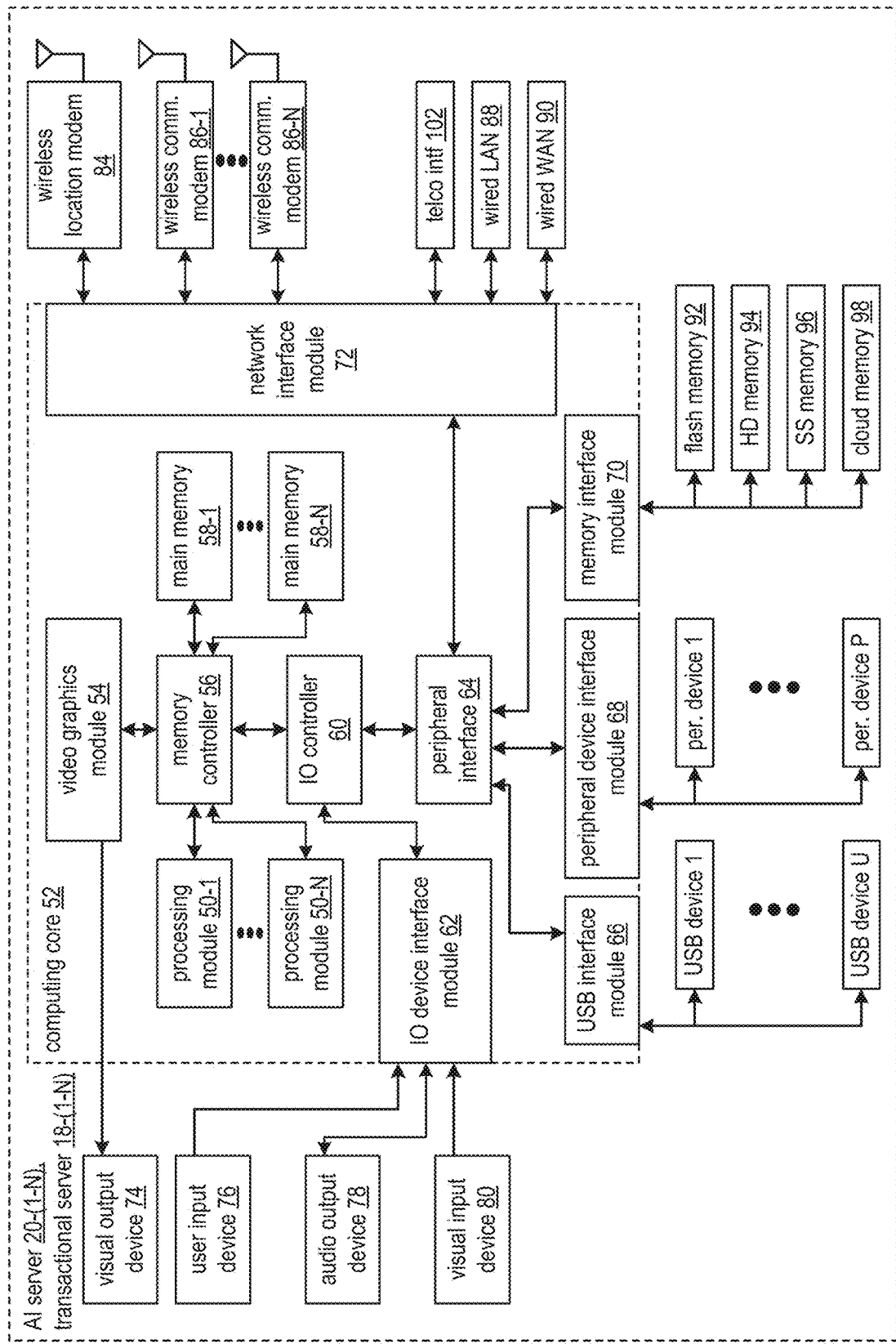
FIG. 2 is a schematic block diagram of an embodiment of various servers of a computing system in accordance with the present invention.

FIG. 2 is a schematic block diagram of an embodiment of the AI servers 20-1 through 20-N and the transactional servers 18-1 through 18-N of the computing system 10 of FIG. 1. The servers include a computing core 52, one or more visual output devices 74 (e.g., video graphics display, touchscreen, LED, etc.), one or more user input devices 76 (e.g., keypad, keyboard, touchscreen, voice to text, a push button, a microphone, a card reader, a door position switch, a biometric input device, etc.), one or more audio output devices 78 (e.g., speaker(s), headphone jack, a motor, etc.), and one or more visual input devices 80 (e.g., a still image camera, a video camera, photocell, etc.).

The servers further include one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, and one or more solid state (SS) memory devices 96, and/or cloud memory 98). The servers further include one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), and a wired local area network (LAN) 88 (e.g., optical, electrical), and a wired wide area network (WAN) 90 (e.g., optical, electrical).

The computing core 52 includes a video graphics module 54, one or more processing modules through 50-N (e.g., which may include one or more secure co-processors), a memory controller 56 and one or more main memories 58-1 through 58-N (e.g., RAM serving as local memory). The computing core 52 further includes one or more input/output (I/O) device interfaces 62, an input/output (I/O) controller 60, a peripheral interface 64, one or more USB interfaces 66, one or more network interfaces 72, one or more memory interfaces 70, and/or one or more peripheral device interfaces 68.

The processing modules may be a single processing device or a plurality of processing devices where the processing device may further be referred to as one or more of a "processing circuit", a "processor", and/or a "processing unit". Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network).

Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Each of the interfaces 62, 66, 68, 70, and 72 includes a combination of hardware (e.g., connectors, wiring, etc.) and may further include operational instructions stored on memory (e.g., driver software) that are executed by one or more of the processing modules 50-1 through 50-N and/or a processing circuit within the interface. Each of the interfaces couples to one or more components of the servers. For example, one of the IO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system). In other embodiments, the servers may include more or less devices and modules than shown in this example embodiment of the servers.

Figure 3:
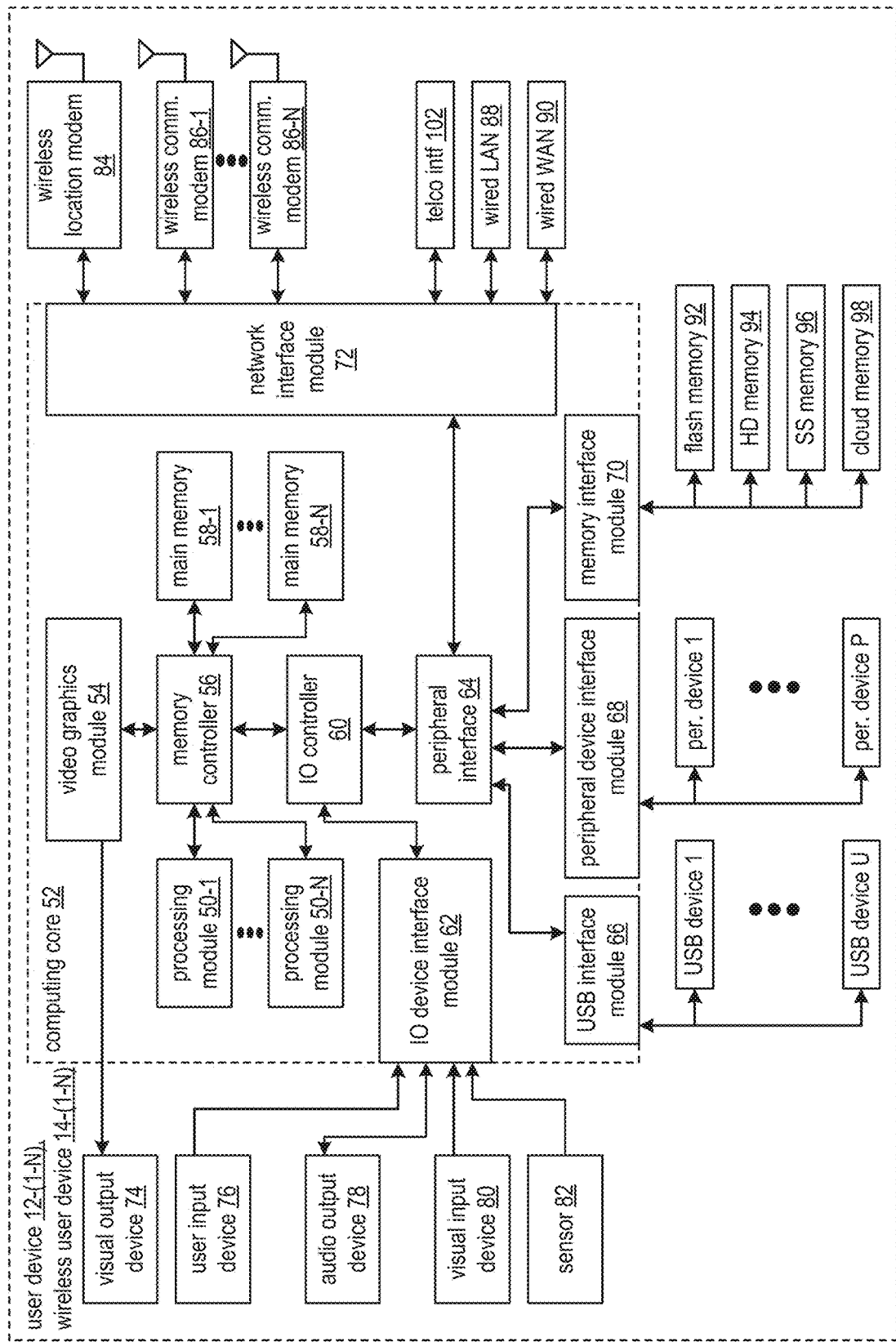
FIG. 3 is a schematic block diagram of an embodiment of various devices of a computing system in accordance with the present invention.

FIG. 3 is a schematic block diagram of an embodiment of the various devices of the computing system 10 of FIG. 1, including the user devices 12-1 through 12-N and the wireless user devices 14-1 through 14-N. The various devices include the visual output device 74 of FIG. 2, the user input device 76 of FIG. 2, the audio output device 78 of FIG. 2, the visual input device 80 of FIG. 2, and one or more sensors 82.

The sensor may be implemented internally and/or externally to the device. Example sensors includes a still camera, a video camera, servo motors associated with a camera, a position detector, a smoke detector, a gas detector, a motion sensor, an accelerometer, velocity detector, a compass, a gyro, a temperature sensor, a pressure sensor, an altitude sensor, a humidity detector, a moisture detector, an imaging sensor, and a biometric sensor. Further examples of the sensor include an infrared sensor, an audio sensor, an ultrasonic sensor, a proximity detector, a magnetic field detector, a biomaterial detector, a radiation detector, a weight detector, a density detector, a chemical analysis detector, a fluid flow volume sensor, a DNA reader, a wind speed sensor, a wind direction sensor, and an object detection sensor.

Further examples of the sensor include an object identifier sensor, a motion recognition detector, a battery level detector, a room temperature sensor, a sound detector, a smoke detector, an intrusion detector, a motion detector, a door position sensor, a window position sensor, and a sunlight detector. Still further sensor examples include medical category sensors including: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.

The various devices further include the computing core 52 of FIG. 2, the one or more universal serial bus (USB) devices (USB devices 1-U) of FIG. 2, the one or more peripheral devices (e.g., peripheral devices 1-P) of FIG. 2, and the one or more memories of FIG. 2 (e.g., flash memories 92, HD memories 94, SS memories 96, and/or cloud memories 98). The various devices further include the one or more wireless location modems 84 of FIG. 2, the one or more wireless communication modems 86-1 through 86-N of FIG. 2, the telco interface 102 of FIG. 2, the wired local area network (LAN) 88 of FIG. 2, and the wired wide area network (WAN) 90 of FIG. 2. In other embodiments, the various devices may include more or less internal devices and modules than shown in this example embodiment of the various devices.

Figure 4A:
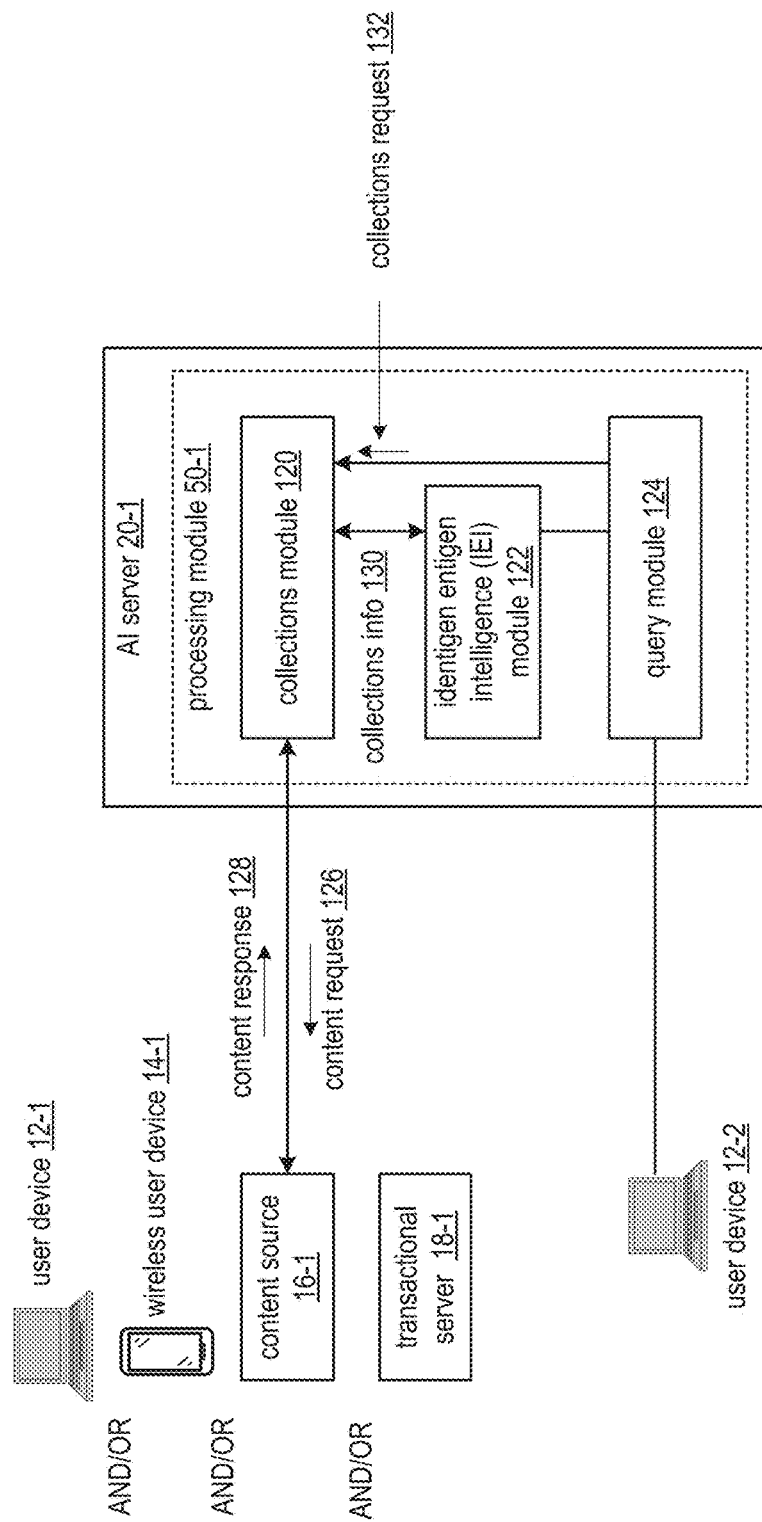
FIGS. 4A and 4B are schematic block diagrams of another embodiment of a computing system in accordance with the present invention.
Figure 4B:
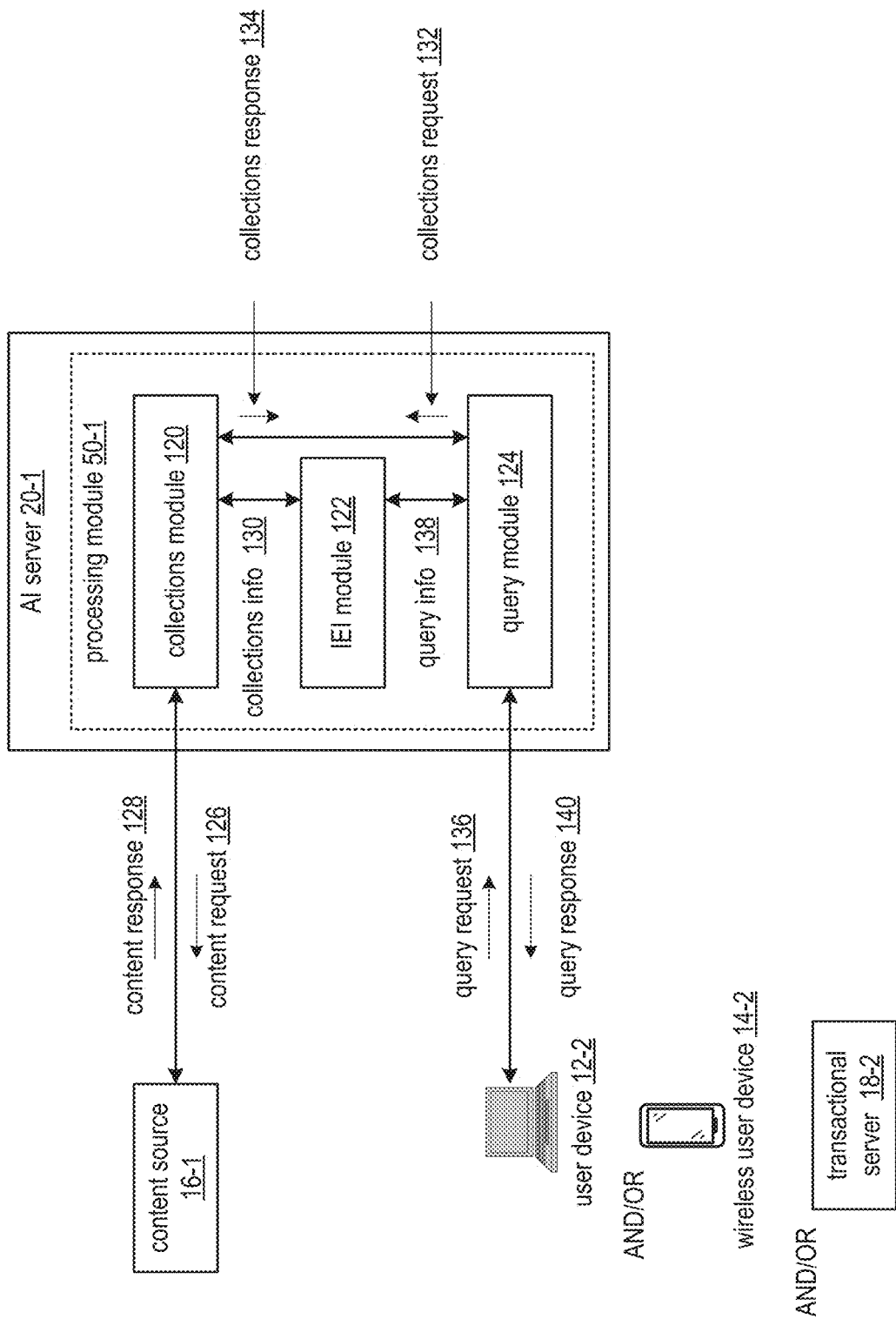

FIGS. 4A and 4B are schematic block diagrams of another embodiment of a computing system that includes one or more of the user device 12-1 of FIG. 1, the wireless user device 14-1 of FIG. 1, the content source 16-1 of FIG. 1, the transactional server 18-1 of FIG. 1, the user device 12-2 of FIG. 1, and the AI server 20-1 of FIG. 1. The AI server 20-1 includes the processing module 50-1 (e.g., associated with the servers) of FIG. 2, where the processing module 50-1 includes a collections module 120, an identigen entigen intelligence (IP module 122, and a query module 124. Alternatively, the collections module 120, the IEI module 122, and the query module 124 may be implemented by the processing module 50-1 (e.g., associated with the various user devices) of FIG. 3. The computing system functions to interpret content to produce a response to a query.

FIG. 4A illustrates an example of the interpreting of the content to produce the response to the query where the collections module 120 interprets (e.g., based on an interpretation approach such as rules) at least one of a collections request 132 from the query module 124 and a collections request within collections information 130 from the IEI module 122 to produce content request information (e.g., potential sources, content descriptors of desired content). Alternatively, or in addition to, the collections module 120 may facilitate gathering further content based on a plurality of collection requests from a plurality of devices of the computing system 10 of FIG. 1.

The collections request 132 is utilized to facilitate collection of content, where the content may be received in a real-time fashion once or at desired intervals, or in a static fashion from previous discrete time frames. For instance, the query module 124 issues the collections request 132 to facilitate collection of content as a background activity to support a long-term query (e.g., how many domestic airline flights over the next seven days include travelers between the age of 18 and 35 years old). The collections request 132 may include one or more of a requester identifier (ID), a content type (e.g., language, dialect, media type, topic, etc.), a content source indicator, security credentials (e.g., an authorization level, a password, a user ID, parameters utilized for encryption, etc.), a desired content quality level, trigger information (e.g., parameters under which to collect content based on a pre-event, an event (i.e., content quality level reaches a threshold to cause the trigger, trueness), or a timeframe), a desired format, and a desired timing associated with the content.

Having interpreted the collections request 132, the collections module 120 selects a source of content based on the content request information. The selecting includes one or more of identifying one or more potential sources based on the content request information, selecting the source of content from the potential sources utilizing a selection approach (e.g., favorable history, a favorable security level, favorable accessibility, favorable cost, favorable performance, etc.). For example, the collections module 120 selects the content source 16-1 when the content source 16-1 is known to provide a favorable content quality level for a domain associated with the collections request 132.

Having selected the source of content, the collections module 120 issues a content request 126 to the selected source of content. The issuing includes generating the content request 126 based on the content request information for the selected source of content and sending the content request 126 to the selected source of content. The content request 126 may include one or more of a content type indicator, a requester ID, security credentials for content access, and any other information associated with the collections request 132. For example, the collections module 120 sends the content request 126, via the core network 24 of FIG. 1, to the content source 16-1. Alternatively, or in addition to, the collections module 120 may send a similar content request 126 to one or more of the user device 12-1, the wireless user device 14-1, and the transactional server 18-1 to facilitate collecting of further content.

In response to the content request 126, the collections module 120 receives one or more content responses 128. The content response 128 includes one or more of content associated with the content source, a content source identifier, security credential processing information, and any other information pertaining to the desired content. Having received the content response 128, the collections module 120 interprets the received content response 128 to produce collections information 130, where the collections information 130 further includes a collections response from the collections module 120 to the IEI module 122.

The collections response includes one or more of transformed content (e.g., completed sentences and paragraphs), timing information associated with the content, a content source ID, and a content quality level. Having generated the collections response of the collections information 130, the collections module 120 sends the collections information 130 to the IEI module 122. Having received the collections information 130 from the collections module 120, the IEI module 122 interprets the further content of the content response to generate further knowledge, where the further knowledge is stored in a memory associated with the IEI module 122 to facilitate subsequent answering of questions posed in received queries.

FIG. 4B further illustrates the example of the interpreting of the content to produce the response to the query where, the query module 124 interprets a received query request 136 from a requester to produce an interpretation of the query request. For example, the query module 124 receives the query request 136 from the user device 12-2, and/or from one or more of the wireless user device 14-2 and the transactional server 18-2. The query request 136 includes one or more of an identifier (ID) associated with the request (e.g., requester ID, ID of an entity to send a response to), a question, question constraints (e.g., within a timeframe, within a geographic area, within a domain of knowledge, etc.), and content associated with the question (e.g., which may be analyzed for new knowledge itself).

The interpreting of the query request 136 includes determining whether to issue a request to the IEI module 122 (e.g., a question, perhaps with content) and/or to issue a request to the collections module 120 (e.g., for further background content). For example, the query module 124 produces the interpretation of the query request to indicate to send the request directly to the IEI module 122 when the question is associated with a simple non-time varying function answer (e.g., question: "how many hydrogen atoms does a molecule of water have?").

Having interpreted the query request 136, the query module 124 issues at least one of an IEI request as query information 138 to the IEI module 122 (e.g., when receiving a simple new query request) and a collections request 132 to the collections module 120 (e.g., based on two or more query requests 136 requiring more substantive content gathering). The IEI request of the query information 138 includes one or more of an identifier (ID) of the query module 124, an ID of the requester (e.g., the user device 12-2), a question (e.g., with regards to content for analysis, with regards to knowledge minded by the AI server from general content), one or more constraints (e.g., assumptions, restrictions, etc.) associated with the question, content for analysis of the question, and timing information (e.g., a date range for relevance of the question).

Having received the query information 138 that includes the IEI request from the query module 124, the IEI module 122 determines whether a satisfactory response can be generated based on currently available knowledge, including that of the query request 136. The determining includes indicating that the satisfactory response cannot be generated when an estimated quality level of an answer falls below a minimum quality threshold level. When the satisfactory response cannot be generated, the IEI module 122 facilitates collecting more content. The facilitating includes issuing a collections request to the collections module 120 of the AI server 20-1 and/or to another server or user device, and interpreting a subsequent collections response 134 of collections information 130 that includes further content to produce further knowledge to enable a more favorable answer.

When the IEI module 122 indicates that the satisfactory response can be generated, the IEI module 122 issues an IEI response as query information 138 to the query module 124. The IEI response includes one or more of one or more answers, timing relevance of the one or more answers, an estimated quality level of each answer, and one or more assumptions associated with the answer. The issuing includes generating the IEI response based on the collections response 134 of the collections information 130 and the IEI request, and sending the IEI response as the query information 138 to the query module 124. Alternatively, or in addition to, at least some of the further content collected by the collections module 120 is utilized to generate a collections response 134 issued by the collections module 120 to the query module 124. The collections response 134 includes one or more of further content, a content availability indicator (e.g., when, where, required credentials, etc.), a content freshness indicator (e.g., timestamps, predicted time availability), content source identifiers, and a content quality level.

Having received the query information 138 from the IEI module 122, the query module 124 issues a query response 140 to the requester based on the IEI response and/or the collections response 134 directly from the collections module 120, where the collection module 120 generates the collections response 134 based on collected content and the collections request 132. The query response 140 includes one or more of an answer, answer timing, an answer quality level, and answer assumptions.

Figure 4C:
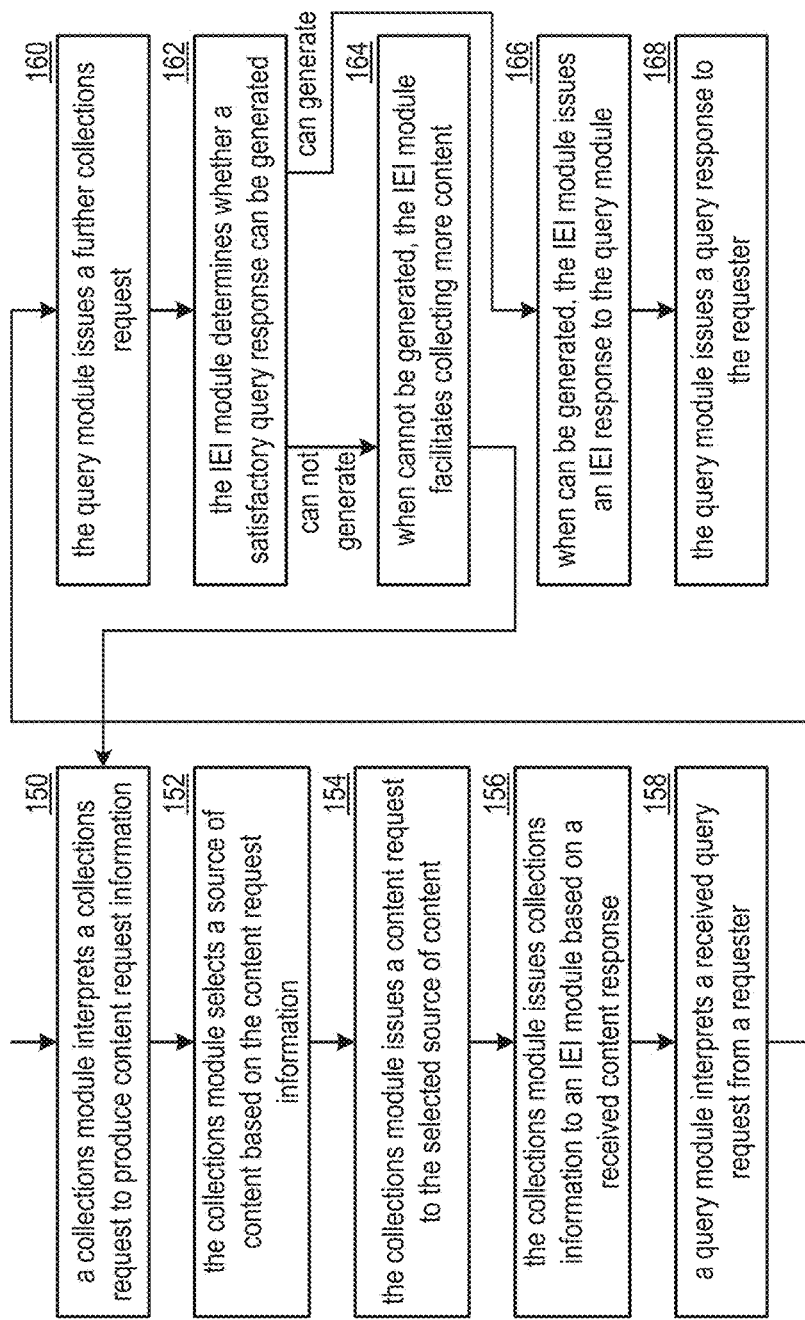
FIG. 4C is a logic diagram of an embodiment of a method for interpreting content to produce a response to a query within a computing system in accordance with the present invention.

FIG. 4C is a logic diagram of an embodiment of a method for interpreting content to produce a response to a query within a computing system. In particular, a method is presented for use in conjunction with one or more functions and features described in conjunction with FIGS. 1-3, 4A-4B, and also FIG. 4C. The method includes step 150 where a collections module of a processing module of one or more computing devices (e.g., of one or more servers) interprets a collections request to produce content request information. The interpreting may include one or more of identifying a desired content source, identifying a content type, identifying a content domain, and identifying content timing requirements.

The method continues at step 152 where the collections module selects a source of content based on the content request information. For example, the collections module identifies one or more potential sources based on the content request information and selects the source of content from the potential sources utilizing a selection approach (e.g., based on one or more of favorable history, a favorable security level, favorable accessibility, favorable cost, favorable performance, etc.). The method continues at step 154 where the collections module issues a content request to the selected source of content. The issuing includes generating a content request based on the content request information for the selected source of content and sending the content request to the selected source of content.

The method continues at step 156 where the collections module issues collections information to an identigen entigen intelligence (IEI) module based on a received content response, where the IEI module extracts further knowledge from newly obtained content from the one or more received content responses. For example, the collections module generates the collections information based on newly obtained content from the one or more received content responses of the selected source of content.

The method continues at step 158 where a query module interprets a received query request from a requester to produce an interpretation of the query request. The interpreting may include determining whether to issue a request to the IEI module (e.g., a question) or to issue a request to the collections module to gather further background content. The method continues at step 160 where the query module issues a further collections request. For example, when receiving a new query request, the query module generates a request for the IEI module. As another example, when receiving a plurality of query requests for similar questions, the query module generates a request for the collections module to gather further background content.

The method continues at step 162 where the IEI module determines whether a satisfactory query response can be generated when receiving the request from the query module. For example, the IEI module indicates that the satisfactory query response cannot be generated when an estimated quality level of an answer is below a minimum answer quality threshold level. The method branches to step 166 when the IEI module determines that the satisfactory query response can be generated. The method continues to step 164 when the IEI module determines that the satisfactory query response cannot be generated. When the satisfactory query response cannot be generated, the method continues at step 164 where the IEI module facilitates collecting more content. The method loops back to step 150.

When the satisfactory query response can be generated, the method continues at step 166 where the IEI module issues an IEI response to the query module. The issuing includes generating the IEI response based on the collections response and the IEI request, and sending the IEI response to the query module. The method continues at step 168 where the query module issues a query response to the requester. For example, the query module generates the query response based on the IEI response and/or a collections response from the collections module and sends the query response to the requester, where the collections module generates the collections response based on collected content and the collections request.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5A:
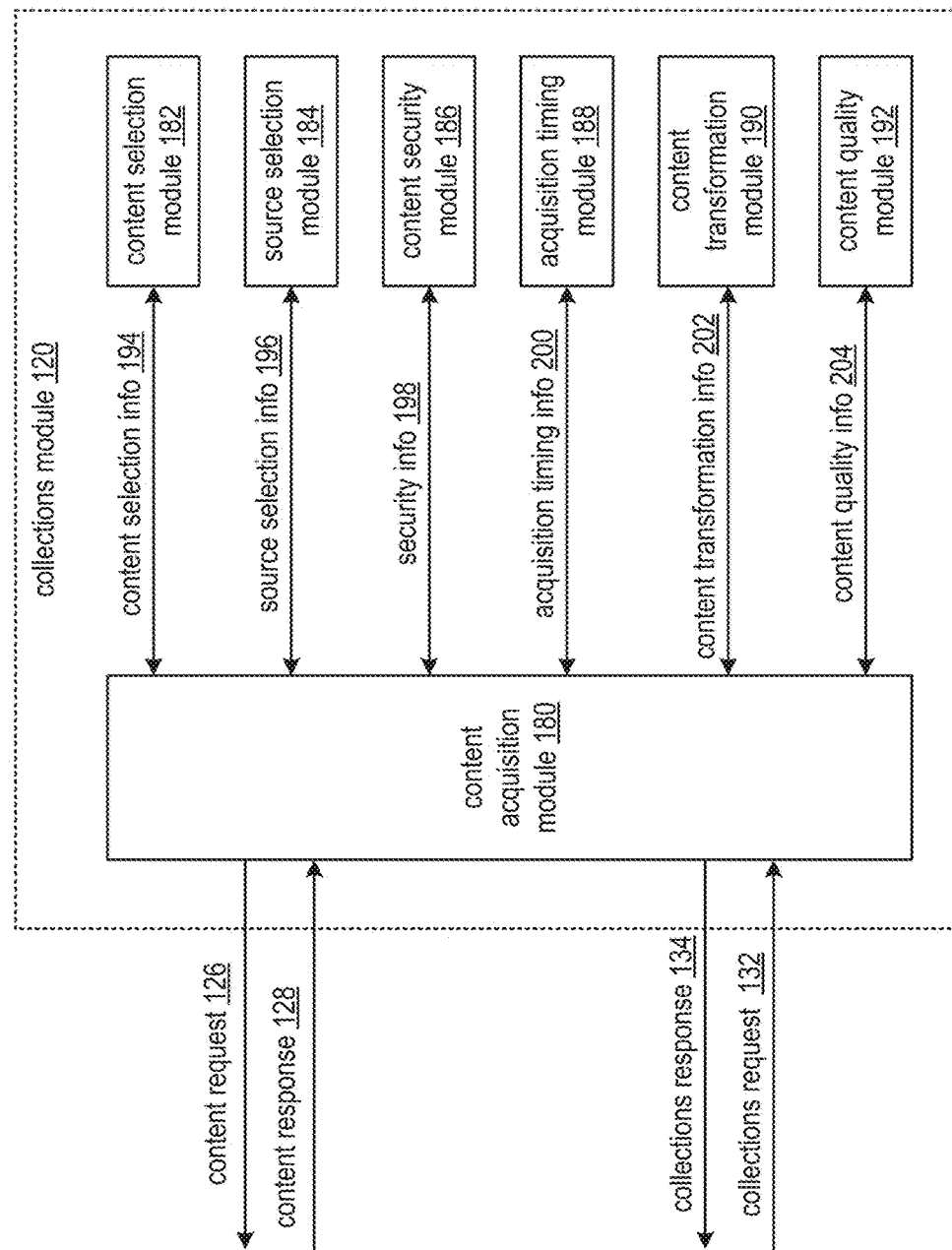
FIG. 5A is a schematic block diagram of an embodiment of a collections module of a computing system in accordance with the present invention.

FIG. 5A is a schematic block diagram of an embodiment of the collections module 120 of FIG. 4A that includes a content acquisition module 180, a content selection module 182, a source selection module 184, a content security module 186, an acquisition timing module 188, a content transformation module 190, and a content quality module 192. Generally, an embodiment of this invention presents solutions where the collections module 120 supports collecting content.

In an example of operation of the collecting of the content, the content acquisition module 180 receives a collections request 132 from a requester. The content acquisition module 180 obtains content selection information 194 based on the collections request 132. The content selection information 194 includes one or more of content requirements, a desired content type indicator, a desired content source identifier, a content type indicator, a candidate source identifier (ID), and a content profile (e.g., a template of typical parameters of the content). For example, the content acquisition module 180 receives the content selection information 194 from the content selection module 182, where the content selection module 182 generates the content selection information 194 based on a content selection information request from the content acquisition module 180 and where the content acquisition module 180 generates the content selection information request based on the collections request 132.

The content acquisition module 180 obtains source selection information 196 based on the collections request 132. The source selection information 196 includes one or more of candidate source identifiers, a content profile, selected sources, source priority levels, and recommended source access timing. For example, the content acquisition module 180 receives the source selection information 196 from the source selection module 184, where the source selection module 184 generates the source selection information 196 based on a source selection information request from the content acquisition module 180 and where the content acquisition module 180 generates the source selection information request based on the collections request 132.

The content acquisition module 180 obtains acquisition timing information 200 based on the collections request 132. The acquisition timing information 200 includes one or more of recommended source access timing, confirmed source access timing, source access testing results, estimated velocity of content update's, content precious, timestamps, predicted time availability, required content acquisition triggers, content acquisition trigger detection indicators, and a duplicative indicator with a pending content request. For example, the content acquisition module 180 receives the acquisition timing information 200 from the acquisition timing module 188, where the acquisition timing module 188 generates the acquisition timing information 200 based on an acquisition timing information request from the content acquisition module 180 and where the content acquisition module 180 generates the acquisition timing information request based on the collections request 132.

Having obtained the content selection information 194, the source selection information 196, and the acquisition timing information 200, the content acquisition module 180 issues a content request 126 to a content source utilizing security information 198 from the content security module 186, where the content acquisition module 180 generates the content request 126 in accordance with the content selection information 194, the source selection information 196, and the acquisition timing information 200. The security information 198 includes one or more of source priority requirements, requester security information, available security procedures, and security credentials for trust and/or encryption. For example, the content acquisition module 180 generates the content request 126 to request a particular content type in accordance with the content selection information 194 and to include security parameters of the security information 198, initiates sending of the content request 126 in accordance with the acquisition timing information 200, and sends the content request 126 to a particular targeted content source in accordance with the source selection information 196.

In response to receiving a content response 128, the content acquisition module 180 determines the quality level of received content extracted from the content response 128. For example, the content acquisition module 180 receives content quality information 204 from the content quality module 192, where the content quality module 192 generates the quality level of the received content based on receiving a content quality request from the content acquisition module 180 and where the content acquisition module 180 generates the content quality request based on content extracted from the content response 128. The content quality information includes one or more of a content reliability threshold range, a content accuracy threshold range, a desired content quality level, a predicted content quality level, and a predicted level of trust.

When the quality level is below a minimum desired quality threshold level, the content acquisition module 180 facilitates acquisition of further content. The facilitating includes issuing another content request 126 to a same content source and/or to another content source to receive and interpret further received content. When the quality level is above the minimum desired quality threshold level, the content acquisition module 180 issues a collections response 134 to the requester. The issuing includes processing the content in accordance with a transformation approach to produce transformed content, generating the collections response 134 to include the transformed content, and sending the collections response 134 to the requester. The processing of the content to produce the transformed content includes receiving content transformation information 202 from the content transformation module 190, where the content transformation module 190 transforms the content in accordance with the transformation approach to produce the transformed content. The content transformation information includes a desired format, available formats, recommended formatting, the received content, transformation instructions, and the transformed content.

Figure 5B:
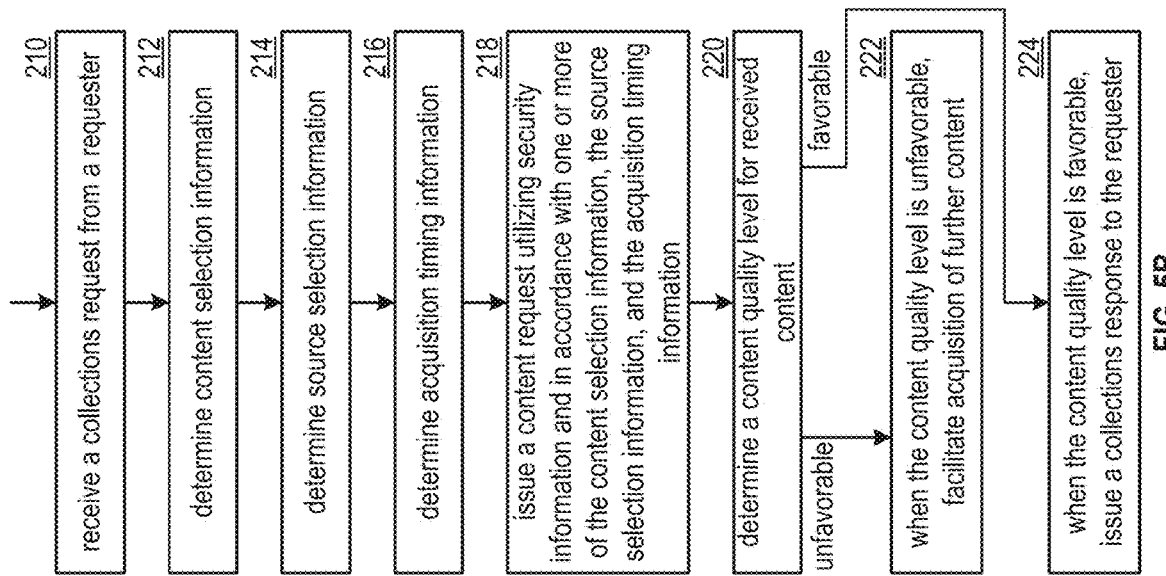
FIG. 5B is a logic diagram of an embodiment of a method for obtaining content within a computing system in accordance with the present invention.

FIG. 5B is a logic diagram of an embodiment of a method for obtaining content within a computing system. In particular, a method is presented for use in conjunction with one or more functions and features described in conjunction with FIGS. 1-3, 4A-4C, 5A, and also FIG. 5B. The method includes step 210 where a processing module of one or more processing modules of one or more computing devices of the computing system receives a collections request from the requester. The method continues at step 212 where the processing module determines content selection information. The determining includes interpreting the collections request to identify requirements of the content.

The method continues at step 214 where the processing module determines source selection information. The determining includes interpreting the collections request to identify and select one or more sources for the content to be collected. The method continues at step 216 where the processing module determines acquisition timing information. The determining includes interpreting the collections request to identify timing requirements for the acquisition of the content from the one or more sources. The method continues at step 218 where the processing module issues a content request utilizing security information and in accordance with one or more of the content selection information, the source selection information, and the acquisition timing information. For example, the processing module issues the content request to the one or more sources for the content in accordance with the content requirements, where the sending of the request is in accordance with the acquisition timing information.

The method continues at step 220 where the processing module determines a content quality level for received content area. The determining includes receiving the content from the one or more sources, obtaining content quality information for the received content based on a quality analysis of the received content. The method branches to step 224 when the content quality level is favorable and the method continues to step 222 when the quality level is unfavorable. For example, the processing module determines that the content quality level is favorable when the content quality level is equal to or above a minimum quality threshold level and determines that the content quality level is unfavorable when the content quality level is less than the minimum quality threshold level.

When the content quality level is unfavorable, the method continues at step 222 where the processing module facilitates acquisition and further content. For example, the processing module issues further content requests and receives further content for analysis. When the content quality level is favorable, the method continues at step 224 where the processing module issues a collections response to the requester. The issuing includes generating the collections response and sending the collections response to the requester. The generating of the collections response may include transforming the received content into transformed content in accordance with a transformation approach (e.g., reformatting, interpreting absolute meaning and translating into another language in accordance with the absolute meaning, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5C:
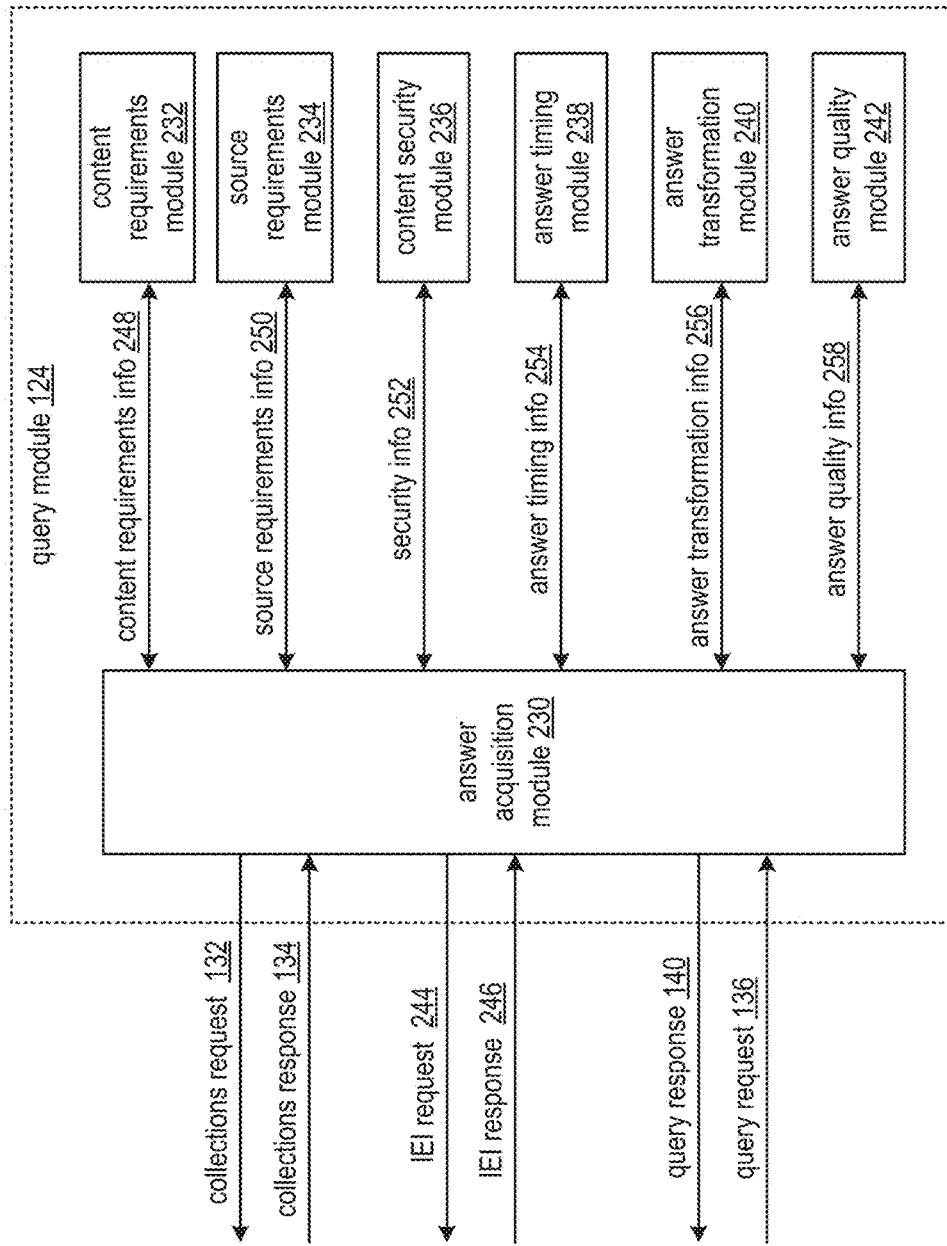
FIG. 5C is a schematic block diagram of an embodiment of a query module of a computing system in accordance with the present invention.

FIG. 5C is a schematic block diagram of an embodiment of the query module 124 of FIG. 4A that includes an answer acquisition module 230, a content requirements module 232 a source requirements module 234, a content security module 236, an answer timing module 238, an answer transformation module 240, and an answer quality module 242. Generally, an embodiment of this invention presents solutions where the query module 124 supports responding to a query.

In an example of operation of the responding to the query, the answer acquisition module 230 receives a query request 136 from a requester. The answer acquisition module 230 obtains content requirements information 248 based on the query request 136. The content requirements information 248 includes one or more of content parameters, a desired content type, a desired content source if any, a content type if any, candidate source identifiers, a content profile, and a question of the query request 136. For example, the answer acquisition module 230 receives the content requirements information 248 from the content requirements module 232, where the content requirements module 232 generates the content requirements information 248 based on a content requirements information request from the answer acquisition module 230 and where the answer acquisition module 230 generates the content requirements information request based on the query request 136.

The answer acquisition module 230 obtains source requirements information 250 based on the query request 136. The source requirements information 250 includes one or more of candidate source identifiers, a content profile, a desired source parameter, recommended source parameters, source priority levels, and recommended source access timing. For example, the answer acquisition module 230 receives the source requirements information 250 from the source requirements module 234, where the source requirements module 234 generates the source requirements information 250 based on a source requirements information request from the answer acquisition module 230 and where the answer acquisition module 230 generates the source requirements information request based on the query request 136.

The answer acquisition module 230 obtains answer timing information 254 based on the query request 136. The answer timing information 254 includes one or more of requested answer timing, confirmed answer timing, source access testing results, estimated velocity of content updates, content freshness, timestamps, predicted time available, requested content acquisition trigger, and a content acquisition trigger detected indicator. For example, the answer acquisition module 230 receives the answer timing information 254 from the answer timing module 238, where the answer timing module 238 generates the answer timing information 254 based on an answer timing information request from the answer acquisition module 230 and where the answer acquisition module 230 generates the answer timing information request based on the query request 136.

Having obtained the content requirements information 248, the source requirements information 250, and the answer timing information 254, the answer acquisition module 230 determines whether to issue an IEI request 244 and/or a collections request 132 based on one or more of the content requirements information 248, the source requirements information 250, and the answer timing information 254. For example, the answer acquisition module 230 selects the IEI request 244 when an immediate answer to a simple query request 136 is required and is expected to have a favorable quality level. As another example, the answer acquisition module 230 selects the collections request 132 when a longer-term answer is required as indicated by the answer timing information to before and/or when the query request 136 has an unfavorable quality level.

When issuing the IEI request 244, the answer acquisition module 230 generates the IEI request 244 in accordance with security information 252 received from the content security module 236 and based on one or more of the content requirements information 248, the source requirements information 250, and the answer timing information 254. Having generated the IEI request 244, the answer acquisition module 230 sends the IEI request 244 to at least one IEI module.

When issuing the collections request 132, the answer acquisition module 230 generates the collections request 132 in accordance with the security information 252 received from the content security module 236 and based on one or more of the content requirements information 248, the source requirements information 250, and the answer timing information 254. Having generated the collections request 132, the answer acquisition module 230 sends the collections request 132 to at least one collections module. Alternatively, the answer acquisition module 230 facilitate sending of the collections request 132 to one or more various user devices (e.g., to access a subject matter expert).

The answer acquisition module 230 determines a quality level of a received answer extracted from a collections response 134 and/or an IEI response 246. For example, the answer acquisition module 230 extracts the quality level of the received answer from answer quality information 258 received from the answer quality module 242 in response to an answer quality request from the answer acquisition module 230. When the quality level is unfavorable, the answer acquisition module 230 facilitates obtaining a further answer. The facilitation includes issuing at least one of a further IEI request 244 and a further collections request 132 to generate a further answer for further quality testing. When the quality level is favorable, the answer acquisition module 230 issues a query response 140 to the requester. The issuing includes generating the query response 140 based on answer transformation information 256 received from the answer transformation module 240, where the answer transformation module 240 generates the answer transformation information 256 to include a transformed answer based on receiving the answer from the answer acquisition module 230. The answer transformation information 250 6A further include the question, a desired format of the answer, available formats, recommended formatting, received IEI responses, transformation instructions, and transformed IEI responses into an answer.

Figure 5D:
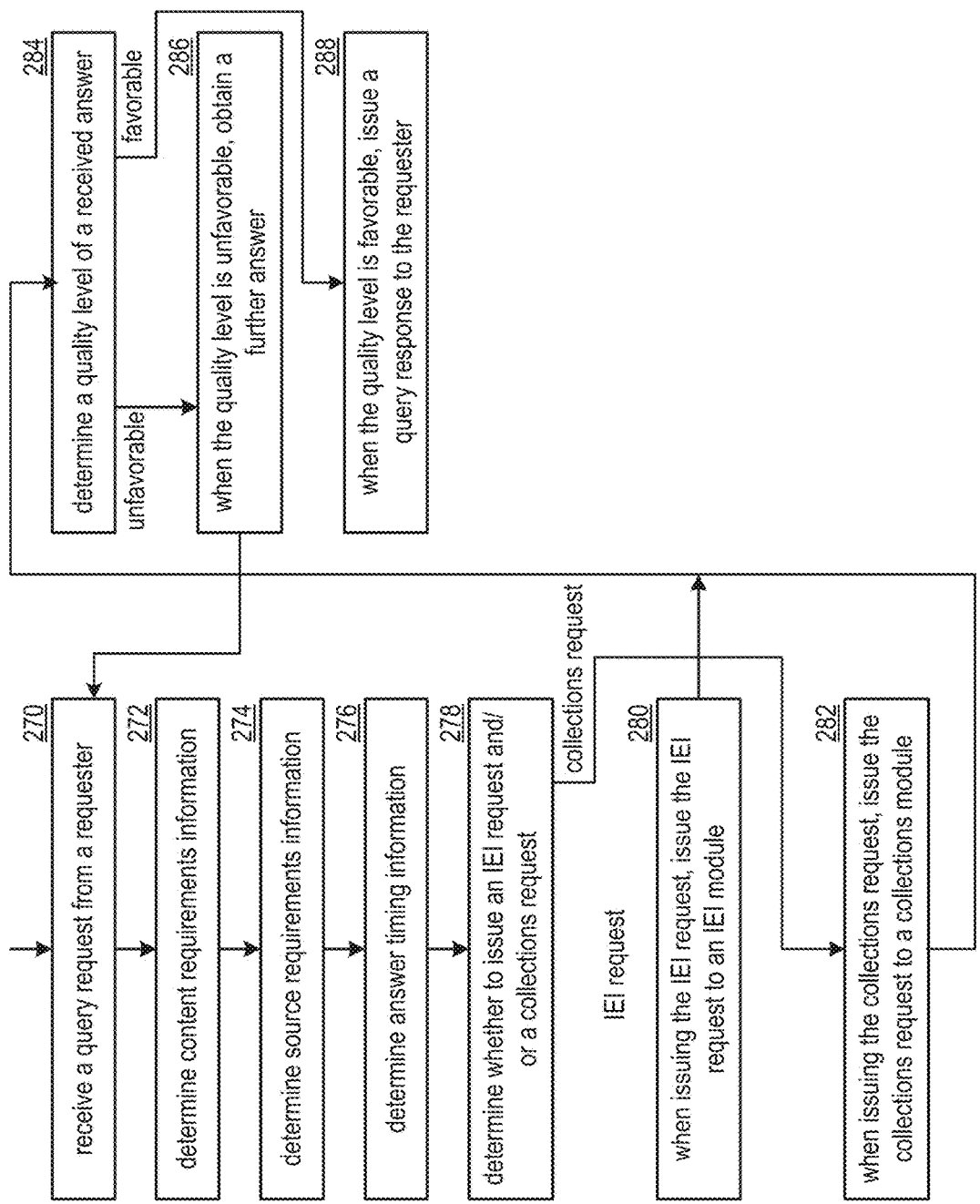
FIG. 5D is a logic diagram of an embodiment of a method for providing a response to a query within a computing system in accordance with the present invention.

FIG. 5D is a logic diagram of an embodiment of a method for providing a response to a query within a computing system. In particular, a method is presented for use in conjunction with one or more functions and features described in conjunction with FIGS. 1-3, 4A-4C, 5C, and also FIG. 5D. The method includes step 270 where a processing module of one or more processing modules of one or more computing devices of the computing system receives a query request (e.g., a question) from a requester. The method continues at step 272 where the processing module determines content requirements information. The determining includes interpreting the query request to produce the content requirements. The method continues at step 274 where the processing module determines source requirements information. The determining includes interpreting the query request to produce the source requirements. The method continues at step 276 where the processing module determines answer timing information. The determining includes interpreting the query request to produce the answer timing information.

The method continues at step 278 the processing module determines whether to issue an IEI request and/or a collections request. For example, the determining includes selecting the IEI request when the answer timing information indicates that a simple one-time answer is appropriate. As another example, the processing module selects the collections request when the answer timing information indicates that the answer is associated with a series of events over an event time frame.

When issuing the IEI request, the method continues at step 280 where the processing module issues the IEI request to an IEI module. The issuing includes generating the IEI request in accordance with security information and based on one or more of the content requirements information, the source requirements information, and the answer timing information.

When issuing the collections request, the method continues at step 282 where the processing module issues the collections request to a collections module. The issuing includes generating the collections request in accordance with the security information and based on one or more of the content requirements information, the source requirements information, and the answer timing information. Alternatively, the processing module issues both the IEI request and the collections request when a satisfactory partial answer may be provided based on a corresponding IEI response and a further more generalized and specific answer may be provided based on a corresponding collections response and associated further IEI response.

The method continues at step 284 where the processing module determines a quality level of a received answer. The determining includes extracting the answer from the collections response and/or the IEI response and interpreting the answer in accordance with one or more of the content requirements information, the source requirements information, the answer timing information, and the query request to produce the quality level. The method branches to step 288 when the quality level is favorable and the method continues to step 286 when the quality level is unfavorable. For example, the processing module indicates that the quality level is favorable when the quality level is equal to or greater than a minimum answer quality threshold level. As another example, the processing module indicates that the quality level is unfavorable when the quality level is less than the minimum answer quality threshold level.

When the quality level is unfavorable, the method continues at step 286 where the processing module obtains a further answer. The obtaining includes at least one of issuing a further IEI request and a further collections request to facilitate obtaining of a further answer for further answer quality level testing as the method loops back to step 270. When the quality level is favorable, the method continues at step 288 where the processing module issues a query response to the requester. The issuing includes transforming the answer into a transformed answer in accordance with an answer transformation approach (e.g., formatting, further interpretations of the virtual question in light of the answer and further knowledge) and sending the transformed answer to the requester as the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5E:
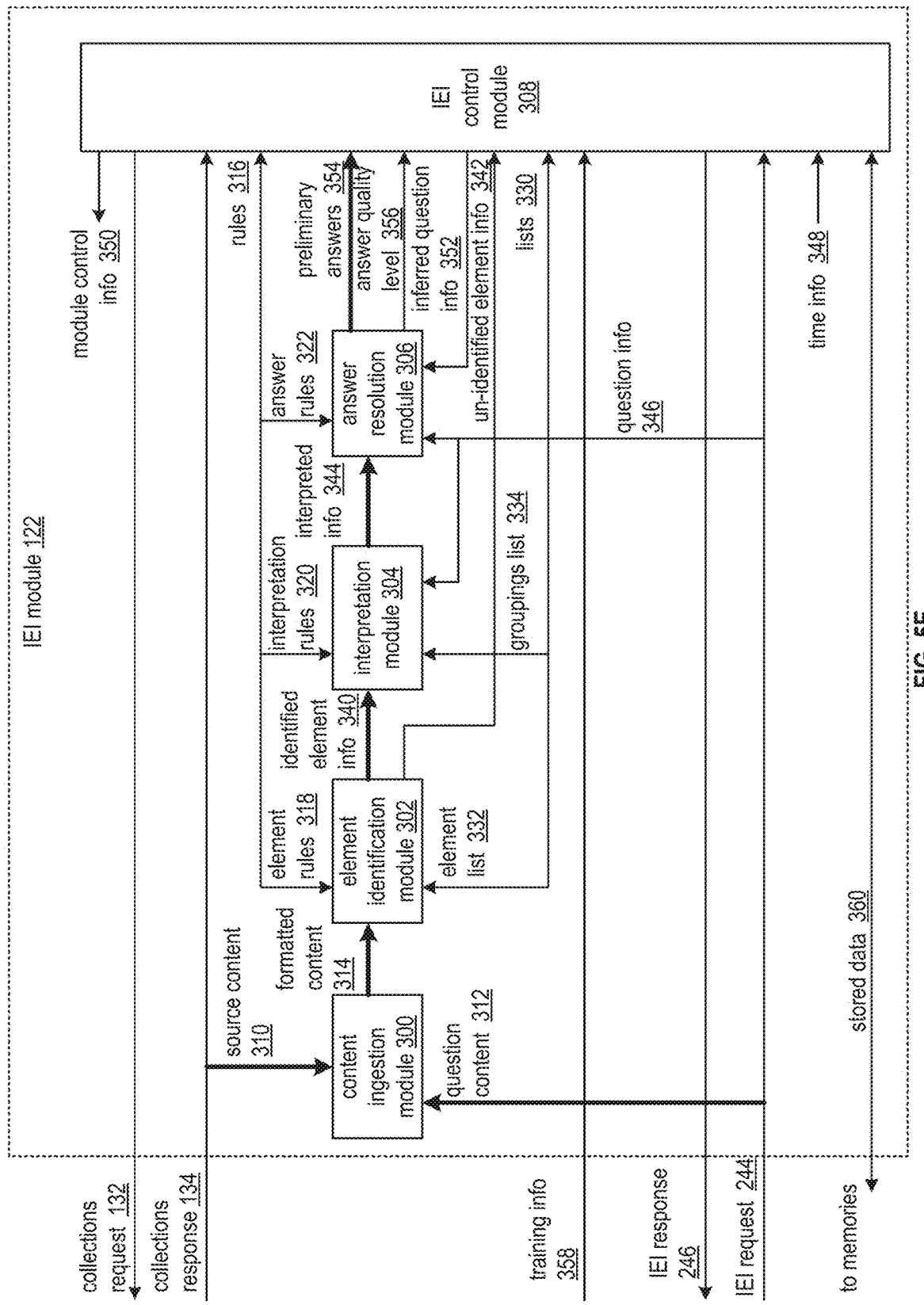
FIG. 5E is a schematic block diagram of an embodiment of an identigen entigen intelligence (IEI) module of a computing system in accordance with the present invention.

FIG. 5E is a schematic block diagram of an embodiment of the identigen entigen intelligence (IEI) module 122 of FIG. 4A that includes a content ingestion module 300, an element identification module 302, and interpretation module 304, and answer resolution module 306, and an IEI control module 308. Generally, an embodiment of this invention presents solutions where the IEI module 122 supports interpreting content to produce knowledge that may be utilized to answer questions.

In an example of operation of the producing and utilizing of the knowledge, the content ingestion module 300 generates formatted content 314 based on question content 312 and/or source content 310, where the IEI module 122 receives an IEI request 244 that includes the question content 312 and the IEI module 122 receives a collections response 134 that includes the source content 310. The source content 310 includes content from a source extracted from the collections response 134. The question content 312 includes content extracted from the IEI request 244 (e.g., content paired with a question). The content ingestion module 300 generates the formatted content 314 in accordance with a formatting approach (e.g., creating proper sentences from words of the content). The formatted content 314 includes modified content that is compatible with subsequent element identification (e.g., complete sentences, combinations of words and interpreted sounds and/or inflection cues with temporal associations of words).

The element identification module 302 processes the formatted content 314 based on element rules 318 and an element list 332 to produce identified element information 340. Rules 316 includes the element rules 318 (e.g., match, partial match, language translation, etc.). Lists 330 includes the element list 332 (e.g., element ID, element context ID, element usage ID, words, characters, symbols etc.). The IEI control module 308 may provide the rules 316 and the lists 330 by accessing stored data 360 from a memory associated with the IEI module 122. Generally, an embodiment of this invention presents solutions where the stored data 360 may further include one or more of a descriptive dictionary, categories, representations of element sets, element list, sequence data, pending questions, pending request, recognized elements, unrecognized elements, errors, etc.

The identified element information 340 includes one or more of identifiers of elements identified in the formatted content 314, may include ordering and/or sequencing and grouping information. For example, the element identification module 302 compares elements of the formatted content 314 to known elements of the element list 332 to produce identifiers of the known elements as the identified element information 340 in accordance with the element rules 318. Alternatively, the element identification module 302 outputs un-identified element information 342 to the IEI control module 308, where the un-identified element information 342 includes temporary identifiers for elements not identifiable from the formatted content 314 when compared to the element list 332.

The interpretation module 304 processes the identified element information 340 in accordance with interpretation rules 320 (e.g., potentially valid permutations of various combinations of identified elements), question information 346 (e.g., a question extracted from the IEI request 244 which may be paired with content associated with the question), and a groupings list 334 (e.g., representations of associated groups of representations of things, a set of element identifiers, valid element usage IDs in accordance with similar, an element context, permutations of sets of identifiers for possible interpretations of a sentence or other) to produce interpreted information 344. The interpreted information 344 includes potentially valid interpretations of combinations of identified elements. Generally, an embodiment of this invention presents solutions where the interpretation module 304 supports producing the interpreted information 344 by considering permutations of the identified element information 340 in accordance with the interpretation rules 320 and the groupings list 334.

The answer resolution module 306 processes the interpreted information 344 based on answer rules 322 (e.g., guidance to extract a desired answer), the question information 346, and inferred question information 352 (e.g., posed by the IEI control module or analysis of general collections of content or refinement of a stated question from a request) to produce preliminary answers 354 and an answer quality level 356. The answer generally lies in the interpreted information 344 as both new content received and knowledge based on groupings list 334 generated based on previously received content. The preliminary answers 354 includes an answer to a stated or inferred question that subject further refinement. The answer quality level 356 includes a determination of a quality level of the preliminary answers 354 based on the answer rules 322. The inferred question information 352 may further be associated with time information 348, where the time information includes one or more of current real-time, a time reference associated with entity submitting a request, and a time reference of a collections response.

When the IEI control module 308 determines that the answer quality level 356 is below an answer quality threshold level, the IEI control module 308 facilitates collecting of further content (e.g., by issuing a collections request 132 and receiving corresponding collections responses 134 for analysis). When the answer quality level 356 compares favorably to the answer quality threshold level, the IEI control module 308 issues an IEI response 246 based on the preliminary answers 354. When receiving training information 358, the IEI control module 308 facilitates updating of one or more of the lists 330 and the rules 316 and stores the updated list 330 and the updated rules 316 in the memories as updated stored data 360.

Figure 5F:
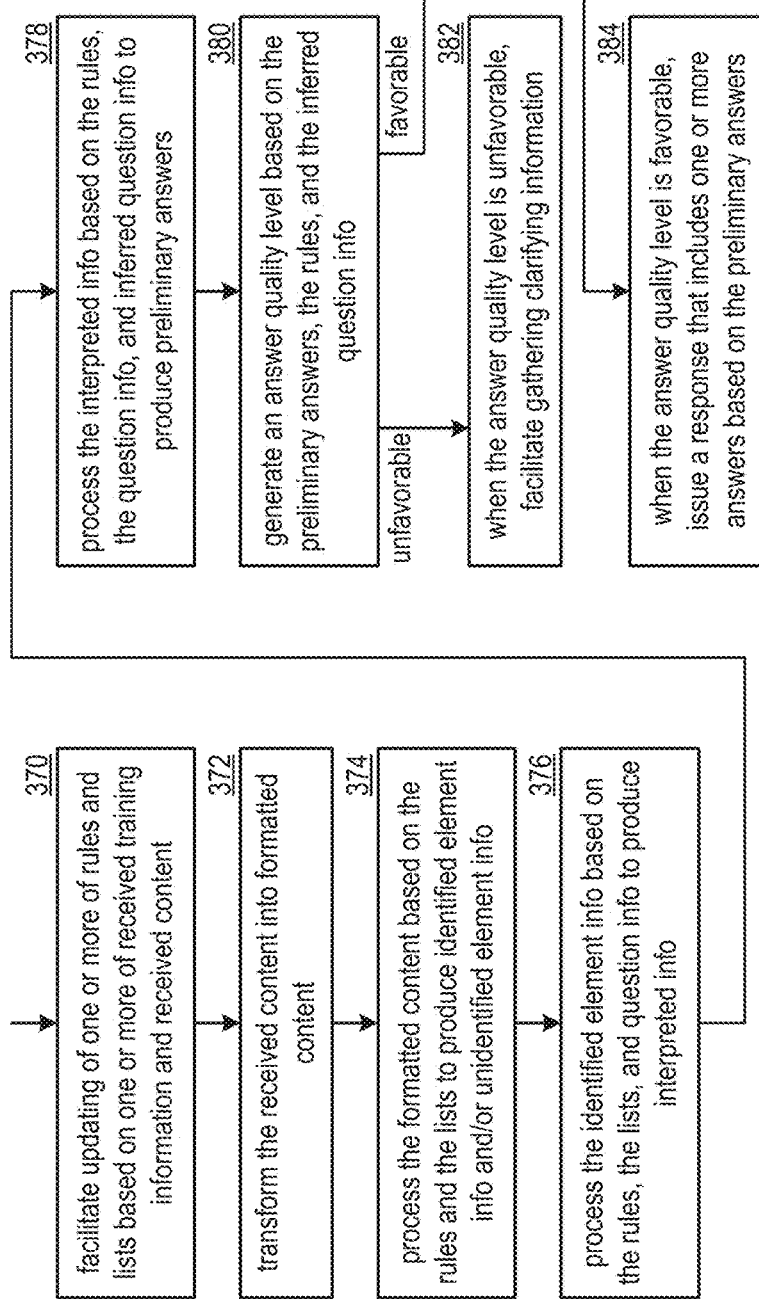
FIG. 5F is a logic diagram of an embodiment of a method for analyzing content within a computing system in accordance with the present invention.

FIG. 5F is a logic diagram of an embodiment of a method for analyzing content within a computing system. In particular, a method is presented for use in conjunction with one or more functions and features described in conjunction with FIGS. 1-3, 4A-4C, 5E, and also FIG. 5F. The method includes step 370 where a processing module of one or more processing modules of one or more computing devices of the computing system facilitates updating of one or more rules and lists based on one or more of received training information and received content. For example, the processing module updates rules with received rules to produce updated rules and updates element lists with received elements to produce updated element lists. As another example, the processing module interprets the received content to identify a new word for at least temporary inclusion in the updated element list.

The method continues at step 372 where the processing module transforms at least some of the received content into formatted content. For example, the processing module processes the received content in accordance with a transformation approach to produce the formatted content, where the formatted content supports compatibility with subsequent element identification (e.g., typical sentence structures of groups of words).

The method continues at step 374 where the processing module processes the formatted content based on the rules and the lists to produce identified element information and/or an identified element information. For example, the processing module compares the formatted content to element lists to identify a match producing identifiers for identified elements or new identifiers for unidentified elements when there is no match.

The method continues at step 376 with a processing module processes the identified element information based on rules, the lists, and question information to produce interpreted information. For example, the processing module compares the identified element information to associated groups of representations of things to generate potentially valid interpretations of combinations of identified elements.

The method continues at step 378 where the processing module processes the interpreted information based on the rules, the question information, and inferred question information to produce preliminary answers. For example, the processing module matches the interpreted information to one or more answers (e.g., embedded knowledge based on a fact base built from previously received content) with highest correctness likelihood levels that is subject to further refinement.

The method continues at step 380 where the processing module generates an answer quality level based on the preliminary answers, the rules, and the inferred question information. For example, the processing module predicts the answer correctness likelihood level based on the rules, the inferred question information, and the question information. The method branches to step 384 when the answer quality level is favorable and the method continues to step 382 when the answer quality level is unfavorable. For example, the generating of the answer quality level further includes the processing module indicating that the answer quality level is favorable when the answer quality level is greater than or equal to a minimum answer quality threshold level. As another example, the generating of the answer quality level further includes the processing module indicating that the answer quality level is unfavorable when the answer quality level is less than the minimum answer quality threshold level.

When the answer quality level is unfavorable, the method continues at step 382 where the processing module facilitates gathering clarifying information. For example, the processing module issues a collections request to facilitate receiving further content and or request question clarification from a question requester. When the answer quality level is favorable, the method continues at step 384 where the processing module issues a response that includes one or more answers based on the preliminary answers and/or further updated preliminary answers based on gathering further content. For example, the processing module generates a response that includes one or more answers and the answer quality level and issues the response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6A:
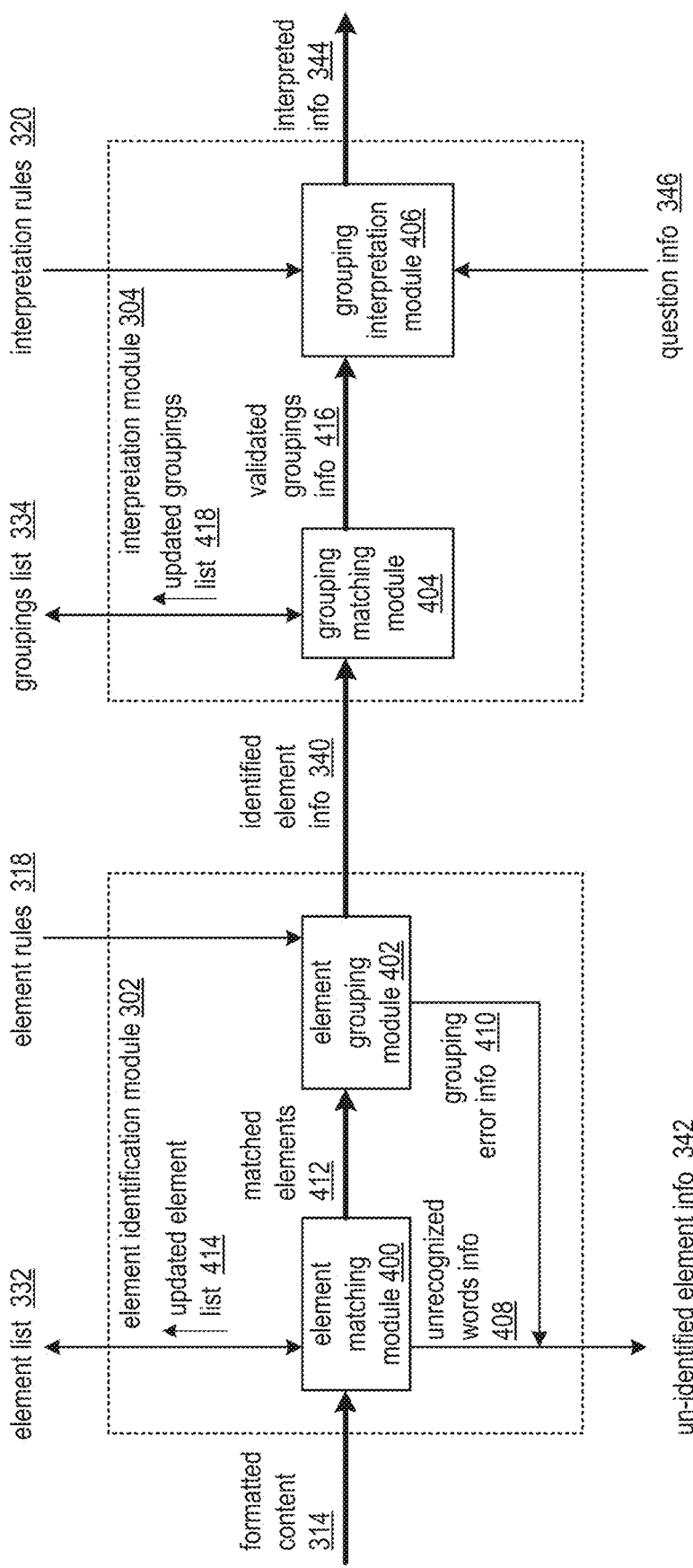
FIG. 6A is a schematic block diagram of an embodiment of an element identification module and an interpretation module of a computing system in accordance with the present invention.

FIG. 6A is a schematic block diagram of an embodiment of the element identification module 302 of FIG. 5A and the interpretation module 304 of FIG. 5A. The element identification module 302 includes an element matching module 400 and an element grouping module 402. The interpretation module 304 includes a grouping matching module 404 and a grouping interpretation module 406. Generally, an embodiment of this invention presents solutions where the element identification module 302 supports identifying potentially valid permutations of groupings of elements while the interpretation module 304 interprets the potentially valid permutations of groupings of elements to produce interpreted information that includes the most likely of groupings based on a question.

In an example of operation of the identifying of the potentially valid permutations of groupings of elements, when matching elements of the formatted content 314, the element matching module 400 generates matched elements 412 (e.g., identifiers of elements contained in the formatted content 314) based on the element list 332. For example, the element matching module 400 matches a received element to an element of the element list 332 and outputs the matched elements 412 to include an identifier of the matched element. When finding elements that are unidentified, the element matching module 400 outputs un-recognized words information 408 (e.g., words not in the element list 332, may temporarily add) as part of un-identified element information 342. For example, the element matching module 400 indicates that a match cannot be made between a received element of the formatted content 314, generates the unrecognized words info 408 to include the received element and/or a temporary identifier, and issues and updated element list 414 that includes the temporary identifier and the corresponding unidentified received element.

The element grouping module 402 analyzes the matched elements 412 in accordance with element rules 318 to produce grouping error information 410 (e.g., incorrect sentence structure indicators) when a structural error is detected. The element grouping module 402 produces identified element information 340 when favorable structure is associated with the matched elements in accordance with the element rules 318. The identified element information 340 may further include grouping information of the plurality of permutations of groups of elements (e.g., several possible interpretations), where the grouping information includes one or more groups of words forming an associated set and/or super-group set of two or more subsets when subsets share a common core element.

In an example of operation of the interpreting of the potentially valid permutations of groupings of elements to produce the interpreted information, the grouping matching module 404 analyzes the identified element information 340 in accordance with a groupings list 334 to produce validated groupings information 416. For example, the grouping matching module 404 compares a grouping aspect of the identified element information 340 (e.g., for each permutation of groups of elements of possible interpretations), generates the validated groupings information 416 to include identification of valid permutations aligned with the groupings list 334. Alternatively, or in addition to, the grouping matching module 404 generates an updated groupings list 418 when determining a new valid grouping (e.g., has favorable structure and interpreted meaning) that is to be added to the groupings list 334.

The grouping interpretation module 406 interprets the validated groupings information 416 based on the question information 346 and in accordance with the interpretation rules 320 to produce interpreted information 344 (e.g., most likely interpretations, next most likely interpretations, etc.). For example, the grouping interpretation module 406 obtains context, obtains favorable historical interpretations, processes the validated groupings based on interpretation rules 320, where each interpretation is associated with a correctness likelihood level.

Figure 6B:
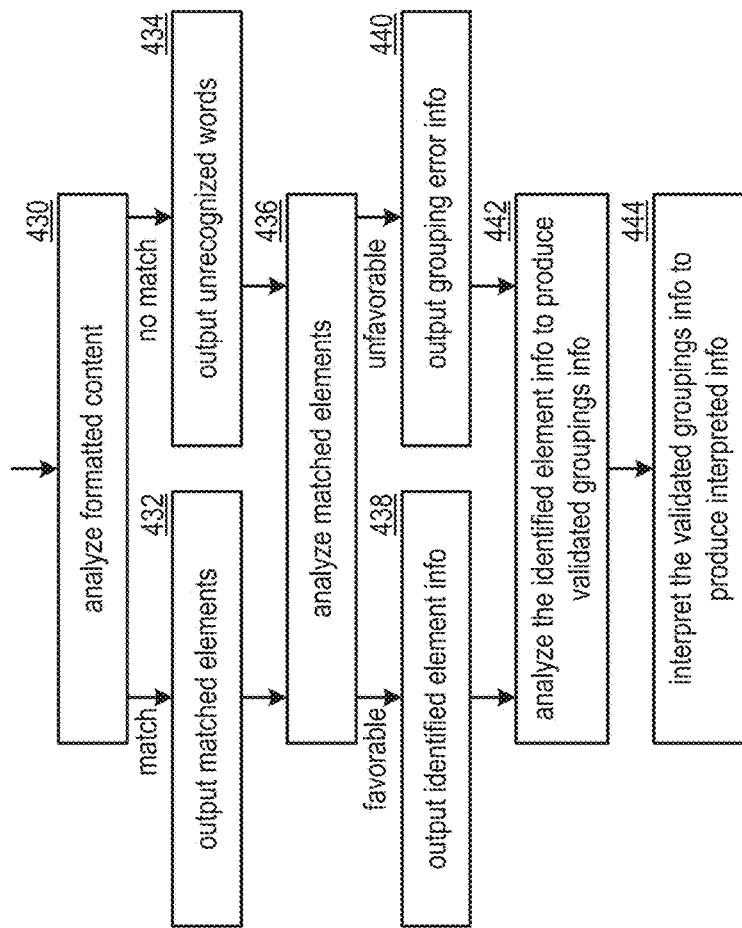
FIG. 6B is a logic diagram of an embodiment of a method for interpreting information within a computing system in accordance with the present invention.

FIG. 6B is a logic diagram of an embodiment of a method for interpreting information within a computing system. In particular, a method is presented for use in conjunction with one or more functions and features described in conjunction with FIGS. 1-3, 4A-4C, 5E-5F, 6A, and also FIG. 6B. The method includes step 430 where a processing module of one or more processing modules of one or more computing devices of the computing system analyzes formatted content. For example, the processing module attempt to match a received element of the formatted content to one or more elements of an elements list. When there is no match, the method branches to step 434 and when there is a match, the method continues to step 432. When there is a match, the method continues at step 432 where the processing module outputs matched elements (e.g., to include the matched element and/or an identifier of the matched element). When there is no match, the method continues at step 434 where the processing module outputs unrecognized words (e.g., elements and/or a temporary identifier for the unmatched element).

The method continues at step 436 where the processing module analyzes matched elements. For example, the processing module attempt to match a detected structure of the matched elements (e.g., chained elements as in a received sequence) to favorable structures in accordance with element rules. The method branches to step 440 when the analysis is unfavorable and the method continues to step 438 when the analysis is favorable. When the analysis is favorable matching a detected structure to the favorable structure of the element rules, the method continues at step 438 where the processing module outputs identified element information (e.g., an identifier of the favorable structure, identifiers of each of the detected elements). When the analysis is unfavorable matching a detected structure to the favorable structure of the element rules, the method continues at step 440 where the processing module outputs grouping error information (e.g., a representation of the incorrect structure, identifiers of the elements of the incorrect structure, a temporary new identifier of the incorrect structure).

The method continues at step 442 where the processing module analyzes the identified element information to produce validated groupings information. For example, the processing module compares a grouping aspect of the identified element information and generates the validated groupings information to include identification of valid permutations that align with the groupings list. Alternatively, or in addition to, the processing module generates an updated groupings list when determining a new valid grouping.

The method continues at step 444 where the processing module interprets the validated groupings information to produce interpreted information. For example, the processing module obtains one or more of context and historical interpretations and processes the validated groupings based on interpretation rules to generate the interpreted information, where each interpretation is associated with a correctness likelihood level (e.g., a quality level).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6C:
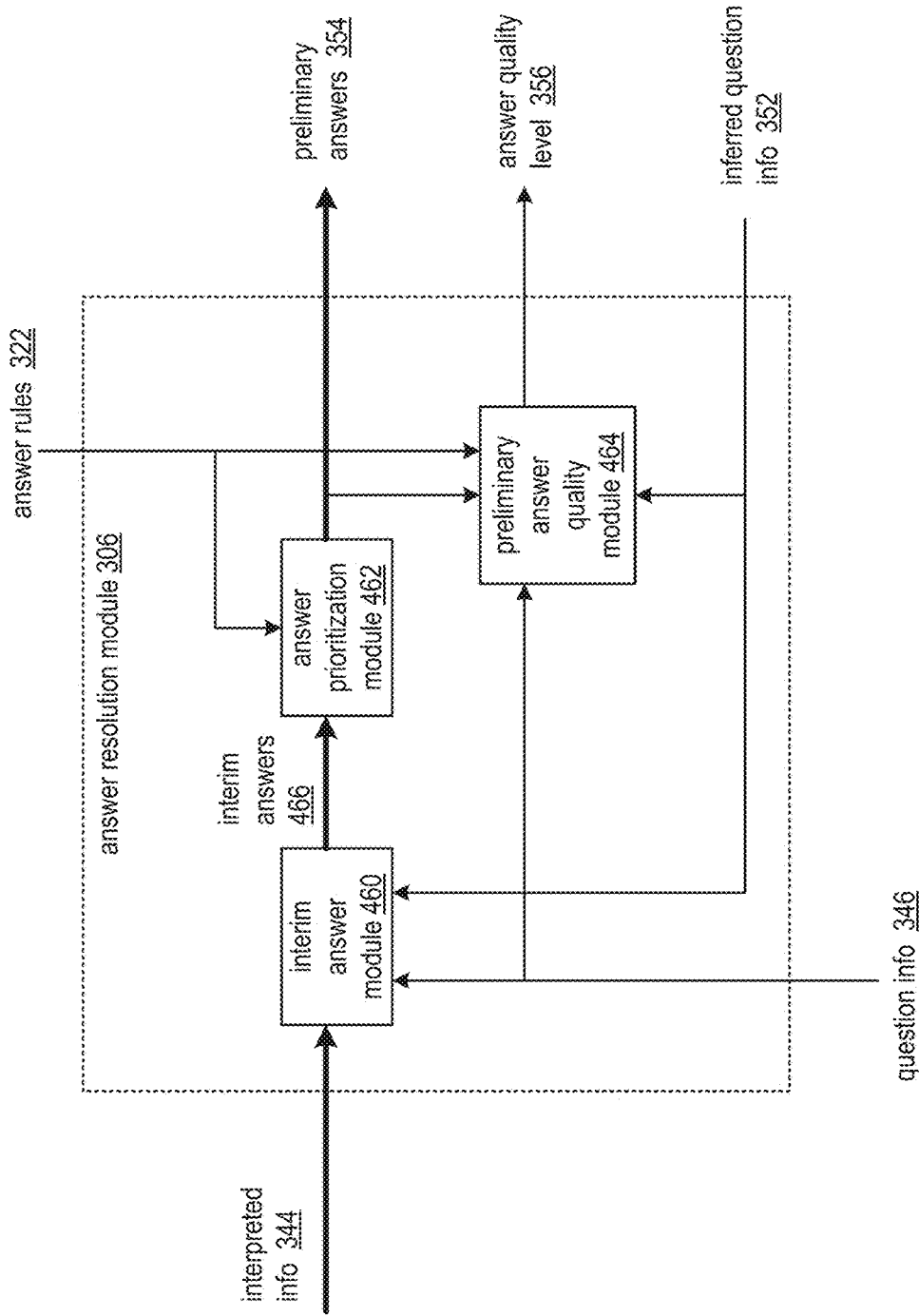
FIG. 6C is a schematic block diagram of an embodiment of an answer resolution module of a computing system in accordance with the present invention.

FIG. 6C is a schematic block diagram of an embodiment of the answer resolution module 306 of FIG. 5A that includes an interim answer module 460, and answer prioritization module 462, and a preliminary answer quality module 464. Generally, an embodiment of this invention presents solutions where the answer resolution module 306 supports producing an answer for interpreted information 344.

In an example of operation of the providing of the answer, the interim answer module 460 analyzes the interpreted information 344 based on question information 346 and inferred question information 352 to produce interim answers 466 (e.g., answers to stated and/or inferred questions without regard to rules that is subject to further refinement). The answer prioritization module 462 analyzes the interim answers 466 based on answer rules 322 to produce preliminary answer 354. For example, the answer prioritization module 462 identifies all possible answers from the interim answers 466 that conform to the answer rules 322.

The preliminary answer quality module 464 analyzes the preliminary answers 354 in accordance with the question information 346, the inferred question information 352, and the answer rules 322 to produce an answer quality level 356. For example, for each of the preliminary answers 354, the preliminary answer quality module 464 may compare a fit of the preliminary answer 354 to a corresponding previous answer and question quality level, calculate the answer quality level 356 based on a level of conformance to the answer rules 322, calculate the answer quality level 356 based on alignment with the inferred question information 352, and determine the answer quality level 356 based on an interpreted correlation with the question information 346.

Figure 6D:
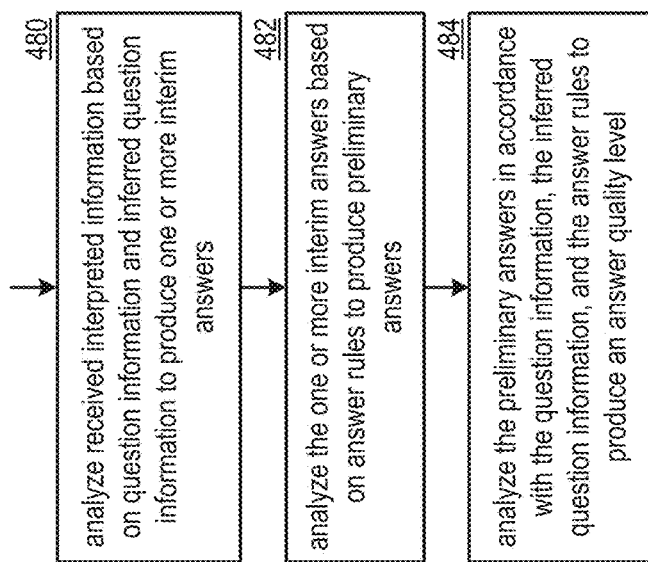
FIG. 6D is a logic diagram of an embodiment of a method for producing an answer within a computing system in accordance with the present invention.

FIG. 6D is a logic diagram of an embodiment of a method for producing an answer within a computing system. In particular, a method is presented for use in conjunction with one or more functions and features described in conjunction with FIGS. 1-3, 4A-4C, 5E-5F, 6C, and also FIG. 6D. The method includes step 480 where a processing module of one or more processing modules of one or more computing devices of the computing system analyzes received interpreted information based on question information and inferred question information to produce one or more interim answers. For example, the processing module generates potential answers based on patterns consistent with previously produced knowledge and likelihood of correctness.

The method continues at step 482 where the processing module analyzes the one or more interim answers based on answer rules to produce preliminary answers. For example, the processing module identifies all possible answers from the interim answers that conform to the answer rules. The method continues at step 484 where the processing module analyzes the preliminary answers in accordance with the question information, the inferred question information, and the answer rules to produce an answer quality level. For example, for each of the elementary answers, the processing module may compare a fit of the preliminary answer to a corresponding previous answer-and-answer quality level, calculate the answer quality level based on performance to the answer rules, calculate answer quality level based on alignment with the inferred question information, and determine the answer quality level based on interpreted correlation with the question information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 7A:
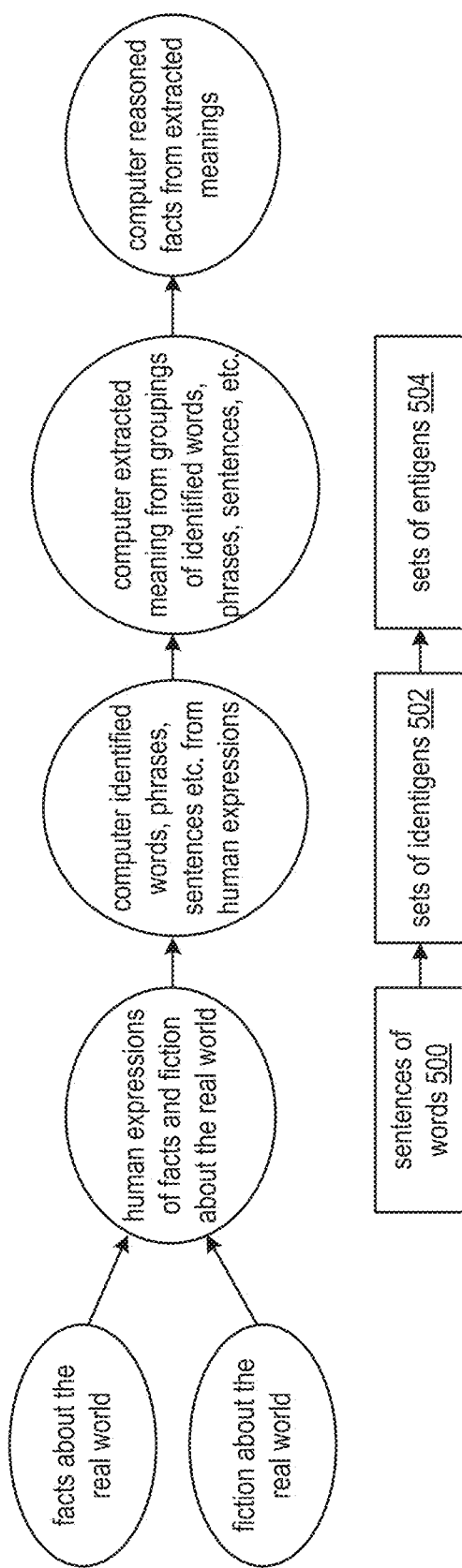
FIG. 7A is an information flow diagram for interpreting information within a computing system in accordance with the present invention.

FIG. 7A is an information flow diagram for interpreting information within a computing system, where sets of entigens 504 are interpreted from sets of identigens 502 which are interpreted from sentences of words 500. Such identigen entigen intelligence (IEI) processing of the words (e.g., to IEI process) includes producing one or more of interim knowledge, a preliminary answer, and an answer quality level. For example, the IEI processing includes identifying permutations of identigens of a phrase of a sentence (e.g., interpreting human expressions to produce identigen groupings for each word of ingested content), reducing the permutations of identigens (e.g., utilizing rules to eliminate unfavorable permutations), mapping the reduced permutations of identigens to at least one set of entigens (e.g., most likely identigens become the entigens) to produce the interim knowledge, processing the knowledge in accordance with a knowledge base (e.g., comparing the set of entigens to the knowledge base) to produce a preliminary answer, and generating the answer quality level based on the preliminary answer for a corresponding domain.

Human expressions are utilized to portray facts and fiction about the real world. The real-world includes items, actions, and attributes. The human expressions include textual words, textual symbols, images, and other sensorial information (e.g., sounds). It is known that many words, within a given language, can mean different things based on groupings and orderings of the words. For example, the sentences of words 500 can include many different forms of sentences that mean vastly different things even when the words are very similar.

The present invention presents solutions where the computing system 10 supports producing a computer-based representation of a truest meaning possible of the human expressions given the way that multitudes of human expressions relate to these meanings. As a first step of the flow diagram to transition from human representations of things to a most precise computer representation of the things, the computer identifies the words, phrases, sentences, etc. from the human expressions to produce the sets of identigens 502. Each identigen includes an identifier of their meaning and an identifier of an instance for each possible language, culture, etc. For example, the words car and automobile share a common meaning identifier but have different instance identifiers since they are different words and are spelled differently. As another example, the word duck is associated both with a bird and an action to elude even though they are spelled the same. In this example the bird duck has a different meaning than the elude duck and as such each has a different meaning identifier of the corresponding identigens.

As a second step of the flow diagram to transition from human representations of things to the most precise computer representation of the things, the computer extracts meaning from groupings of the identified words, phrases, sentences, etc. to produce the sets of entigens 504. Each entigen includes an identifier of a single conceivable and perceivable thing in space and time (e.g., independent of language and other aspects of the human expressions). For example, the words car and automobile are different instances of the same meaning and point to a common shared entigen. As another example, the word duck for the bird meaning has an associated unique entigen that is different than the entigen for the word duck for the elude meaning.

As a third step of the flow diagram to transition from human expressions of things to the most precise computer representation of the things, the computer reasons facts from the extracted meanings. For example, the computer maintains a fact-based of the valid meanings from the valid groupings or sets of entigens so as to support subsequent inferences, deductions, rationalizations of posed questions to produce answers that are aligned with a most factual view. As time goes on, and as an entigen has been identified, it can encounter an experience transformations in time, space, attributes, actions, and words which are used to identify it without creating contradictions or ever losing its identity.

Figure 7B:
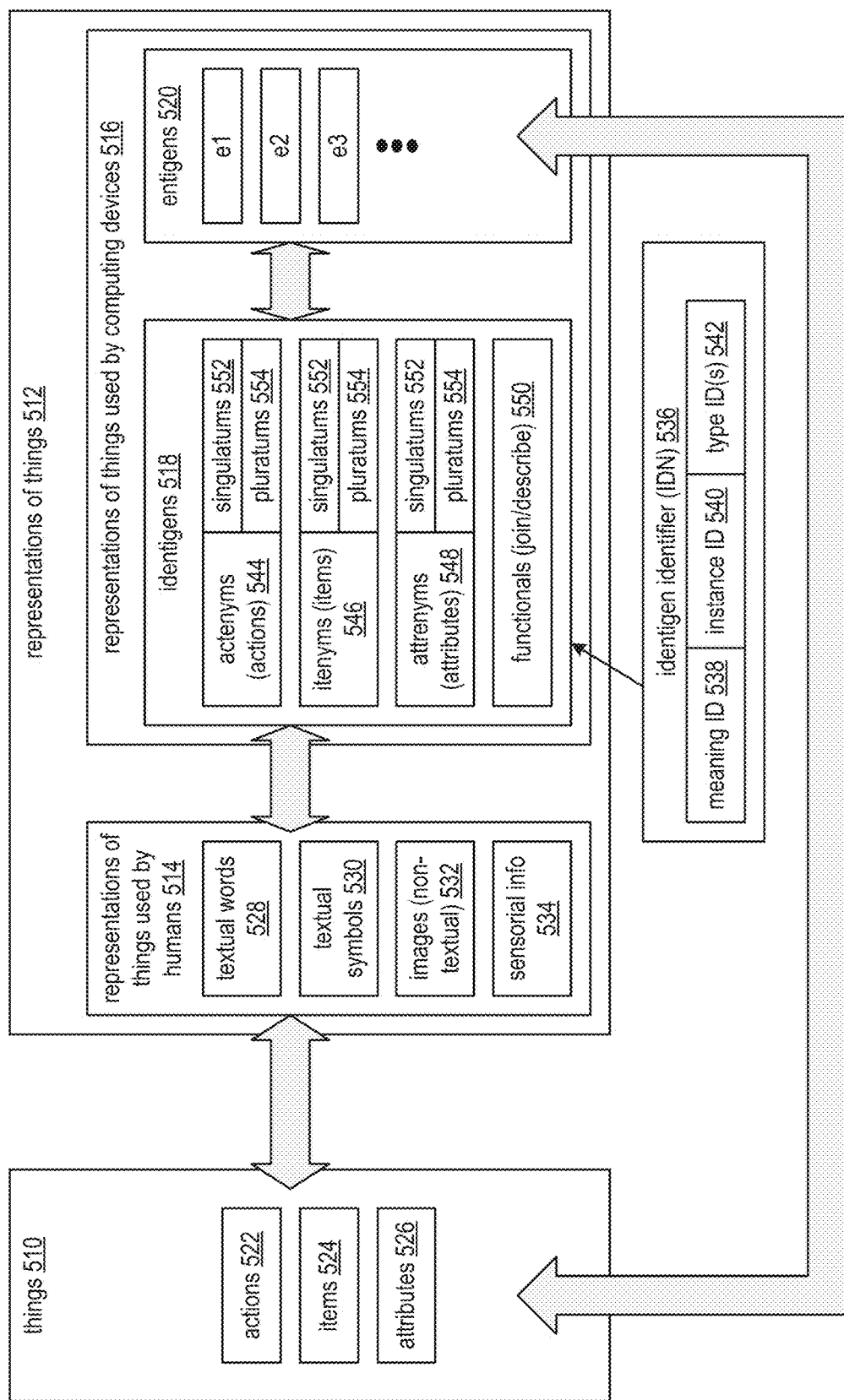
FIG. 7B is a relationship block diagram illustrating an embodiment of relationships between things and representations of things within a computing system in accordance with the present invention.

FIG. 7B is a relationship block diagram illustrating an embodiment of relationships between things 510 and representations of things 512 within a computing system. The things 510 includes conceivable and perceivable things including actions 522, items 524, and attributes 526. The representation of things 512 includes representations of things used by humans 514 and representation of things used by of computing devices 516 of embodiments of the present invention. The things 510 relates to the representations of things used by humans 514 where the invention presents solutions where the computing system 10 supports mapping the representations of things used by humans 514 to the representations of things used by computing devices 516, where the representations of things used by computing devices 516 map back to the things 510.

The representations of things used by humans 514 includes textual words 528, textual symbols 530, images (e.g., non-textual) 532, and other sensorial information 534 (e.g., sounds, sensor data, electrical fields, voice inflections, emotion representations, facial expressions, whistles, etc.). The representations of things used by computing devices 516 includes identigens 518 and entigens 520. The representations of things used by humans 514 maps to the identigens 518 and the identigens 518 map to the entigens 520. The entigens 520 uniquely maps back to the things 510 in space and time, a truest meaning the computer is looking for to create knowledge and answer questions based on the knowledge.

To accommodate the mapping of the representations of things used by humans 514 to the identigens 518, the identigens 518 is partitioned into actenyms 544 (e.g., actions), itenyms 546 (e.g., items), attrenyms 548 (e.g., attributes), and functionals 550 (e.g., that join and/or describe). Each of the actenyms 544, itenyms 546, and attrenyms 548 may be further classified into singulatums 552 (e.g., identify one unique entigen) and pluratums 554 (e.g., identify a plurality of entigens that have similarities).

Each identigen 518 is associated with an identigens identifier (IDN) 536. The IDN 536 includes a meaning identifier (ID) 538 portion, an instance ID 540 portion, and a type ID 542 portion. The meaning ID 538 includes an identifier of common meaning. The instance ID 540 includes an identifier of a particular word and language. The type ID 542 includes one or more identifiers for actenyms, itenyms, attrenyms, singulatums, pluratums, a time reference, and any other reference to describe the IDN 536. The mapping of the representations of things used by humans 514 to the identigens 518 by the computing system of the present invention includes determining the identigens 518 in accordance with logic and instructions for forming groupings of words.

Generally, an embodiment of this invention presents solutions where the identigens 518 map to the entigens 520. Multiple identigens may map to a common unique entigen. The mapping of the identigens 518 to the entigens 520 by the computing system of the present invention includes determining entigens in accordance with logic and instructions for forming groupings of identigens.

FIG. 7C is a diagram of an embodiment of a synonym words table 570 within a computing system, where the synonym words table 570 includes multiple fields including textual words 572, identigens 518, and entigens 520. The identigens 518 includes fields for the meaning identifier (ID) 538 and the instance ID 540. The computing system of the present invention may utilize the synonym words table 570 to map textual words 572 to identigens 518 and map the identigens 518 to entigens 520. For example, the words car, automobile, auto, bil (Swedish), carro (Spanish), and bil (Danish) all share a common meaning but are different instances (e.g., different words and languages). The words map to a common meaning ID but to individual unique instant identifiers. Each of the different identigens map to a common entigen since they describe the same thing.

FIG. 7D is a diagram of an embodiment of a polysemous words table 576 within a computing system, where the polysemous words table 576 includes multiple fields including textual words 572, identigens 518, and entigens 520. The identigens 518 includes fields for the meaning identifier (ID) 538 and the instance ID 540. The computing system of the present invention may utilize the polysemous words table 576 to map textual words 572 to identigens 518 and map the identigens 518 to entigens 520. For example, the word duck maps to four different identigens since the word duck has four associated different meanings (e.g., bird, fabric, to submerge, to elude) and instances. Each of the identigens represent different things and hence map to four different entigens.

FIG. 7E is a diagram of an embodiment of transforming words into groupings within a computing system that includes a words table 580, a groupings of words section to validate permutations of groupings, and a groupings table 584 to capture the valid groupings. The words table 580 includes multiple fields including textual words 572, identigens 518, and entigens 520. The identigens 518 includes fields for the meaning identifier (ID) 538, the instance ID 540, and the type ID 542. The computing system of the present invention may utilize the words table 580 to map textual words 572 to identigens 518 and map the identigens 518 to entigens 520. For example, the word pilot may refer to a flyer and the action to fly. Each meaning has a different identigen and different entigen.

The computing system the present invention may apply rules to the fields of the words table 580 to validate various groupings of words. Those that are invalid are denoted with a "X" while those that are valid are associated with a check mark. For example, the grouping "pilot Tom" is invalid when the word pilot refers to flying and Tom refers to a person. The identigen combinations for the flying pilot and the person Tom are denoted as invalid by the rules. As another example, the grouping "pilot Tom" is valid when the word pilot refers to a flyer and Tom refers to the person. The identigen combinations for the flyer pilot and the person Tom are denoted as valid by the rules.

The groupings table 584 includes multiple fields including grouping ID 586, word strings 588, identigens 518, and entigens 520. The computing system of the present invention may produce the groupings table 584 as a stored fact base for valid and/or invalid groupings of words identified by their corresponding identigens. For example, the valid grouping "pilot Tom" referring to flyer Tom the person is represented with a grouping identifier of 3001 and identity and identifiers 150.001 and 457.001. The entigen field 520 may indicate associated entigens that correspond to the identigens. For example, entigen e717 corresponds to the flyer pilot meaning and entigen e61 corresponds to the time the person meaning. Alternatively, or in addition to, the entigen field 520 may be populated with a single entigen identifier (ENI).

The word strings field 588 may include any number of words in a string. Different ordering of the same words can produce multiple different strings and even different meanings and hence entigens. More broadly, each entry (e.g., role) of the groupings table 584 may refer to groupings of words, two or more word strings, an idiom, just identigens, just entigens, and/or any combination of the preceding elements. Each entry has a unique grouping identifier. An idiom may have a unique grouping ID and include identifiers of original word identigens and replacing identigens associated with the meaning of the idiom not just the meaning of the original words. Valid groupings may still have ambiguity on their own and may need more strings and/or context to select a best fit when interpreting a truest meaning of the grouping.

Figure 8A:
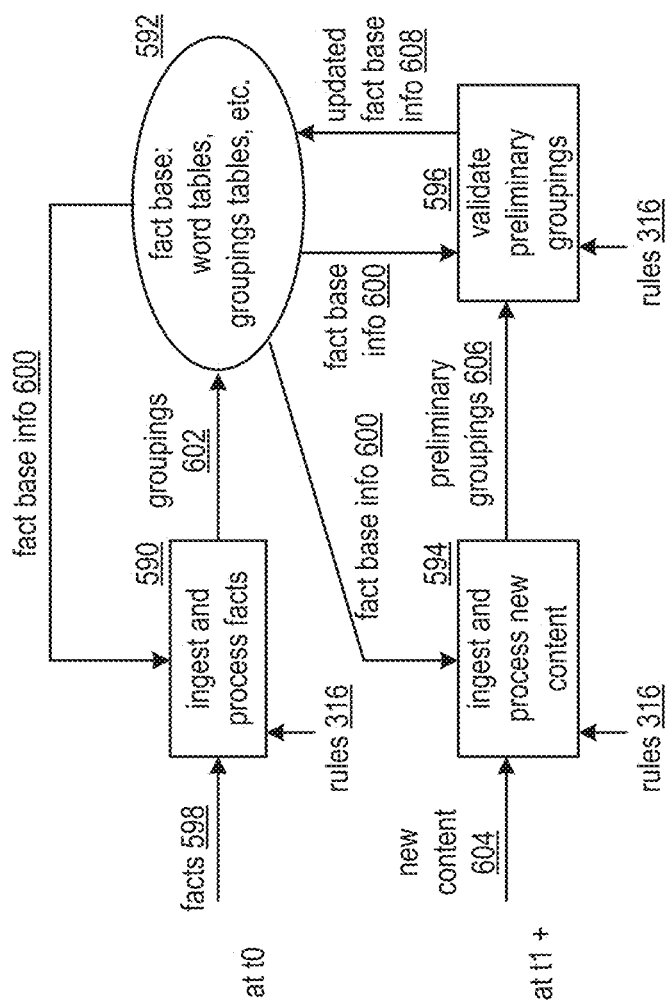
FIG. 8A is a data flow diagram for accumulating knowledge within a computing system in accordance with the present invention.

FIG. 8A is a data flow diagram for accumulating knowledge within a computing system, where a computing device, at a time=t0, ingests and processes facts 598 at a step 590 based on rules 316 and fact base information 600 to produce groupings 602 for storage in a fact base 592 (e.g., words, phrases, word groupings, identigens, entigens, quality levels). The facts 598 may include information from books, archive data, Central intelligence agency (CIA) world fact book, trusted content, etc. The ingesting may include filtering to organize and promote better valid groupings detection (e.g., considering similar domains together). The groupings 602 includes one or more of groupings identifiers, identigen identifiers, entigen identifiers, and estimated fit quality levels. The processing step 590 may include identifying identigens from words of the facts 598 in accordance with the rules 316 and the fact base info 600 and identifying groupings utilizing identigens in accordance with rules 316 and fact base info 600.

Subsequent to ingestion and processing of the facts 598 to establish the fact base 592, at a time=t1+, the computing device ingests and processes new content 604 at a step 594 in accordance with the rules 316 and the fact base information 600 to produce preliminary grouping 606. The new content may include updated content (e.g., timewise) from periodicals, newsfeeds, social media, etc. The preliminary grouping 606 includes one or more of preliminary groupings identifiers, preliminary identigen identifiers, preliminary entigen identifiers, estimated fit quality levels, and representations of unidentified words.

The computing device validates the preliminary groupings 606 at a step 596 based on the rules 316 and the fact base info 600 to produce updated fact base info 608 for storage in the fact base 592. The validating includes one or more of reasoning a fit of existing fact base info 600 with the new preliminary grouping 606, discarding preliminary groupings, updating just time frame information associated with an entry of the existing fact base info 600 (e.g., to validate knowledge for the present), creating new entigens, and creating a median entigen to summarize portions of knowledge within a median indicator as a quality level indicator (e.g., suggestive not certain).

Storage of the updated fact base information 608 captures patterns that develop by themselves instead of searching for patterns as in prior art artificial intelligence systems. Growth of the fact base 592 enables subsequent reasoning to create new knowledge including deduction, induction, inference, and inferential sentiment (e.g., a chain of sentiment sentences). Examples of sentiments includes emotion, beliefs, convictions, feelings, judgments, notions, opinions, and views.

FIG. 8B is a diagram of an embodiment of a groupings table 620 within a computing system. The groupings table 620 includes multiple fields including grouping ID 586, word strings 588, an IF string 622 and a THEN string 624. Each of the fields for the IF string 622 and the THEN string 624 includes fields for an identigen (IDN) string 626, and an entigen (ENI) string 628. The computing system of the present invention may produce the groupings table 620 as a stored fact base to enable IF THEN based inference to generate a new knowledge inference 630.

As a specific example, grouping 5493 points out the logic of IF someone has a tumor, THEN someone is sick and the grouping 5494 points out the logic that IF someone is sick, THEN someone is sad. As a result of utilizing inference, the new knowledge inference 630 may produce grouping 5495 where IF someone has a tumor, THEN someone is possibly sad (e.g., or is sad).

Figure 8C:
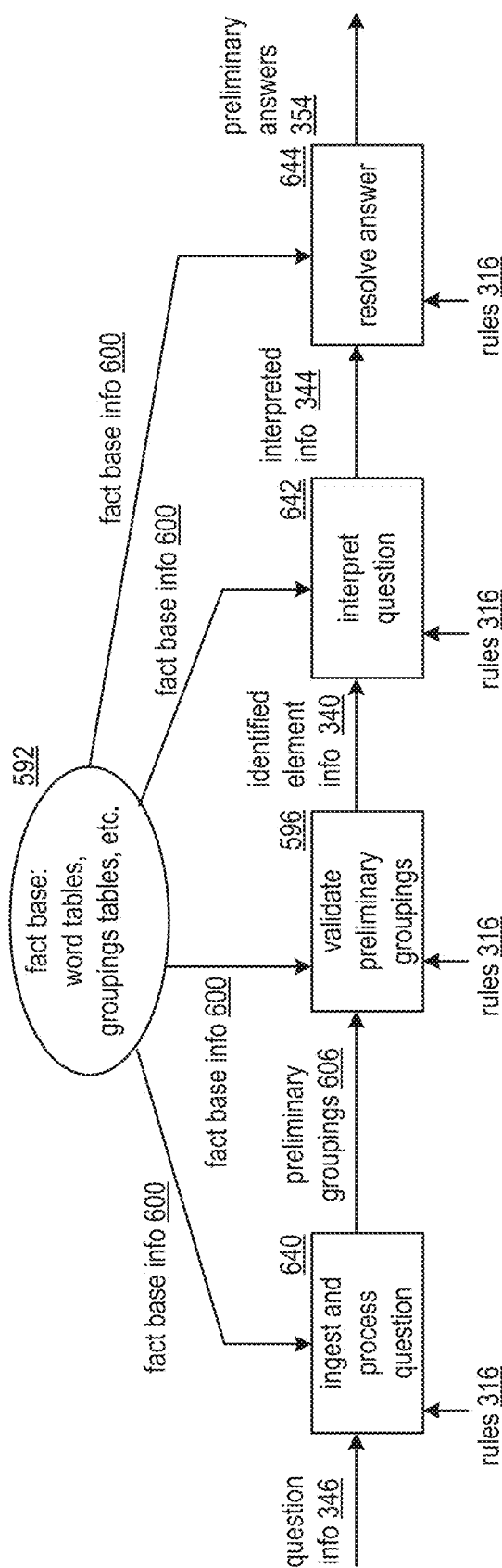
FIG. 8C is a data flow diagram for answering questions utilizing accumulated knowledge within a computing system in accordance with the present invention.

FIG. 8C is a data flow diagram for answering questions utilizing accumulated knowledge within a computing system, where a computing device ingests and processes question information 346 at a step 640 based on rules 316 and fact base info 600 from a fact base 592 to produce preliminary grouping 606. The ingesting and processing questions step 640 includes identifying identigens from words of a question in accordance with the rules 316 and the fact base information 600 and may also include identifying groupings from the identified identigens in accordance with the rules 316 and the fact base information 600.

The computing device validates the preliminary grouping 606 at a step 596 based on the rules 316 and the fact base information 600 to produce identified element information 340. For example, the computing device reasons fit of existing fact base information with new preliminary groupings 606 to produce the identified element information 340 associated with highest quality levels. The computing device interprets a question of the identified element information 340 at a step 642 based on the rules 316 and the fact base information 600. The interpreting of the question may include separating new content from the question and reducing the question based on the fact base information 600 and the new content.

The computing device produces preliminary answers 354 from the interpreted information 344 at a resolve answer step 644 based on the rules 316 and the fact base information 600. For example, the computing device compares the interpreted information 344 two the fact base information 600 to produce the preliminary answers 354 with highest quality levels utilizing one or more of deduction, induction, inferencing, and applying inferential sentiments logic. Alternatively, or in addition to, the computing device may save new knowledge identified from the question information 346 to update the fact base 592.

Figure 8D:
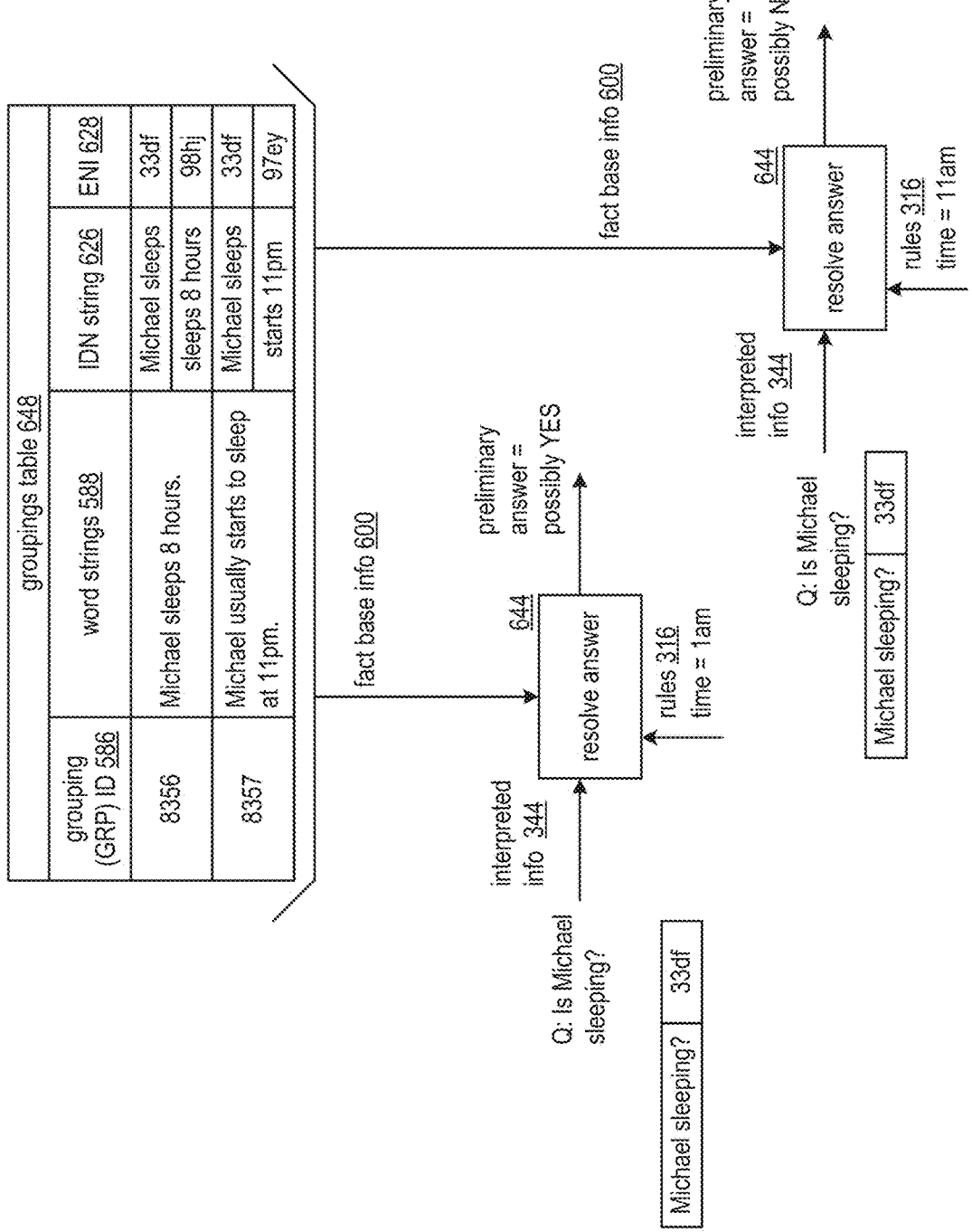
FIG. 8D is a data flow diagram for answering questions utilizing interference within a computing system in accordance with the present invention.

FIG. 8D is a data flow diagram for answering questions utilizing interference within a computing system that includes a groupings table 648 and the resolve answer step 644 of FIG. 8C. The groupings table 648 includes multiple fields including fields for a grouping (GRP) identifier (ID) 586, word strings 588, an identigen (IDN) string 626, and an entigen (ENI) 628. The groupings table 648 may be utilized to build a fact base to enable resolving a future question into an answer. For example, the grouping 8356 notes knowledge that Michael sleeps eight hours and grouping 8357 notes that Michael usually starts to sleep at 11 PM.

In a first question example that includes a question "Michael sleeping?", the resolve answer step 644 analyzes the question from the interpreted information 344 in accordance with the fact base information 600, the rules 316, and a real-time indicator that the current time is 1 AM to produce a preliminary answer of "possibly YES" when inferring that Michael is probably sleeping at 1 AM when Michael usually starts sleeping at 11 PM and Michael usually sleeps for a duration of eight hours.

In a second question example that includes the question "Michael sleeping?", the resolve answer step 644 analyzes the question from the interpreted information 344 in accordance with the fact base information 600, the rules 316, and a real-time indicator that the current time is now 11 AM to produce a preliminary answer of "possibly NO" when inferring that Michael is probably not sleeping at 11 AM when Michael usually starts sleeping at 11 PM and Michael usually sleeps for a duration of eight hours.

Figure 8E:
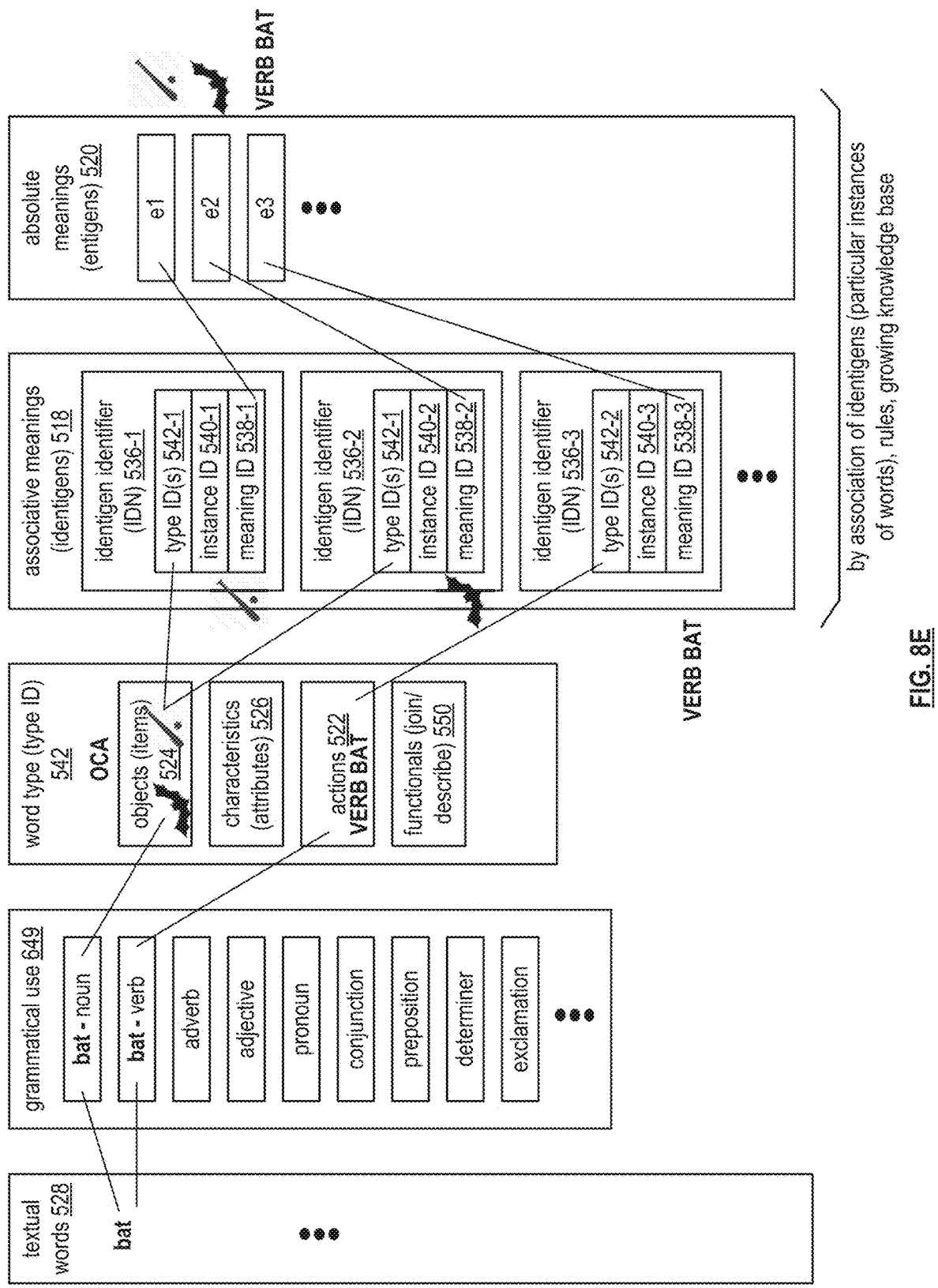
FIG. 8E is a relationship block diagram illustrating another embodiment of relationships between things and representations of things within a computing system in accordance with the present invention.

FIG. 8E is a relationship block diagram illustrating another embodiment of relationships between things and representations of things within a computing system. While things in the real world are described with words, it is often the case that a particular word has multiple meanings in isolation. Interpreting the meaning of the particular word may hinge on analyzing how the word is utilized in a phrase, a sentence, multiple sentences, paragraphs, and even whole documents or more. Describing and stratifying the use of words, word types, and possible meanings help in interpreting a true meaning.

Humans utilize textual words 528 to represent things in the real world. Quite often a particular word has multiple instances of different grammatical use when part of a phrase of one or more sentences. The grammatical use 649 of words includes the nouns and the verbs, and also includes adverbs, adjectives, pronouns, conjunctions, prepositions, determiners, exclamations, etc.

As an example of multiple grammatical use, the word "bat" in the English language can be utilized as a noun or a verb. For instance, when utilized as a noun, the word "bat" may apply to a baseball bat or may apply to a flying "bat." As another instance, when utilized as a verb, the word "bat" may apply to the action of hitting or batting an object, i.e., "bat the ball."

To stratify word types by use, the words are associated with a word type (e.g., type identifier 542). The word types include objects (e.g., items 524), characteristics (e.g., attributes 526), actions 522, and the functionals 550 for joining other words and describing words. For example, when the word "bat" is utilized as a noun, the word is describing the object of either the baseball bat or the flying bat. As another example, when the word "bat" is utilized as a verb, the word is describing the action of hitting.

To determine possible meanings, the words, by word type, are mapped to associative meanings (e.g., identigens 518). For each possible associative meaning, the word type is documented with the meaning and further with an identifier (ID) of the instance (e.g., an identigen identifier).

For the example of the word "bat" when utilized as a noun for the baseball bat, a first identigen identifier 536-1 includes a type ID 542-1 associated with the object 524, an instance ID 540-1 associated with the first identigen identifier (e.g., unique for the baseball bat), and a meaning ID 538-1 associated with the baseball bat. For the example of the word "bat" when utilized as a noun for the flying bat, a second identigen identifier 536-2 includes a type ID 542-1 associated with the object 524, an instance ID 540-2 associated with the second identigen identifier (e.g., unique for the flying bat), and a meaning ID 538-2 associated with the flying bat. For the example of the word "bat" when utilized as a verb for the bat that hits, a third identigen identifier 536-2 includes a type ID 542-2 associated with the actions 522, an instance ID 540-3 associated with the third identigen identifier (e.g., unique for the bat that hits), and a meaning ID 538-3 associated with the bat that hits.

With the word described by a type and possible associative meanings, a combination of full grammatical use of the word within the phrase etc., application of rules, and utilization of an ever-growing knowledge base that represents knowledge by linked entigens, the absolute meaning (e.g., entigen 520) of the word is represented as a unique entigen. For example, a first entigen e1 represents the absolute meaning of a baseball bat (e.g., a generic baseball bat not a particular baseball bat that belongs to anyone), a second entigen e2 represents the absolute meaning of the flying bat (e.g., a generic flying bat not a particular flying bat), and a third entigen e3 represents the absolute meaning of the verb bat (e.g., to hit).

An embodiment of methods to ingest text to produce absolute meanings for storage in a knowledge base are discussed in greater detail with reference to FIGS. 8F-H. Those embodiments further discuss the discerning of the grammatical use, the use of the rules, and the utilization of the knowledge base to definitively interpret the absolute meaning of a string of words.

Another embodiment of methods to respond to a query to produce an answer based on knowledge stored in the knowledge base are discussed in greater detail with reference to FIGS. 8J-L. Those embodiments further discuss the discerning of the grammatical use, the use of the rules, and the utilization of the knowledge base to interpret the query. The query interpretation is utilized to extract the answer from the knowledge base to facilitate forming the query response.

Figure 8F:
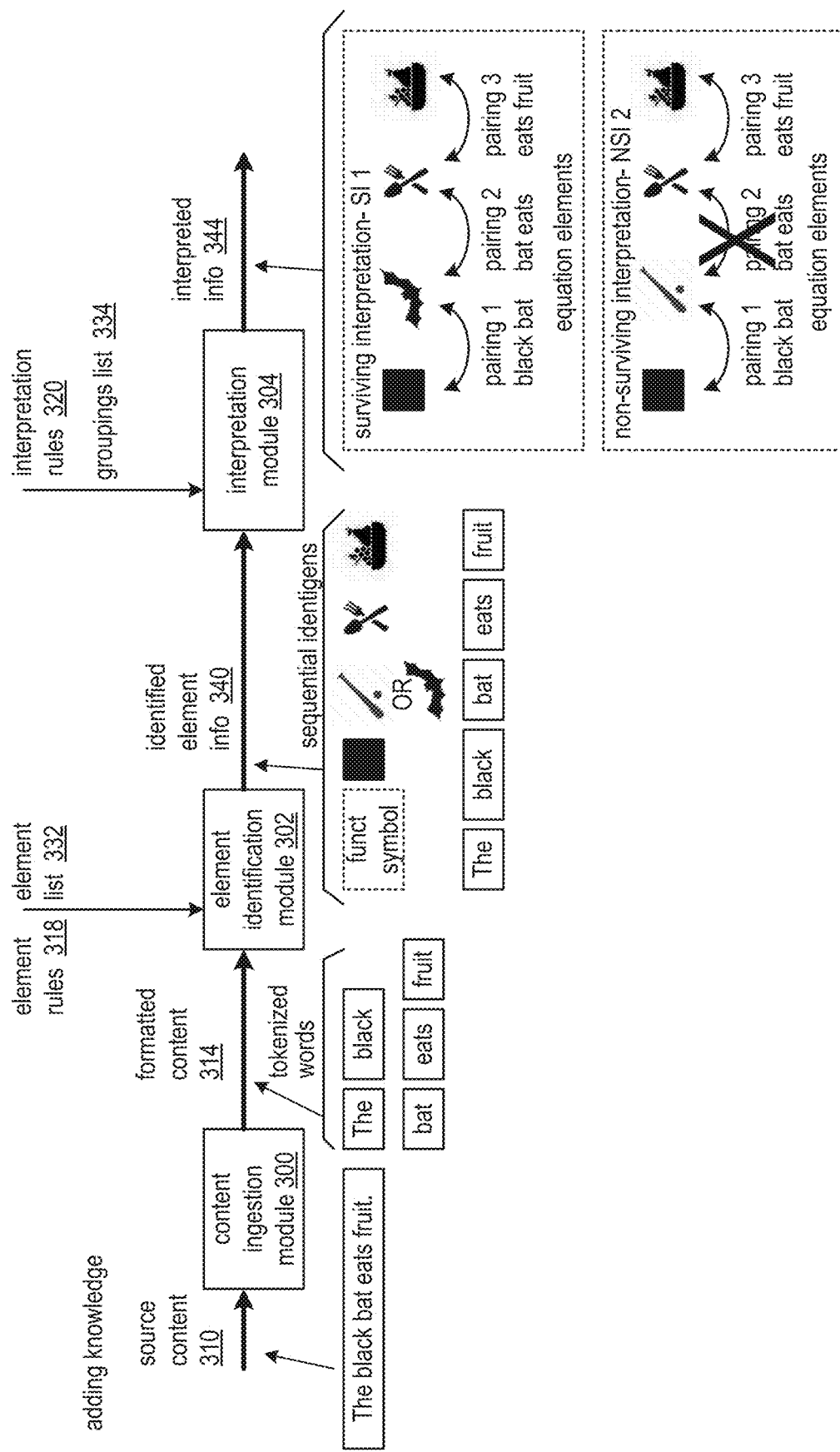
FIGS. 8F and 8G are schematic block diagrams of another embodiment of a computing system in accordance with the present invention.
Figure 8G:
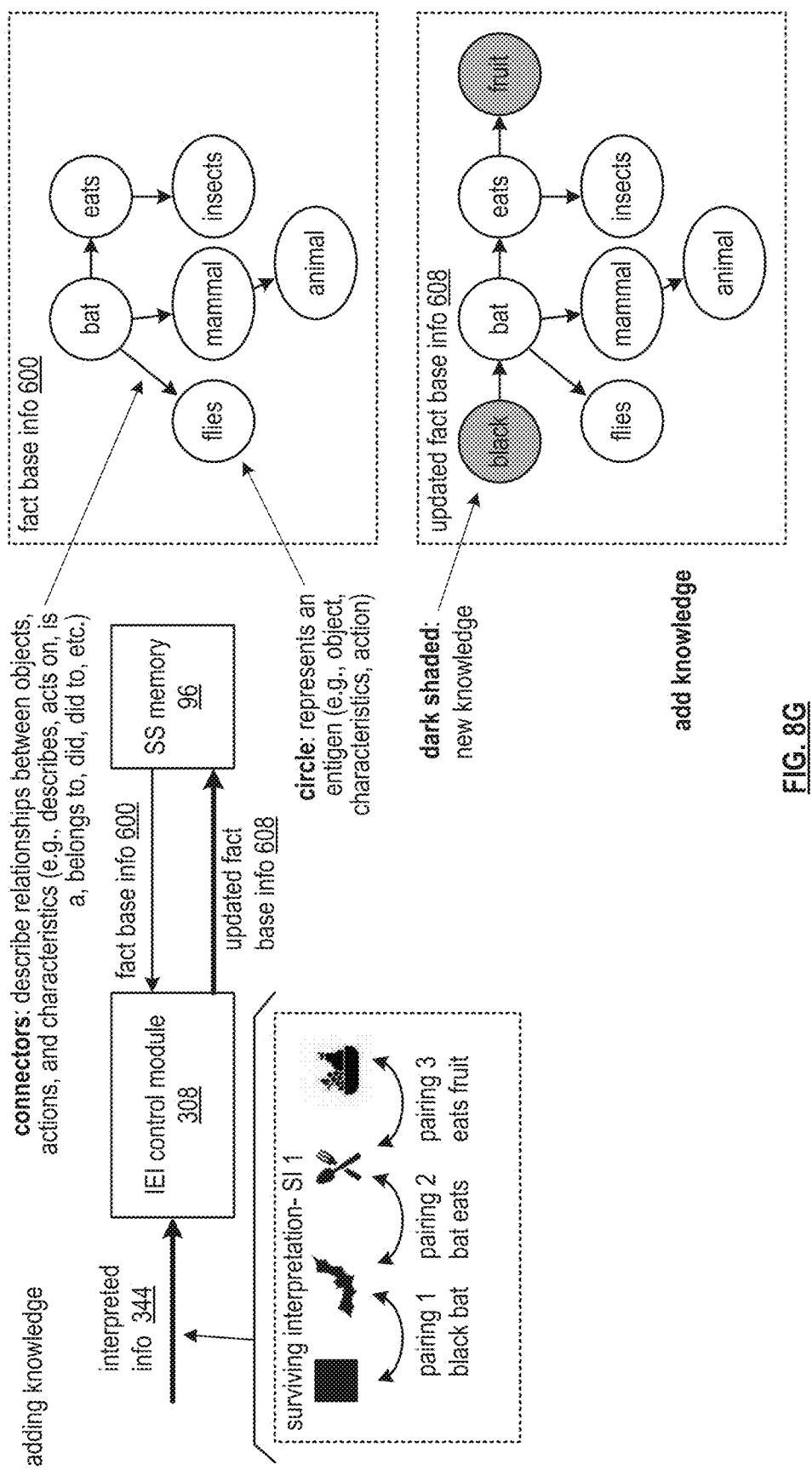

FIGS. 8F and 8G are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention provides presents solutions where the computing system 10 supports processing content to produce knowledge for storage in a knowledge base.

The processing of the content to produce the knowledge includes a series of steps. For example, a first step includes identifying words of an ingested phrase to produce tokenized words. As depicted in FIG. 8F, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word, where each identigen describes one of an object, a characteristic, and an action. As depicted in FIG. 8F, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word (e.g. sequential identigens). For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation), where the equation package includes a sequential linking of pairs of identigens (e.g., relationships), where each sequential linking pairs a preceding identigen to a next identigen, and where an equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 8F, a specific example of the third step includes the interpretation module 304, for each permutation of identigens of each tokenized word of the identified element information 340, the interpretation module 304 generates, in accordance with interpretation rules 320 and a groupings list 334, an equation package to include one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation). For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit, and the interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 8F, a specific example of the fourth step includes the interpretation module 304 applying interpretation rules 320 (i.e., inference, pragmatic engine, utilizing the identifiers of the identigens to match against known valid combinations of identifiers of entigens) to reduce a number of permutations of the sequential combinations of identigens to produce interpreted information 344 that includes identification of at least one equation package as a surviving interpretation SI (e.g., higher quality metric level).

Non-surviving equation packages are eliminated that compare unfavorably to pairing rules and/or are associated with an unfavorable quality metric levels to produce a non-surviving interpretation NSI 2 (e.g., lower quality metric level), where an overall quality metric level may be assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the "baseball bat eats" which is inconsistent with a desired quality metric level of one or more of the groupings list 334 and the interpretation rules 320 and selects the equation package associated with the "flying bat eats" which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge base. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge base, subsequent access to the knowledge base may utilize structured query language (SQL) queries.

As depicted in FIG. 8G, a specific example of the fifth step includes the IEI control module 308 recovering fact base information 600 from SS memory 96 to identify a portion of the knowledge base for potential modification utilizing the OCAs of the surviving interpretation SI 1 (i.e., compare a pattern of relationships between the OCAs of the surviving interpretation SI 1 from the interpreted information 344 to relationships of OCAs of the portion of the knowledge base including potentially new quality metric levels).

The fifth step further includes determining modifications (e.g., additions, subtractions, further clarifications required when information is complex, etc.) to the portion of the knowledge base based on the new quality metric levels. For instance, the IEI control module 308 causes adding the element "black" as a "describes" relationship of an existing bat OCA and adding the element "fruit" as an eats "does to" relationship to implement the modifications to the portion of the fact base information 600 to produce updated fact base information 608 for storage in the SS memory 96.

Figure 8H:
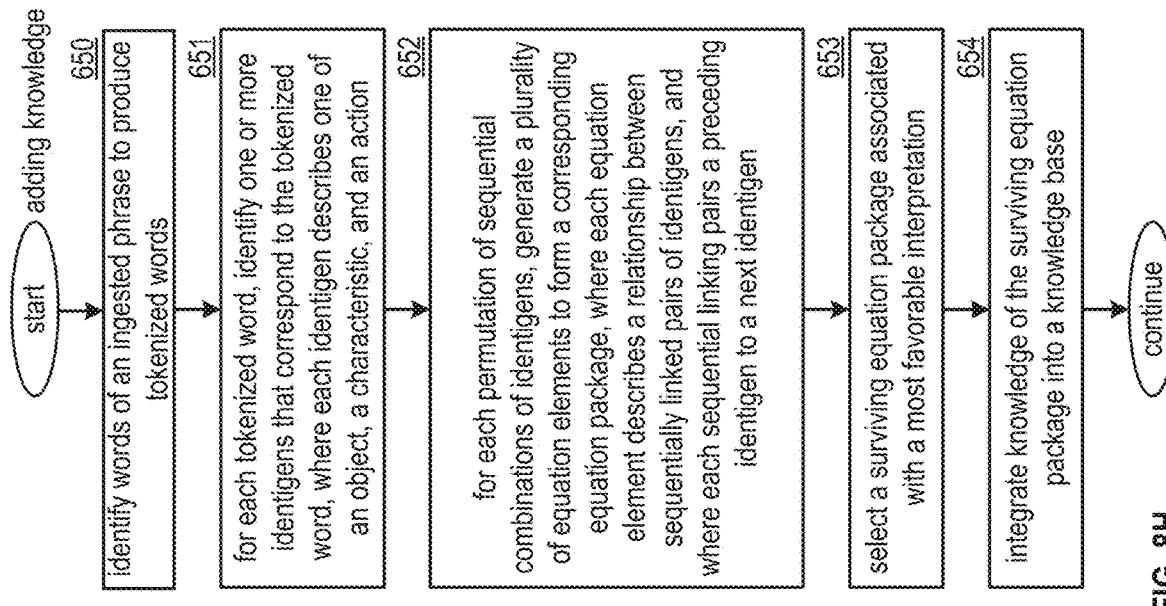
FIG. 8H is a logic diagram of an embodiment of a method for processing content to produce knowledge within a computing system in accordance with the present invention.

FIG. 8H is a logic diagram of an embodiment of a method for processing content to produce knowledge for storage within a computing system. In particular, a method is presented for use in conjunction with one or more functions and features described in conjunction with FIGS. 1-8E, 8F, and also FIG. 8G. The method includes step 650 where a processing module of one or more processing modules of one or more computing devices of the computing system identifies words of an ingested phrase to produce tokenized words. The identifying includes comparing words to known words of dictionary entries to produce identifiers of known words.

For each tokenized word, the method continues at step 651 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where the different identifiers associated with each of the potential object, the characteristic, and the action associated with the tokenized word.

The method continues at step 652 where the processing module, for each permutation of sequential combinations of identigens, generates a plurality of equation elements to form a corresponding equation package, where each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements, where each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 653 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package, where non-surviving equation packages are eliminated the compare unfavorably to pairing rules and/or are associated with an unfavorable quality metric levels to produce a non-surviving interpretation, where an overall quality metric level is assigned to each equation package based on quality metric levels of each pairing, such that a higher quality metric level indicates an equation package with a higher probability of favorability of correctness.

The method continues at step 654 where the processing module integrates knowledge of the surviving equation package into a knowledge base. For example, the processing module integrates at least a portion of the reduced OCA combinations into a graphical database to produce updated knowledge. The integrating may include recovering fact base information from storage of the knowledge base to identify a portion of the knowledge base for potential modifications utilizing the OCAs of the surviving equation package (i.e., compare a pattern of relationships between the OCAs of the surviving equation package to relationships of the OCAs of the portion of the knowledge base including potentially new quality metric levels). The integrating further includes determining modifications (e.g., additions, subtractions, further clarifications required when complex information is presented, etc.) to produce the updated knowledge base that is based on fit of acceptable quality metric levels, and implementing the modifications to the portion of the fact base information to produce the updated fact base information for storage in the portion of the knowledge base.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8J:
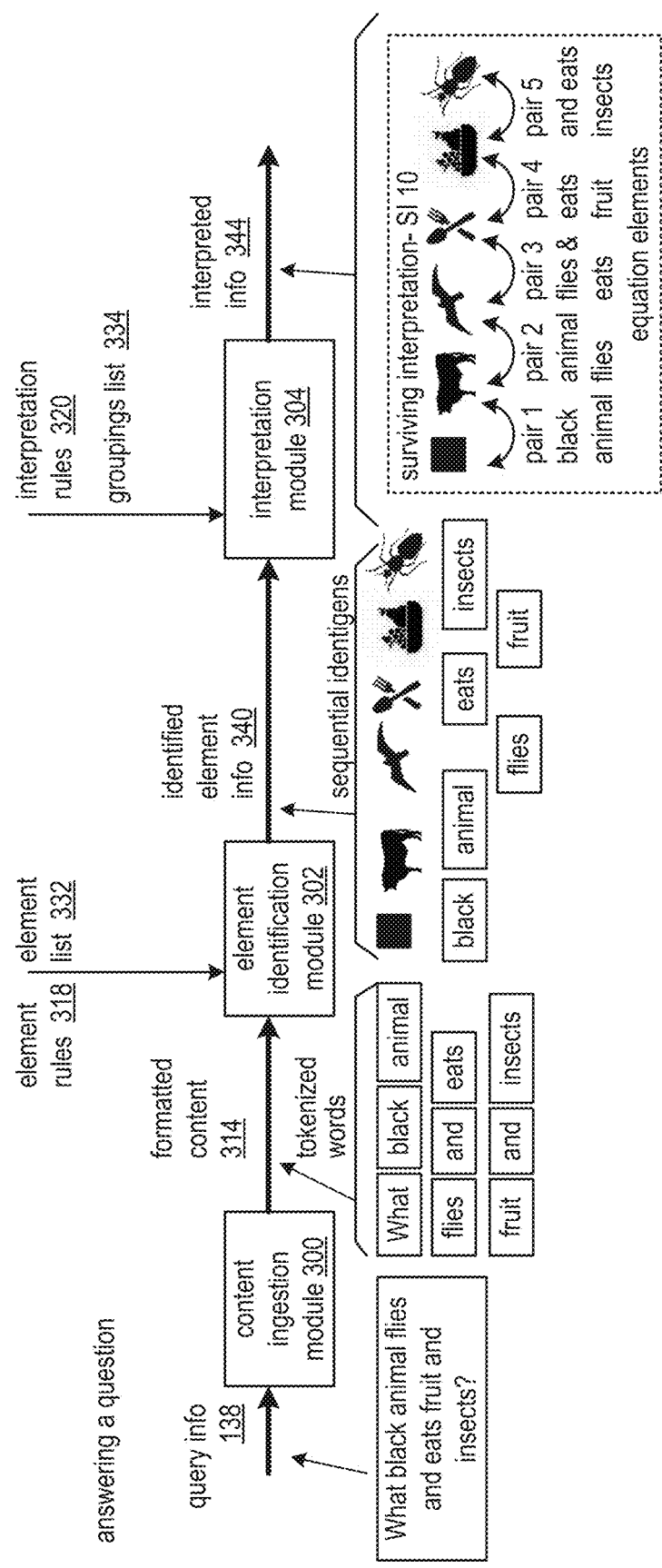
FIGS. 8J and 8K are schematic block diagrams another embodiment of a computing system in accordance with the present invention.
Figure 8K:
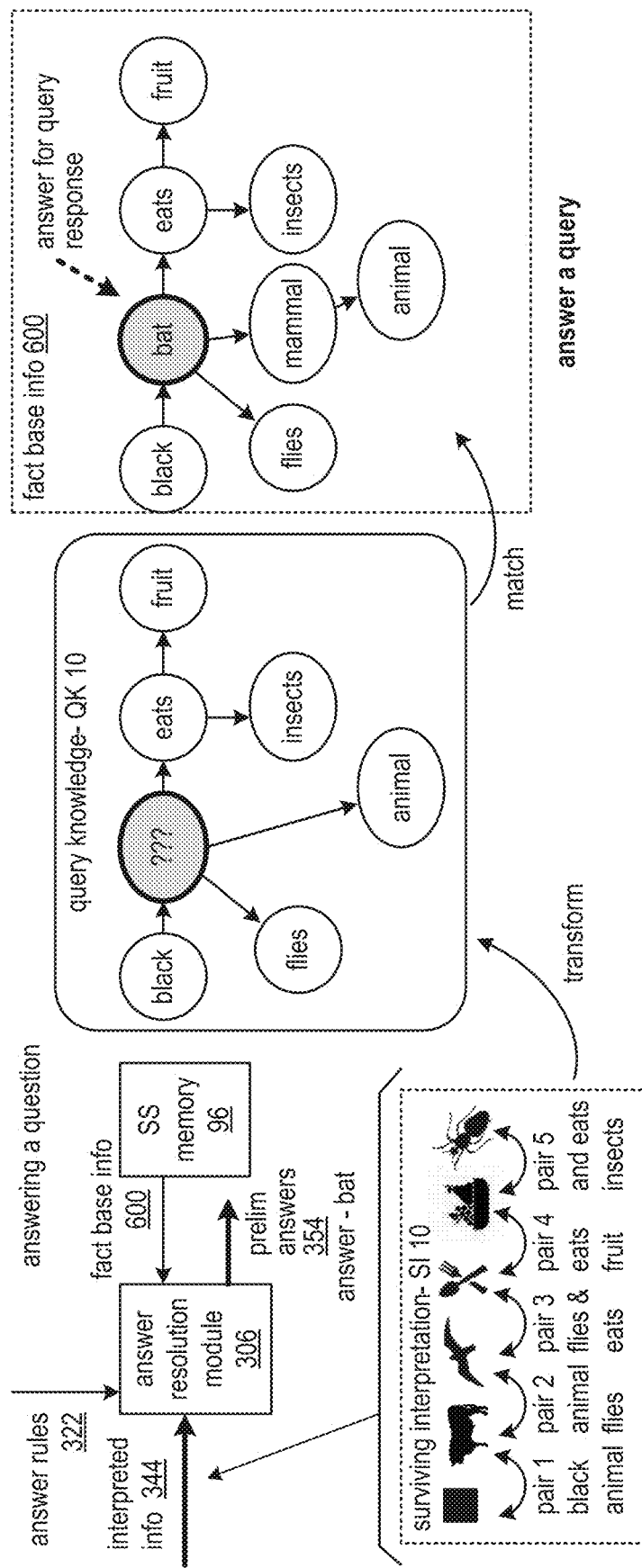

FIGS. 8J and 8K are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention provides solutions where the computing system 10 supports for generating a query response to a query utilizing a knowledge base.

The generating of the query response to the query includes a series of steps. For example, a first step includes identifying words of an ingested query to produce tokenized words. As depicted in FIG. 8J, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 8J, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation). The equation package includes a sequential linking of pairs of identigens, where each sequential linking pairs a preceding identigen to a next identigen. An equation element describes a relationship between paired identigens (OCAs) such as describes, acts on, is a, belongs to, did, did to, etc.

As depicted in FIG. 8J, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 8J, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344. The interpreted information 344 includes identification of at least one equation package as a surviving interpretation SI 10, where non-surviving equation packages, if any, are eliminated that compare unfavorably to pairing rules to produce a non-surviving interpretation.

A fifth step of the generating the query response to the query includes utilizing a knowledge base, generating a query response to the surviving equation package of the query, where the surviving equation package of the query is transformed to produce query knowledge for comparison to a portion of the knowledge base. An answer is extracted from the portion of the knowledge base to produce the query response.

As depicted in FIG. 8K, a specific example of the fifth step includes the answer resolution module 306 interpreting the surviving interpretation SI 10 of the interpreted information 344 in accordance with answer rules 322 to produce query knowledge QK 10 (i.e., a graphical representation of knowledge when the knowledge base utilizes a graphical database). For example, the answer resolution module 306 accesses fact base information 600 from the SS memory 96 to identify the portion of the knowledge base associated with a favorable comparison of the query knowledge QK 10 (e.g., by comparing attributes of the query knowledge QK 10 to attributes of the fact base information 600), and generates preliminary answers 354 that includes the answer to the query. For instance, the answer is "bat" when the associated OCAs of bat, such as black, eats fruit, eats insects, is an animal, and flies, aligns with OCAs of the query knowledge.

Figure 8L:
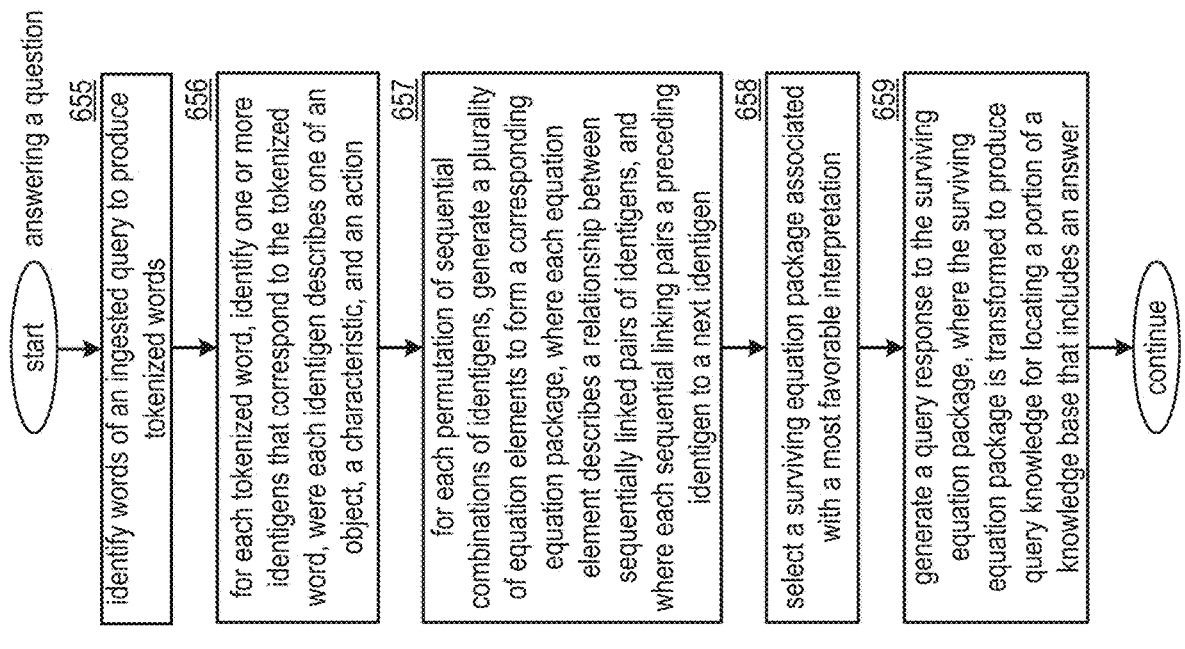
FIG. 8L is a logic diagram of an embodiment of a method for generating a query response to a query within a computing system in accordance with the present invention.

FIG. 8L is a logic diagram of an embodiment of a method for generating a query response to a query utilizing knowledge within a knowledge base within a computing system. In particular, a method is presented for use in conjunction with one or more functions and features described in conjunction with FIGS. 1-8D, 8J, and also FIG. 8K. The method includes step 655 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 656 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 657 where the processing module generates a plurality of equation elements to form a corresponding equation package, where each equation element describes a relationship between sequentially linked pairs of identigens. Each sequential linking pairs a preceding identigen to a next identigen. For example, for each permutation of identigens of each tokenized word, the processing module includes all other permutations of all other tokenized words to generate the equation packages. Each equation package includes a plurality of equation elements describing the relationships between sequentially adjacent identigens of a plurality of sequential combinations of identigens.

The method continues at step 658 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated that compare unfavorably to pairing rules.

The method continues at step 659 where the processing module generates a query response to the surviving equation package, where the surviving equation package is transformed to produce query knowledge for locating the portion of a knowledge base that includes an answer to the query. As an example of generating the query response, the processing module interprets the surviving the equation package in accordance with answer rules to produce the query knowledge (e.g., a graphical representation of knowledge when the knowledge base utilizes a graphical database format).

The processing module accesses fact base information from the knowledge base to identify the portion of the knowledge base associated with a favorable comparison of the query knowledge (e.g., favorable comparison of attributes of the query knowledge to the portion of the knowledge base, aligning favorably comparing entigens without conflicting entigens). The processing module extracts an answer from the portion of the knowledge base to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 9A is a schematic block diagram of another embodiment of a computing system that includes trusted content sources 660, the user device 12-1 of FIG. 1, and the artificial intelligence (AI) server 20-1 of FIG. 1. The trusted content sources 660 includes the content sources 16-1 through 16-N of FIG. 1. In particular, content sources associated with the trusted content sources 660 provides any type of content where at least a portion of the content has been encapsulated into a content blockchain 662, where aspects of the content blockchain 662 are subsequently utilized to establish an authenticity level with regards to the content. Structure associated with the content blockchain 662 is discussed in greater detail with regards to FIG. 9B. The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to verify authenticity of the content when the content is to be utilized to create knowledge.

In an example of operation of the verifying of the authenticity, the query module 124 interprets a received query request 136 (e.g., from the user device 12-1) to produce query requirements that include a content authenticity requirement. The interpreting includes one or more of determining content requirements, determining source requirements, determining answer timing requirements, determining the content authenticity level, and identifying at least one domain associated with the query request 136. For example, the query module 124 determines the content requirements to include a query with regards to content authenticity, determines the source requirements to include the trusted content sources 660, determines the answer timing requirements to include up to current time, and identifies verification of a statement as the domain when receiving the query request 136 that includes a question "what is likelihood of [statement] being authentic?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next two hours and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., verification of authenticity of a portion of the query request and/or verification of authenticity of content that generates knowledge, where the knowledge is interpreted to provide an answer to the query request 136) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., mapping previously stored knowledge stored as the fact base info 600 to one or more sources, where each source may be associated with a unique content authenticity level as revealed when interpreting an associated content blockchain 662) to produce the preliminary answer (e.g., likelihood of authenticity of content and/or a statement of the query request), and generating the answer quality level (e.g., estimated authenticity level) based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer, where the quality level is associated with the authenticity level of the content of the request and/or content associated with the fact base information 600. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the trusted content sources 16-1 through 16-N of the trusted content sources 660, requiring the content blockchain 662 for newly acquired content, determining the content selection requirements to include content associated with the domain and/or the question of the query request, and determining the content acquisition timing requirements to include the two hour time frame.

Having produced the content requirements, the collections module 120 issues a plurality of content requests 126 to a plurality of content sources identified by the content requirements (e.g., to the content sources 16-1 through 16-N). For example, the collections module 120 identifies the plurality of trusted content sources 660, generates the content requests 126 based on the content requirements (e.g., to include the content blockchain 662 in subsequent content responses 128), and sends the plurality of content requests 126 to the identified plurality of content sources 16-1 through 16-N.

Having issued the plurality of content requests 126, the collections module 120 interprets a plurality of content responses 128 and associated content blockchains 662 to determine whether a response quality level is favorable. The interpreting includes analyzing the plurality of content responses 128 and validating the content blockchains 662 to produce an estimated response quality level, and indicating a favorable response quality level when the estimated response quality level compares favorably to a minimum response quality threshold level (e.g., a minimum threshold number of content blockchain 662 have been validated). When the response quality level is favorable, the collections module 120 issues a collections response 134 to the IEI module 122, where the collections response 134 includes further content that is associated with a favorable authenticity level. For example, the collections module 120 generates the collections response 134 to include one or more of the further content, and associated content blockchain 662, and the estimated response quality level (e.g., validated authenticity level), and sends the collections response 134 to the IEI module 122.

The IEI module 122 analyzes the further content based on one or more of the IEI request 244, the fact base information 600, and the validated content blockchain 662 to produce one or more of updated fact base information (e.g., new knowledge for storage in the SS memory 96 along with the associated content blockchain 662) and a preliminary answer with an associated preliminary answer quality level. For example, the IEI module 122 reasons the further content with the fact base information 600 to produce the preliminary answer which indicates the likelihood of authenticity of the statement of the query request 136. When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

FIG. 9B is a schematic block diagram of an embodiment of a content blockchain. The content blockchain includes a plurality of blocks 2-4. Each block includes a header section and a transaction section. The header section includes one or more of a nonce, a hash of a preceding block of the blockchain, where the preceding block was under control of a preceding device (e.g., a content source, the user device, a computing device, etc.) in a chain of control of the blockchain, and a hash of a current block (e.g., a current transaction section), where the current block is under control of a current device in the chain of control of the blockchain.

The transaction section includes one or more of a public key of the current device, a signature of the preceding device, authentic content request information regarding a content request and change of control from the preceding device to the current device, and content information from the previous block as received by the previous device plus content added by the previous device when transferring the current block to the current device.

FIG. 9B further includes devices 2-3 (e.g., content sources 16-2 and 16-3) to facilitate illustration of generation of the blockchain. Each device includes a hash function, a signature function, and storage for a public/private key pair generated by the device An example of operation of the generating of the blockchain, when the device 2 has control of the blockchain and is passing control of the blockchain to the device 3 (e.g., the device 3 is transacting a transfer of content from device 2), the device 2 obtains the device 3 public key from device 3, performs a hash function 2 over the device 3 public key and the transaction 2 to produce a hashing resultant (e.g., preceding transaction to device 2) and performs a signature function 2 over the hashing resultant utilizing a device 2 private key to produce a device 2 signature. Having produced the device 2 signature, the device 2 generates the transaction 3 to include the device 3 public key, the device 2 signature, device 3 authentic content request to 2 information, and the previous content plus content from device 2. The device 3 authentic content request to device 2 information includes one or more of a content request, a query request, background content, and payment instructions from device 3 to device 2 for access to the content. The previous content plus content from device 2 includes one or more of content from an original source, content from any subsequent source after the original source, an identifier of a source of content, a serial number of the content, an expiration date of the content, content utilization rules, and results of previous blockchain validations.

Having produced the transaction 3 section of the block 3 a processing module (e.g., of the device 2, of the device 3, of a transaction mining server, of an AI server, generates the header section by performing a hashing function over the transaction section 3 to produce a transaction 3 hash, performing the hashing function over the preceding block (e.g., block 2) to produce a block 2 hash. The performing of the hashing function may include generating a nonce such that when performing the hashing function to include the nonce of the header section, a desired characteristic of the resulting hash is achieved (e.g., a desired number of preceding zeros is produced in the resulting hash).

Having produced the block 3, the device 2 sends the block 3 to the device 3, where the device 3 initiates control of the blockchain. Having received the block 3, the device 3 validates the received block 3. The validating includes one or more of verifying the device 2 signature over the preceding transaction section (e.g., transaction 2) and the device 3 public key utilizing the device 2 public key (e.g., a re-created signature function result compares favorably to device 2 signature) and verifying that an extracted device 3 public key of the transaction 3 compares favorably to the device 3 public key held by the device 3. The device 3 considers the received block 3 validated when the verifications are favorable (e.g., the authenticity of the associated content is trusted).

FIG. 9C is a logic diagram of an embodiment of a method for verifying authenticity of content that is utilized to create knowledge within a computing system. In particular, a method is presented for use in conjunction with one or more functions and features described in conjunction with FIGS. 1-8L, 9A-9B, and also FIG. 9C. The method includes step 680 where a processing module of one or more processing modules of one or more computing devices of the computing system interprets a received query request from a requester to produce content authenticity requirements. The interpreting includes one or more of determining content requirements, (e.g., to determine an authenticity level of content and/or to answer a question based on knowledge, where the knowledge has been extracted from content associated with favorable authenticity levels by verifying one or more content blockchains associated with the content), determining source requirements, determining answer timing requirements, and identifying a domain associated with the query request.

The method continues at step 682 where the processing module IEI processes human expressions of the received query request based on a fact base of knowledge generated from previously obtained content to produce a preliminary answer, where the previously obtained content is associated with a level of authenticity. The processing may include formatting portions of the query request in accordance with formatting rules to produce recognizable human expressions of content and question information. For example, the processing module produces the question information to include a request to determine likelihood of authenticity of a statement for a particular domain. The processing may further include identifying permutations of identigens within the human expressions, reducing the permutations, mapping the reduced permutations to entigens to produce knowledge, processing the knowledge in accordance with the fact base of knowledge to produce the preliminary answer, and generating an answer quality level associated with the preliminary answer. For instance, the processing module generates a relatively low answer quality level when the luminary answer was based on knowledge derived from content associated with unfavorable authenticity levels.

When the answer quality level is unfavorable, the method continues at step 684 where the processing module obtains further content from a plurality of content sources in accordance with the content authenticity requirements, where authenticity of the further content is verifiable utilizing the content blockchain approach. For example, the processing module generates authentic content requirements. The generating of the authentic content requirements includes determining, based on one or more of the query requirements, the preliminary answer, and the answer quality level, one or more of content selection requirements, source selection requirements, a level of desired authenticity, and acquisition timing requirements. Having generated the authentic content requirements, the processing module identifies the plurality of sources (e.g., trusted content sources), generates requests based on the content requirements (e.g., to include requesting content blockchains with associated content), and sends the plurality of content requests to the plurality of identified trusted content sources, analyzes a plurality of content responses to verify content blockchains to produce an estimated quality level, indicates favorable quality level when the estimated quality level compares favorably to a minimum quality threshold level (e.g., an authenticity level is favorable when substantially all of the content block chains are validated), and indicates unfavorable quality level to facilitate collecting more content when the estimated quality level compares unfavorably to the minimum quality threshold level.

The method continues at step 686 where the processing module IEI processes human expressions of the further content based on the fact base to produce an updated preliminary answer that includes a query response for the query request (e.g., an indication of authenticity level of content associated with the updated preliminary answer). For example, the processing module analyzes, based on one or more of the query request, the fact base info associated with the identified domain, and the further content to produce one or more of updated fact base info (e.g., new knowledge and associated content block chains), the updated preliminary answer (e.g., updated response and associated authenticity level), and an associated answer quality level. The analyzing may include reasoning the further content with the fact base to produce the updated fact base info and the preliminary answer to include the authenticity level.

When the updated answer quality level is favorable in accordance with the content authenticity requirements, the method continues at step 688 where the processing module issues a query response to the request (e.g., confirmation of a statement of the query request based on knowledge derived from authentic content, an answer to a question of the query request where the answer is based on the knowledge derived from the authentic content). The issuing includes one or more of analyzing the preliminary answer in accordance with the query requirements and the rules to generate the updated quality level (e.g., an indication of authenticity levels of content relied upon to generate the knowledge that is associated with the query response), generating the query response to include the answer associated with the favorable quality level, and sending the query response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIGS. 9D, 9E, and 9F are schematic block diagrams of another embodiment of a computing system illustrating another embodiment of a method for verifying authenticity of content that is utilized to create knowledge within the computing system. The example computing system includes the AI servers 20-1 and 20-2 of FIG. 1. The AI servers 20-1 and 20-2 include the content ingestion module 300 of FIG. 5E, the element identification module 302 of FIG. 5E, the interpretation module 304 of FIG. 5E, the answer resolution module 306 of FIG. 5E, and one or more of a knowledge database 1040 and an updated knowledge database 1000.

FIG. 9D illustrates an example method of operation of the verifying authenticity of the content that is utilized to create the knowledge, where in a first step the content ingestion module 300 verifies authenticity of a blockchain-encoded record 1002 representing content 1004 (e.g., a statement) and an entigen group 1006 to produce an authenticity indicator. A set of identigens is determined (e.g., previously by another computing device) utilizing a knowledge database for each word of the statement to produce a plurality of sets of identigens. A first set of identigens of the plurality of sets of identigens is produced for a first word of the statement. Each identigen of the first set of identigens represents a different meaning of the first word. The plurality of sets of identigens is interpreted utilizing the knowledge database to produce the entigen group. The entigen group represents a validated interpretation of the statement. A first entigen of the entigen group corresponds to a selected identigen of the first set identigens having a selected meaning of the different meanings of the first word. The selected identigen favorably pairs with at least one corresponding sequentially adjacent identigen of another set of identigens of the plurality of sets of identigens.

The verifying authenticity of the blockchain-encoded record 1002 representing the statement and the entigen group 1006 to produce the authenticity indicator includes one of at least two approaches. A first approach includes a symmetric key signature approach. A second approach includes signature verification without the symmetric key signature approach.

When utilizing the symmetric key signature approach, referring back to FIG. 9B where an authentic content request is interchangeable with the content 1004 plus the entigen group 1006, the verifying of the authenticity includes a series of sub-steps. A first sub-step includes decrypting a signature of the blockchain-encoded record 1002 utilizing a first public key of a first public-private key pair to produce a first decrypted transaction hash value. The first public-private key pair is associated with a last transaction computing device. A second sub-step includes hashing a portion of the blockchain-encoded record 1002 utilizing a second public key of a second public-private key pair to produce a candidate transaction hash value. The second public-private key pair is associated with the computing device (e.g., of the AI server 20-1). A third sub-step includes establishing the authenticity indicator to indicate the authentic status when the first decrypted transaction hash value is substantially the same as the candidate transaction hash value.

When not utilizing the symmetric key signature approach, the content ingestion module 300 applies signature verification to the signature of the blockchain-encoded record 1002 utilizing the first public key and the second public key to produce the authenticity indicator. The authenticity indicator indicates an authentic status when the blockchain encoded record 1002 is deemed to be authentic.

Having verify the authenticity of the blockchain encoded record 1002, when the authenticity indicator for the blockchain-encoded record indicates the authentic status, a second step of the example method of operation of the verifying authenticity of the content that is utilized to create the knowledge includes the element identification module 302 determining, based on the updated knowledge database 1000 (e.g., updated with regards to the knowledge database that was utilized originally to create the entigen group 1006 from the content 1004), an updated set of identigens for each word of the statement to produce an updated plurality of sets of identigens 1008. For example, the element identification module 302 obtains identigen information 1007 from the updated knowledge database 1000 based on the words of the statement. An updated first set of identigens of the updated plurality of sets of identigens is produced for the first word of the statement. Each updated identigen of the updated first set of identigens represents an updated different meaning of the first word.

Having produced the updated plurality of sets of identigens 1008, a third step of the example method of operation of the verifying authenticity of the content that is utilized to create the knowledge includes the interpretation module 304 interpreting, based on the updated knowledge database 1000, the updated plurality of sets of identigens 1008 to produce an updated entigen group 1014. For example, the interpretation module 304 obtains identigen rules 1010 from the updated knowledge database 1000 based on the plurality of updated sets of identigens 1008 and interprets the plurality of updated sets of identigens 1008 utilizing the identigen rules 1010 to find a valid sequential combination of adjacent identigens to produce the updated entigen group 1014.

The updated entigen group 1014 represents an updated validated interpretation of the statement. An updated first entigen of the updated entigen group corresponds to an updated selected identigen of the updated first set identigens having an updated selected meaning of the updated different meanings of the first word. The updated selected identigen favorably pairs with at least one corresponding sequentially adjacent updated identigen of another updated set of identigens of the updated plurality of sets of identigens.

Having produced the updated entigen group 1014, a fourth step of the example method of operation of the verifying authenticity of the content that is utilized to create the knowledge includes the interpretation module 304 updating the blockchain-encoded record to represent the statement and the updated entigen group 1014 to produce an updated blockchain encoded record 1012 to facilitate subsequent utilization of the updated validated interpretation of the statement as the updated entigen group 1014. The updating the blockchain-encoded record to represent the statement and the updated entigen group includes a series of sub-steps. A first sub-step includes hashing the statement (e.g., the content 1004) and the updated entigen group 1014 utilizing a recipient public key of a recipient computing device to produce a next transaction hash value (e.g., in a scenario of sending the updated blockchain encoded record 1012 to the AI server 20-2).

A second sub-step includes encrypting the next transaction hash value utilizing a private key of the computing device (e.g., of the AI server 20-1) to produce a next transaction signature. A third sub-step includes generating a next blockchain-encoded record to include the statement and the updated entigen group and the next transaction signature as the updated blockchain encoded record 1012.

FIG. 9E further illustrates the example method of operation of the verifying authenticity of the content that is utilized to create the knowledge, where having produced the updated entigen group 1014, in a fifth step the content ingestion module 300 obtains a query 1020. For example, the content ingestion module 300 receives the query 1020 that includes a question associated with knowledge portrayed by the updated entigen group 1014 and partitions the content, utilizing a dictionary from the updated knowledge database 1000) to produce query words 1022.

In a sixth step of the example method of operation of the verifying authenticity of the content that is utilized to create the knowledge, the element identification module determines sets of identigens 1024 for the query. For example, the element identification module 302 utilizes the query words 1022 to access the updated knowledge database 1000 to obtain identigen information 1007 that includes the sets of identigens 1024.

Having obtained the sets of identigens 1024, in a seventh step of the example method of operation of the verifying authenticity of the content that is utilized to create the knowledge, the interpretation module 304 interprets the sets of identigens 1024 o produce a query entigen group 1026. For example, the interpretation module 304 utilizes the sets of identigens 1024 to access the updated knowledge database 1000 to obtain identigen rules 1010 and interprets the sets of identigens 1024 utilizing the identigen rules 1010 to produce the query entigen group 1026 (e.g., based on valid adjacent identigens). Alternatively, the interpretation module 304 receives the query entigen group 1026 from another computing device to obtain the query entigen group 1026.

Having obtained the query entigen group 1026, an eighth step of the example method of operation of the verifying authenticity of the content that is utilized to create the knowledge includes the answer resolution module 306 generating a query response 1030 to the query entigen group 1026 utilizing the updated entigen group 1014. For example, the answer resolution module 306 accesses the updated knowledge database 1000 utilizing the query entigen group 1026 to obtain the updated entigen group 1014. The answer resolution module 306 interprets the updated entigen group 1014 in accordance with the query entigen group 1026 to produce a response entigen group 1028. The answer resolution module 306 generates the response 1030 based on the response entigen group 1028.

FIG. 9F further illustrates the example method of operation of the verifying authenticity of the content that is utilized to create the knowledge, where having produced the updated entigen group 1014, in a ninth step the answer resolution module 306 identifies another computing device associated with another knowledge database. The other knowledge database does not include the updated entigen group 1014. The identifying includes one or more of interpreting an update request, identifying a deficiency of the other knowledge database, and detecting that an update time frame has expired. For example, the answer resolution module 306 identifies the AI server 20-2 as the other computing device when detecting the deficiency.

Having identified the other computing device, a tenth step of the example method of operation of the verifying authenticity of the content that is utilized to create the knowledge includes the answer resolution module 306 updating, utilizing a security credential of the other computing device (e.g., a public key associated with the AI server 20-2), the blockchain-encoded record to represent the statement and the updated entigen group and 14 to produce a trusted blockchain-encoded record 1042. For example, the answer resolution module 306 updates the blockchain encoded record as previously discussed, and with reference to FIG. 9B, to produce the trusted blockchain encoded record and 42 to include the content 1004 (e.g., the statement) and the updated entigen group 1014.

Having produced the trusted blockchain encoded record and 42, in an eleventh step of the example method of operation of the verifying authenticity of the content that is utilized to create the knowledge includes the answer resolution module 306 sending the trusted blockchain-encoded record 1042 to the other computing device. For example, the answer resolution module 306 of the AI server 20-1 transmits the trusted blockchain encoded record 1042 to the AI server 20-2 so that the knowledge database can be updated to include the updated entigen group 1014 with high confidence of authenticity.

Having obtained the updated entigen group 1014, and when the computing device (e.g., the AI server 20-2) is disassociated with the knowledge database utilized to originally produce the entigen group, in a twelfth step of the example method of operation of the verifying authenticity of the content that is utilized to create the knowledge includes the AI server 20-2 updating a local knowledge database to include the statement as the entigen group, wherein the local knowledge database is associated with the computing device. For example, the AI server 20-2, which did not create the entigen group, receives the trusted blockchain encoded record 1042, verifies the authenticity of the trusted blockchain encoded record 1042 as previously discussed, and went authentic, stores the updated entigen group 1014 in the knowledge database 1040 without need for analyzing the content 1004 (e.g., determining identigens, interpreting the identigen rules to select identigens as a new entigen group, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 10A is a schematic block diagram of another embodiment of a computing system that includes clarification sources 700, the user device 12-1 of FIG. 1, and the artificial intelligence (AI) server 20-1 of FIG. 1. The clarification sources 700 includes the content sources 16-1 through 16-N of FIG. 1, the transactional servers 18-1 through 18-N of FIG. 1, the AI servers 20-2 through 20-N of FIG. 1, and the user devices 12-1 through 12-N of FIG. 1. Content sources associated with the trusted content sources 660 provides any type of clarification content including publicly available information, information of a domain associated with subject matter experts, information provided by individuals, transactional information, etc. The content is to be associated with a topic of a statement and/or a question as further discussed below.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system supports the processing of an ambiguous statement and/or query.

In an example of operation of a first embodiment of the processing of the ambiguous query, the query module 124 interprets a received query request 136 (e.g., from the user device 12-1) to produce query requirements that include an indication of a statement or question type. The interpreting includes one or more of determining content requirements, determining source requirements, determining answer timing requirements, and identifying at least one domain associated with the query request 136. For example, the query module 124 determines the content requirements to include a query with regards to a question and/or statement (e.g., content for ingestion to create knowledge) and determines the source requirements to include the clarification sources 700.

The query module 124 further determines answer timing requirements to include up to one hour time frame, identifies a domain based on one or more relationship aspects of the query request 136, and interprets the query to include an ambiguous question and/or statement. For instance, the query module 124 identifies "Linda insulted Kathy and she cried" (e.g., ambiguous statement that has multiple possible interpretations).

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next two hours and subsequently issues the IEI request 244 to the IEI module 122 to generate the response to the query.

When receiving the IEI request 244, the IEI module 122 formats the IEI request 244 to produce human expressions (e.g., text) that include question content and question information. The formatting includes analyzing the IEI request 244 for recognizable human expressions of a question and/or content, and question information in accordance with rules and fact base information obtained from the SS memory 96. For example, the formatting may include producing two scenarios of human expressions of content, i.e., a scenario where Linda cries and another scenario where Kathy cries.

Having produced the human expressions, the IEI module 122 applies "IEI processing" to the human expressions to produce one or more of new knowledge, a preliminary answer (e.g., multiple interpretations when the statement is ambiguous), and an answer quality level associated with the preliminary answer (e.g., an estimated level of ambiguity). The IEI processing includes identifying permutations of identigens, reducing the permutations in accordance with the rules, mapping the reduced permutations of identigens to entigens to generate knowledge, processing the knowledge in accordance with the fact base (e.g., mapping previously stored knowledge stored as the fact base info 600 to one or more interpretations of the query) to produce the preliminary answer (e.g., two interpretations of the statement). The IEI processing further generates the answer quality level (e.g., a low level of answer quality when ambiguity is detected) based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer, where the quality level is associated with the ambiguity level of the statement of the request and/or content associated with the fact base information 600 (e.g., not clear from previous knowledge about Linda and Kathy to interpret who is likely to be crying). The issuing includes generating the collections request 132 based on one or more of the IEI requests 244, the preliminary answer, elements of the fact base information 600 (e.g., the present knowledge base), and the answer quality level (e.g., ambiguity level and possible interpretations of the statement of the query request 136).

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting one or more of the content sources 16-1 through 16-N when more content with regards to interactions between Linda and Kathy, or others, may be helpful.

As another example, the collections module 120 determines the source selection requirements to include selecting one or more of the transactional servers 18-1 through 18-N when transactions regarding Linda and/or Kathy may be helpful to eliminate the ambiguity. As yet another example, the collections module 120 determines the source selection requirements to include selecting one or more of the user devices 12-1 through 12-N when posing a question to another user may be helpful to remove the ambiguity (e.g., target a content request 126 for the user device 12-1 to request clarification of who was crying, for instance Robert witnessed Kathy crying).

Having produced the content requirements, the collections module 120 issues one or more content requests 126 to at least one source entity of the clarification sources 700 identified by the content requirements. For example, the collections module 120 identifies the content source 16-3, generates the content requests 126 based on the content requirements (e.g., to identify who cries more often, Linda or Kathy from previously generated content), and sends the content request 126 to the content source 16-3. As another example, collections module 120 identifies the user device 12-1, generates the content request 126 to request clarification of who cried, and sends the content request 126 to the user device 12-1.

Having issued the one or more content requests 126, the collections module 120 interprets one or more content responses 128 to determine whether a response quality level is favorable. The interpreting includes analyzing the one or more content responses 128 and evaluating the ambiguity level based on the one or more content responses 128 to produce an estimated response quality level. The interpreting further includes indicating a favorable response quality level when the estimated response quality level compares favorably to a minimum response quality threshold level (e.g., the ambiguity has been substantially eliminated).

When the response quality level is favorable, the collections module 120 issues a collections response 134 to the IEI module 122, where the collections response 134 includes further content that is associated with a favorable ambiguity level. For example, the collections module 120 generates the collections response 134 to include one or more of the further content and the estimated response quality level (e.g., favorable ambiguity level), and sends the collections response 134 to the IEI module 122.

The IEI module 122 analyzes the further content based on one or more of the IEI request 244 and knowledge of the fact base information 600 to produce one or more of updated fact base information (e.g., new knowledge for storage in the SS memory 96) and a preliminary answer with an associated preliminary answer quality level. For example, the IEI module 122 analyzes the further content with the fact base information 600 to produce the preliminary answer which indicates the elimination of the ambiguity associated with the query request 136.

When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer (e.g., Kathy cried) associated with the favorable quality level of the answer.

FIGS. 10B-10C are data flow diagrams of embodiments of a method to process ambiguity within a computing system. Generally, embodiments of this invention present solutions where the computing system supports the processing of the ambiguous statement and/or the ambiguous query. In an example of operation of a second embodiment of the processing of the ambiguous statement and/or ambiguous query, the method includes attempting to interpret true meanings of the statement and/or query, generating a plurality of plausible entigen groups associated with plausible different meanings, obtaining cure knowledge by curating one or more related entigen groups, updating the interpretation of the statement and/or query through selecting at least one of the plausible entigen groups, and generating a query response when processing a query.

The interpreting of the true meaning of the sentence for translation includes a series of interpreting steps. FIG. 10B illustrates a first interpreting step that includes identifying textual words 528-1 utilizing a dictionary associated with a language of the textual words. For example, the words "Linda", "insulted", "Kathy", "she", and "cried" are identified as valid words when the sentence includes: "Linda insulted Kathy and she cried." The example further includes a query question "Who cried?". Other embodiments include only the statement.

A second interpreting step includes identifying grammatical use 649-1 (e.g., for the language, English in a specific example), where the ordering of the words establishes grammatical use in accordance with norms for the language. A third interpreting step includes identifying a word type 542 (e.g., object, characteristic, action, functional) for each word in accordance with the language. For example, "Linda" is an object, "insulted" is an action, "Kathy" is another object, "she" is yet another object, and "cried" is an action.

A fourth interpreting step includes, for each word, listing possible identigens 518-1 (e.g., with different meanings in the first language). For example, a lookup is performing using a knowledge database that includes a list of all possible identigens for known words of the first language.

The detecting of the ambiguity includes generating a statement meaning entigen group 701 and, when a query is included in the textual words 528-1, a query entigen group 703. The generation of the statement meaning entigen group 701 includes selecting, for each word of the statement portion of the textual words 528-1, a corresponding identigen to produce an entigen.

The selecting includes utilizing the language rules (e.g., which pairings, groupings, and ordering of two or more identigens are allowed in accordance with the language) to pare down the permutations of identigens to select the surviving entigens. For example, an entigen is selected that corresponds to Linda, an entigen corresponding to the action of insulting is selected, an entigen is selected that corresponds to Kathy, a temporary entigen is selected for a generic she, and an entigen is selected that corresponds to the action of crying. The temporary entigen for the word "she" is indeterminate since it is a pointer to one of the entigen for Linda and the entigen for Kathy.

Having selected the entigens, connectivity between entigens is determined when possible. For example, the entigen for Linda is connected to the entigen for insult as it is clear that Linda is doing the insulting. As another example, the insulting entigen is connected to the entigen for Kathy as it is clear that Kathy is being insulted. However, in accordance with the language rules, including, in an absence of clarifying punctuation, the entigen for the generic "she" does not specifically identify how the action entigen for crying is to be connected to the other entigens of the evolving entigen group. Since, not explicitly shown, the entigens for Linda and Kathy are associated with female characteristic entigens, it is deduced that one of the entigen for Linda and the entigen for Kathy are associated with the crying as described by the temporary generic "she" entigen.

In the example, two plausible entigen groups 702-1 and 702-2 are generated corresponding to the two permutations of the connectivity of the temporary she entigen to the crying entigen. For instance, the plausible entigen group 702-1 includes the Linda entigen connected to the insult entigen connected to the Kathy entigen connected to the crying entigen to indicate that it is Kathy that cries. As another instance, the plausible entigen group 702-2 includes the Linda entigen connected to the insult entigen connected to the Kathy entigen, where the Linda entigen is further connected to the crying entigen to indicate that it is Linda that cries.

The query entigen group 703 is generated from the query portion of the textual words 528-1. For example, the words "who cried?" Produce the query entigen group 703 to include a temporary entigen for "who" connected to the entigen for cry.

FIG. 10C further illustrates the example of operation where cure knowledge is obtained. The cure knowledge includes cure context knowledge and cure interpretation capability knowledge. The cure context knowledge includes more knowledge associated with the crying (e.g., did someone witness the crying that can indicate whether it was Linda or Kathy). The cure interpretation capability knowledge includes more knowledge associated with other incidents of Linda insulting other people to gain insights and improve and interpretation capability. For instance, gain knowledge associated with other situations where Linda insulted others and there was crying.

The obtaining of the cure knowledge includes identifying related knowledge and determining how to obtain the identified related knowledge. For example, identifying knowledge associated with a witness of the crying. As another example, identifying knowledge associated with the other incidents of Linda insulting other people. The obtaining of the identified related knowledge includes accessing a knowledge database (e.g., when the desired knowledge is expected to be previously stored in the knowledge database) and generating of the identified related knowledge from further content (e.g., gather more content for IEI processing).

As an example of the obtaining of the cure knowledge, knowledge is obtained to generate a related entigen group 704-1 that indicates that Robert saw Kathy cry (e.g., by retrieving the related entigen group 704-1 from the knowledge database or by gathering more content to generate the related entigen group 704-1). The related entigen group supports more understanding of one or more other entigen groups it relates to.

In this example, the related entigen group 704-1, if valid, provides an indicator that Kathy cried and not Linda. As another example of the obtaining of the cure knowledge, knowledge is obtained to generate another related entigen group 704-2 that indicates that Linda insulted Pam and Pam cried. As yet another example, further knowledge is obtained to generate yet another related entigen group 704-3 that indicates that Linda insulted Jen and Jen cried. The related entigen group 704-2 and 704-3 point to a trend of Linda insulting people where the people cry not Linda.

Having obtained the cure knowledge, the query interpretation is updated based on the one or more of the related entigen groups. For example, each of the three related entigen groups point to Kathy crying and not Linda such that the plausible entigen group 702-1 is deemed as correct and the plausible entigen group 702-2 is deemed as incorrect utilizing basic deduction logic.

Having updated the query interpretation, the statement is corrected, where the correction includes at least one of generating an updated entigen group to represent a more likely interpretation of the statement, updating the statement (e.g., the textual words) to reflect a more accurate depiction based on the updated entigen group, and storing of the updated entigen group in the knowledge database. The generating of the updated entigen group is based on the plausible entigen group associated with the more likely interpretation for example, the plausible entigen group 702-1 is utilized to generate the updated entigen group 705-1, where the Linda entigen is connected to the insult entigen, the insult entigen is connected to the Kathy entigen and most importantly the Kathy entigen is connected to the cry entigen. An example of updating the statement includes mapping the entigens of the updated entigen group 705-12 textual words of a desired language. For instance, the entigen for Linda maps to the text for Linda, the entigen for insult maps to text for insulted, the entigen for Kathy maps to the text for Kathy, the connectivity of the Kathy entigen to the cry entigen indicates a need to generate second text for Kathy, and the entigen for cried maps to the text for cried to produce the text: "Linda insulted Kathy and Kathy cried".

Alternatively, or in addition to, a query response 706 is generated in response to the query based on the updated entigen group. For example, the connectivity of the Kathy entigen to the crying entigen is utilized to produce a query response 706 that includes the Kathy entigen connected to the crying entigen.

FIG. 10D is a logic diagram of an embodiment of a method for processing ambiguity within a computing system. In particular, a method is presented for use in conjunction with one or more functions and features described in conjunction with FIGS. 1-8L, 10A and also FIGS. 10B-C. The method includes step 710 where a processing module of one or more processing modules of one or more computing devices of the computing system generates a plurality of entigen groups from a set of phrases of a statement. The plurality of entigen groups represents a plurality of most likely meanings for the set of phrases. For example, the processing module receives a statement and matches, utilizing a dictionary, text of the statement to valid words to produce a set of identigens for each valid word thus producing a plurality of sets of identigens for the statement.

The processing module applies rules (e.g., language rules) to permutations of sequences of identigens of the plurality of sets of identigens to reveal the plurality of entigen groups, where an entigen of an entigen group corresponds to an identigen of a set of identigens having a selected meaning of one or more different meanings of a corresponding word. Some of the entigen groups pertain to the same words and are interpreted in different ways when ambiguity exists for the statement.

The method continues at step 711 where the processing module identifies two plausible entigen groups of the plurality of entigen groups based on a true meaning interpretation of the statement. The two plausible entigen groups are substantially equally likely interpretations of the statement based on an ambiguity in the statement. The identifying of the two plausible entigen groups includes interpreting, based on language rules, the plurality of sets of identigens to produce a first plausible entigen group of the two plausible entigen groups, where the first plausible entigen group represents a first true meaning interpretation of the set of phrases of the statement.

A set of identigens of the plurality of sets of identigens includes one or more different meanings of a word of the set of phrases and an entigen of the first plausible entigen group corresponds to an identigen of the set identigens having a selected meaning of the one or more different meanings of the word. For example, the processing module identifies the first plausible entigen group to include the Linda entigen connected to the insult entigen connected to the Kathy entigen connected to the cry entigen when the statement includes "Linda insulted Kathy and she (Kathy) cried" when the first true meaning interpretation includes Kathy crying.

The identifying of the two plausible entigen groups further includes interpreting, based on the language rules, the plurality of sets of identigens to produce a second plausible entigen group of the two plausible entigen groups, where the second plausible entigen group represents a second true meaning interpretation of the set of phrases of the statement. An entigen of the second plausible entigen group corresponds to another identigen of the set identigens having another selected meaning of the one or more different meanings of the word. For example, the processing module identifies the second plausible entigen group to include the Linda entigen connected to the insult entigen connected to the Kathy entigen with the Linda entigen further connected to the cry entigen when the statement includes "Linda insulted Kathy and she (Linda) cried" when the second true meaning interpretation includes Linda crying.

The method continues at step 712 where the processing module identifies a related entigen group based on a phrase of the statement. The identifying of the related entigen group includes a series of steps. A first step includes selecting the phrase of the set of phrases based on the ambiguity in the statement (e.g., she cried, Linda insulted Kathy). A second step includes identifying one or more related entigen group attributes based on the phrase. For example, a first attribute includes Linda insulting others (e.g., find evidence of when Linda has insulted others to identified who cries, Linda or the person being insulted) and a second attribute includes Kathy crying (e.g., find evidence of Kathy crying or not when Linda insulted Kathy).

A third step of identifying the related entigen group includes obtaining the related entigen group by at least one of accessing a knowledge database based on the one or more related entigen group attributes to obtain the related entigen group and accessing a content source to obtain content based on the one or more related entigen group attributes to enable subsequent generation of the related entigen group. For example, the processing module utilizes the related entigen group attributes to search the knowledge database for the evidence of Linda insulting others to identify who cries.

As another example, the processing module utilizes the related entigen group attributes to search the knowledge database for evidence of Kathy crying when Linda insulted Kathy. As yet another example, the processing module utilizes the related entigen group attributes to select a suitable content source for the retrieval of the content to IEI process to generate the related entigen group. For instance, obtaining social media content indicating other instances of Linda insulting others and the others crying. As another instance, obtaining email content indicating that Robert witnessed Kathy crying when Linda insulted Kathy.

Alternatively, the processing module identifies a second related entigen group based a second phrase of the statement. For instance, the second related entigen group represents a statement that Linda insulted Jen and Jen cried when the related entigen group represents the statement that Robert witnessed Kathy crying when Linda insulted Kathy.

The method branches to step 720 when an alternative embodiment is utilized where the two plausible entigen groups are augmented, otherwise the method continues to step 713. When the method continues at step 713, the processing module interprets each of the two plausible entigen groups in light of the related entigen group to determine whether one of the two plausible entigen groups is a more likely interpretation of the statement than the other one of the two plausible entigen groups. For example, the processing module deduces that the more likely interpretation is that Kathy cried rather than Linda when the related entigen group describes Robert witnessing Linda insulting Kathy and Kathy crying.

In the other embodiment when identifying the second related entigen group based on the second phrase of the statement, the method further includes interpreting each of the two plausible entigen groups in light of the related entigen group and the second related entigen group to determine whether the one of the two plausible entigen groups is the more likely interpretation of the statement than the other one of the two plausible entigen groups. For example, the processing module deduces that the more likely interpretation is a Kathy cried rather than Linda when the second related entigen group indicates that Linda insulted Jen and Jen cried.

When the one of the two plausible entigen groups is the more likely interpretation of the statement, the method continues at step 714 where the processing module updates the one of the two plausible entigen groups in accordance with the related entigen group to produce an updated entigen group. For example, the processing module re-labels the related entigen group associated with Linda insulting Kathy and Kathy crying when the related entigen group indicates that Robert witness Kathy crying when Linda insulted Kathy. As another example, the processing module updates the second plausible entigen group (e.g., where Linda cries) to move the connectivity of crying over to Kathy to produce the updated plausible entigen group when the related entigen group indicates that Robert witness Kathy crying when Linda insulted Kathy.

In the other embodiment, when identifying a second related entigen group based on the second phrase of the statement, the method further includes, when the one of the two plausible entigen groups is the more likely interpretation of the statement, updating the one of the two plausible entigen groups in accordance with the related entigen group and the second related entigen group to produce the updated entigen group. For example, the processing module updates the second plausible entigen group to move the connectivity of crying over to Kathy to produce the updated plausible entigen group when the related entigen group includes Robert witnessing Kathy crying when Linda insulted Kathy and observing that when Linda insulted Jen, Jen cried (e.g., not Linda).

The method continues at step 715 where the processing module adds the statement as the updated entigen group to the knowledge database. For example, the processing module integrates the entigens of the updated entigen group with existing entigens of the knowledge database to produce an updated knowledge database.

The method continues at step 716 where the processing module obtains a query entigen group. For example, the processing module receives a query that includes a question and IEI processes the question to produce the query entigen group. For example, the processing module produces a query entigen group that includes an entigen for who connected to an entigen for cry when the question includes "Who cried" or "Who cried, Linda or Kathy?"

The method continues at step 717 where the processing module generates a query response to the query entigen group utilizing the updated entigen group. The query response includes one or more of a query response entigen group and a plaintext answer. For example, the processing module compares the query entigen group to entigen groups of the updated entigen knowledge database (e.g., including the updated entigen group) to produce a favorable match (e.g., same topic).

The processing module interprets the updated entigen group in light of the query entigen group to identify the query response entigen group. For instance, the processing module interprets the updated entigen group utilizing the query entigen group to identify the Kathy entigen connected to the cried entigen as the query response entigen group. The processing module aggregates the query entigen group and a corresponding plaintext statement of "Kathy cried" to produce the query response.

When the alternative embodiment is utilized where the two plausible entigen groups are augmented, the method continues at step 720 where the processing module applies the related entigen group to the first plausible entigen group of the two plausible entigen groups to create a first augmented entigen group. For example, the processing module applies the entigen group of the statement that Robert witness Kathy crying when Linda insulted Kathy to the entigen group indicating that Linda insulted Kathy and Kathy cried to produce the first augmented entigen group to indicate that Linda insulted Kathy and Kathy cried (e.g., confirmation of the same).

The method continues at step 722 where the processing module applies related entigen group to the second plausible entigen group of the two plausible entigen groups to create a second augmented entigen group. For example, the processing module applies the entigen group of the statement that Linda insulted Jen and Jen cried to the entigen group indicating that Linda insulted Kathy and Linda cried to produce the second augmented entigen group to indicate that Linda insulted Kathy and Kathy cried (e.g., switching of who cried from Linda to Kathy based on the previous scenario when Jen cried as a result of Linda insulting Jen).

The method continues at step 724 where the processing module compares the first augmented entigen group to the second augmented entigen group to determine whether one of the two augmented entigen group is a more likely interpretation of the statement than the other one of the two augmented entigen groups. For example, the processing module compares the first augmented entigen group indicating that Linda insulted Kathy and Kathy cried to the second augmented entigen group indicating (e.g., the same), that Linda insulted Kathy and Kathy cried to indicate that either of the two augmented entigen groups is more likely interpretation since they are the same in this example. In other examples of the comparison results in identification of a stronger more likely interpretation of the statement when subtle differences still exist even after the augmentation steps.

When the one of the two augmented entigen groups is the more likely interpretation of the statement, the method continues at step 726 where the processing module generates the updated entigen group based on the one of the two augmented entigen groups. For example, the processing module generates the updated entigen group utilizing the first augmented entigen group to produce the updated entigen group that indicates that Linda insulted Kathy and Kathy cried. The method branches to step 715.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element, a sixth memory element, a seventh memory element, etc.) that stores operational instructions can, when executed by one or more processing modules of one or more computing devices (e.g., one or more servers, one or more user devices) of the computing system 10, cause the one or more computing devices to perform any or all of the method steps described above.

FIG. 11A is a schematic block diagram of another embodiment of a computing system that includes a plurality of domains 1 (D1) through domain N (DN) content sources 730, a corresponding plurality of the artificial intelligence (AI) servers 20-1 through 20-N of FIG. 1, and the user device 12-1 of FIG. 1. Each of the domain 1-N content sources 730 includes content sources 16-1 through 16-N of FIG. 1. In particular, each of the AI servers 20-1 through 20-N is associated with a corresponding domain D1-DN of content sources 730. Each of the AI servers 20-1 through 20-N includes the processing module 50-1 of FIG. 2 and the solid state (SS) memory 96 of FIG. 2, where each SS memory 96 is utilized to store associated domain knowledge. For instance, the SS memory 96 of the AI server 20-1 is utilized to store domain 1 fact base information 734, the AI server 20-2 is utilized to store domain 2 fact base information 734, etc. Each processing module 50-1 includes the collections module 120 of FIG. 4A, the identigen entigen intelligence (IEI) module 122 of FIG. 4A, and the query module 124 of FIG. 4A.

The user device 12-1 includes the processing module 50-1 of FIG. 2 and the solid state (SS) memory 96 of FIG. 2, where the SS memory 96 of the user device 12-1 is utilized to store associated domain knowledge. For instance, the SS memory 96 of the AI server 20-1 is utilized to store a portion of one or more domains 1-N fact base information 734 as composite fact base information 738. The processing module 50-1 of the user device 12-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to optimize a knowledge base (e.g., of the user device 12-1).

In an example of operation of the optimizing of the knowledge base, the IEI module 122 of the user device 12-1 receives one or more IEI requests 244 with regards to one or more query requests 136 received by the query module 124, where the one or more query requests 136 are associated with one or more domains. The IEI module 122 formats the one or more IEI requests 244 to produce human expressions that includes question content and question information associated with the one or more domains, where the producing of the human expressions is in accordance with expression identification rules. For example, the IEI module 122 analyzes the one or more IEI requests in accordance with rules from the SS memory 96.

Having produced the human expressions, the IEI module 122 applies IEI processing to the human expressions to produce one or more of new knowledge, a preliminary answer, and an answer quality level. For example, the IEI module 122 identifies permutations of identigens, reduces the permutations, maps the reduced permutations of identigens to entigens to produce knowledge, processes the knowledge in accordance with the local fact base of SS memory 96 to produce the preliminary answer and generates the answer quality level based on the preliminary answer for each domain.

When the answer quality level associated with one or more of the query requests 136 is unfavorable, the IEI module 122 identifies the domain associated with the unfavorable answer quality level. For example, the IEI module 122 correlates the associated query request with a domain associated with at least one of the AI servers 20-1 through 20-N. For each identified domain, the IEI module 122 issues a fact base request 732 to one or more AI servers 20. For example, for each request, the IEI module 122 identifies one or more of the AI servers that are associated with the domain, generates the fact base request 732 (i.e., to include requester identifier (ID), target ID, domain ID, a portion of the domain indicator, security credentials), and sends the fact base request 732 to a corresponding IEI module 122 of at least one of the AI servers 20-1 through 20-N.

Having sent the at least one fact base request 732, IEI module 122 of the user device 12-1 receives one or more corresponding fact base responses 736, where one or more of the AI servers 20-1 through 20-N responds to the one or more fact base requests 732, where each fact base response 736 includes at least a portion of a fact base associated with the corresponding AI server 20-1 through 20-N. The IEI module 122 stores composite fact base info 738 in the SS memory 96 of the user device 12-1, where the composite fact base info 738 includes at least some of the fact base info 734 from one or more of the AI servers 20-1 through 20-N. For example, the IEI module 122 extracts fact base info 734 from each fact base response 736, associates the fact base info 734 with a corresponding domain when storing the composite fact base info 738 in the SS memory 96 of the user device 12-1.

Having updated the fact base within the SS memory 96 of the user device 12-1, the IEI module 122 re-applies the IEI processing to the human expressions to produce an updated answer and an updated answer quality level, where the reapplying includes utilizing at least a portion of the composite fact base info 738. When the updated answer quality level is favorable, the IEI module 122 issues an IEI response 246 to the query module 124 utilizing the updated answer, where the query module 124 issues a query response 140 based on the IEI response 246.

FIG. 11B is a logic diagram of an embodiment of a method for optimizing a knowledge base within a computing system. In particular, a method is presented for use in conjunction with one or more functions and features described in conjunction with FIGS. 1-8L, 11A and also FIG. 11B. The method includes step 750 where a processing module of one or more processing modules of one or more computing devices of the computing system interprets one or more received requests to produce human expressions of questions associated with one or more domains. For example, the processing module determines content requirements, determine source requirements, indicates a domain for each request, determines answer timing requirements, determines a domain associated with each query request, and analyzes each request in accordance with human expression rules to produce the human expressions.

The method continues at step 752 where the processing module applies IEI processing to the human expressions utilizing a local fact base to produce one or more preliminary answer and answer quality level groupings. For example, the processing module identifies permutations of identigens, reduces the permutations, maps the reduced permutations of identigens to entigens to produce knowledge, processes the knowledge in accordance with the local fact base to produce supplementary answer and generate the answer quality level based on the preliminary answer for each domain.

When any answer quality level is unfavorable, the method continues at step 754 where the processing module identifies a domain associated with the unfavorable answer quality level. For example, the processing module correlates the associated query request with a domain associated with at least one other fact base of the computing system. For each domain, the method continues at step 756 where the processing module obtains further fact base info to augment the local fact base. For example, for each request, the processing module identifies one or more other fact bases that are associated with the domain, generates a fact base request, receives one or more fact base responses, where one or more of the other fact bases response to the one or more fact base requests, where each response includes at least a portion of a fact base associated with the responding other fact base, updates the local fact base with at least some received portions of the other fact bases to produce the augmented fact base.

The method continues at step 758 where the processing module re-applies IEI processing to the human expressions utilizing the augmented local fact base to produce one or more updated answer and answer quality level groupings. For example, the processing module identifies permutations of identigens, reduces the permutations, maps the reduced permutations of identigens to entigens to produce knowledge, processes the knowledge in accordance with the augmented local fact base to produce the updated answer, and generates the answer quality level based on the updated answer for each domain. For each updated answer associated with a favorable answer quality level, the method continues at step 760 where the processing module outputs a response to a corresponding received request, where the response includes the updated answer.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 12A is a schematic block diagram of another embodiment of a computing system that includes pre-crime content sources 780, the artificial intelligence (AI) server 20-1 of FIG. 1, and the user device 12-1 of FIG. 1. The pre-crime content sources 780 includes the content sources 16-1 through 16-N of FIG. 1. In particular, content sources associated with pre-crime content provide one or more of historical crime information, real-time police response activity records, Internet traffic, Internet traffic summaries, people information (e.g., medical records, court records, school records, police reports, terrorist watchlist, be on the lookout (BOLO) information, gun registration lists, group affiliations, etc.), physical world data (environmental, structural, machine, etc.), community beliefs (e.g., social media), and news outlet information (e.g., press releases, periodicals, radio broadcast, television news, financial market news, etc.), etc.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. Generally, an embodiment of this invention presents solutions where the computing system functions to produce a response to a query regarding likelihood of a crime occurring (e.g., of a cyber crime, a holdup, a strong arm robbery, a carjacking, a gang shooting, arson, a burglary, etc.) based on factual interpretations of early stages of the crime and/or likely distractions of a pre-crime sequence.

In an example of operation of the responding to the query, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements to include facts that can lead to prediction of the crime, determines the source requirements to include the pre-crime content sources 780, determines the answer timing requirements to include a timeframe associated with the predicted occurrence, and identifies a particular type of crime (e.g., carjacking) as the domain when receiving the query request 136 that includes a question "what is a temporal view of likelihood of a crime occurring?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next 60 minutes associated with a typical pre-crime distraction of the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to the crime) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the pre-crime content sources 780, determines the content selection requirements to include content associated with the crime (e.g., scenarios that are affiliated with the pre-crime distractions and/or the crime), and determines the content acquisition timing requirements to include a time span for collection if any (e.g., the next 60 minutes).

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements (e.g., looking for indicators of pre-crime), and sends the plurality of content requests 126 to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level and indicating a favorable response quality level when the estimated response quality level compares favorably to a minimum response quality threshold level (e.g., enough indicators have been collected to identify specific scenarios leading to one or more potential crimes in progress). When the response quality level is favorable, the collections module 120 issues a collections response 134 to the IEI module 122, where the collections response 134 includes further content. For example, the collections module 120 generates the collections response 134 to include the further content and the estimated response quality level and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which predicts the likelihood of the crime by identifying one or more crime scenarios and indicators of evolution of the one or more scenarios. The evolution of the scenarios discussed in greater detail with reference to FIG. 12B.

When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

FIG. 12B is a data flow diagram for providing an answer to a question with regards to likelihood of a crime utilizing pre-crime sequence detection within a computing system, where a computing device of the computing system performs the resolve answer step 644, based on rules 316, time 790 (e.g., real-time, historical time values relative to content collection), and fact base info 600, on content that includes an estimated value and desired range for each of n conditions for each of N crime sequences to produce preliminary answers 354. Each condition of the content describes status of an outside force that can be determined based on fact base info 600 (e.g., a sign of a carjacking, etc.).

The computing device compares the estimated value of the condition to a desired range (e.g., minimum/maximum of a metric) associated with the condition to produce the status (e.g., probability of a factual element based on the comparison). Each sequence includes an ordered series of conditions that are estimated to have values that compare favorably to an associated desired value range to complete the sequence (e.g., ordering may be strict or flexible). The plurality of sequences may include any number of sequences to link to the occurrence.

In an example of operation, one sequence is utilized with three conditions to provide a likelihood of a strong arm robbery on a neighborhood clothing store, where the first condition is an Internet capture phrase indicating discussion about a security vulnerability of the neighborhood clothing store, the second condition is a historical description captured on the Internet with regards to how a previous strong arm robbery was committed at the neighborhood clothing store, and a third condition is evidence of an individual associated with previous similar strong-arm robberies to be within a threshold geographic proximity of the neighborhood clothing store. The computing device obtains the content for the first through third conditions and generates a preliminary answer 354 that indicates that the likelihood of the strong arm robbery crime at the local clothing store is elevated.

FIG. 12C is a logic diagram of an embodiment of a method for providing an answer to a question with regards to likelihood of a crime within a computing system. In particular, a method is presented for use in conjunction with one or more functions and features described in conjunction with FIGS. 1-8L, 12A-12B, and also FIG. 12C. The method includes step 800 where a processing module of one or more processing modules of one or more computing devices of the computing system interprets a received query request from a requester to produce query requirements with regards to a crime. The interpreting includes one or more of determining content requirements, (e.g., to gather conditions of sequences to determine likelihood of the crime), determining source requirements, determining answer timing requirements, and identifying a domain associated with the query request (e.g., a robbery, a carjacking, a cyber theft).

The method continues at step 802 where the processing module IEI processes human expressions of the received query request based on a fact base generated from previous content to produce a preliminary crime answer. The processing may include formatting portions of the query request in accordance with formatting rules to produce recognizable human expressions of content and question information. For example, the processing module produces the question information to include a request to determine likelihood of the crime (e.g., identifying conditions and scenarios that lead to the crime).

The processing may further include identifying permutations of identigens within the human expressions, reducing the permutations, mapping the reduced permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., start looking for values of conditions associated with scenarios to support answering the likelihood of crime question).

When the answer quality level is unfavorable, the method continues at step 804 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 806 where the processing module obtains further content from a plurality of pre-crime content sources based on the content requirements. For example, the processing module identifies the plurality of pre-crime content sources, generates content requests based on the content requirements, and sends the plurality of content requests to the plurality of identified pre-crime content sources.

The processing module further analyzes a plurality of content responses to produce an estimated quality level, indicates favorable quality level when the estimated quality level compares favorably to a minimum quality threshold level (e.g., enough content has been collected to identify triggers that indicate one or more scenarios playing out associated with one or more crimes), and indicates unfavorable quality level to facilitate collecting more content when the estimated quality level compares unfavorably to the minimum quality threshold level.

The method continues at step 808 where the processing module IEI processes human expressions of the further content based on the fact base to produce an updated preliminary attack answer that identifies the likelihood of the crime. For example, the processing module analyzes, based on one or more of the query request, the fact base info associated with the identified domain, and the further content to produce one or more of updated fact base info (e.g., new knowledge), the updated preliminary occurrence answer (e.g., likelihood of crime), and an associated answer quality level. The analyzing may include reasoning the further content with the fact base to produce the updated fact base info and the preliminary answer to include the likelihood of the crime.

When the updated answer quality level is favorable, the method continues at step 810 where the processing module issues a query response to the requester that predicts the likelihood of the crime. The issuing includes one or more of analyzing the preliminary answers in accordance with the query requirements and the rules to generate the updated quality level, generating the query response to include the answer associated with favorable quality level, and sending the query response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 13A is a schematic block diagram of another embodiment of a computing system that includes pre-trigger content sources 820, the artificial intelligence (AI) server 20-1 of FIG. 1, and the user device 12-1 of FIG. 1. The pre-trigger content sources 820 includes the content sources 16-1 through 16-N of FIG. 1. In particular, content sources associated with pre-trigger content provide one or more of historical information, real-time event information, Internet traffic, Internet traffic summaries, people information (e.g., medical records, court records, school records, police reports, terrorist watchlist, be on the lookout (BOLO) information, gun registration lists, group affiliations, etc.), physical world data (environmental, structural, machine, etc.), community beliefs (e.g., social media), and news outlet information (e.g., press releases, periodicals, radio broadcast, television news, financial market news, etc.), etc.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A.

Generally, an embodiment of this invention presents solutions where the computing system functions to provide an answer to a question with regards to likelihood of a sequence trigger detection, where potential paths that lead to a trigger detection are analyzed to determine a likelihood for each path. A trigger can refer to any state transition of a physical entity or concept where a transition has occurred (e.g., trigger) from one state to another or from an unlikely status to a likely status. Examples of triggers includes popularity of a particular political candidate has crossed below a low threshold level (e.g., transitioning from popular to unpopular), commute time from point A to point B exceeds a maximum desired travel time, online consumers of region A prefer product X over product Y by a margin of 10%, and women are increasingly elected as CEOs of corporations based on a particular mix of business impacting and social commitment decision criteria.

In an example of operation of the providing the answer with regards to the likelihood of the sequence trigger detection, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements with regards to pre-trigger detection, determines the source requirements to include the pre-trigger content sources 820, determines the answer timing requirements to include a timeframe associated with the potential paths leading to the trigger detection, and identifies a particular type of trigger as the domain when receiving the query request 136 that includes a question "what is a most likely scenario and/or path for [trigger] occurring?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next seven days associated with a typical pre-trigger question of the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., facts pertaining to the one or more paths of trigger sequences) obtained from the SS memory 96. The one or more paths of trigger sequences is discussed in greater detail with reference to FIG. 13B.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the pre-trigger content sources 820, determines the content selection requirements to include content associated with the trigger (e.g., scenarios of sequences that are affiliated with the pre-trigger distractions and/or the trigger), and determines the content acquisition timing requirements to include a time span for collection if any (e.g., the next seven days).

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements (e.g., looking for indicators of a plurality of conditions within range that progress a trigger sequence resulting in an indication of a valid trigger detection), and sends the plurality of content requests 126 to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level and indicating a favorable response quality level when the estimated response quality level compares favorably to a minimum response quality threshold level (e.g., enough events indicators of events have been observed to indicate that one or more specific trigger scenarios have detected a trigger). When the response quality level is favorable, the collections module 120 issues a collections response 134 to the IEI module 122, where the collections response 134 includes further content. For example, the collections module 120 generates the collections response 134 to include the further content and the estimated response quality level and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which predicts the likelihood of the trigger by identifying one or more trigger scenarios and indicators of evolution (e.g., events of the trigger scenario are within range) of the one or more scenarios. The evolution of the scenarios discussed in greater detail with reference to FIG. 13B.

When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer associated with the favorable quality level of the answer.

FIG. 13B is a data flow diagram for providing an answer to a question with regards to likelihood of a sequence trigger detection within a computing system, where a computing device of the computing system performs the resolve answer step 644, based on rules 316, time 790 (e.g., real-time, historical time values relative to content collection), and fact base info 600, on content that includes an estimated value and desired range for each of n conditions for each of N trigger sequences to produce preliminary answers 354. Each condition of the content describes status of an outside force that can be determined based on fact base info 600 (e.g., a sign of a shift in perception of a political candidate, etc.).

The computing device compares the estimated value of the condition to a desired range (e.g., minimum/maximum of a metric) associated with the condition to produce the status (e.g., probability of a factual element based on the comparison). Each sequence includes an ordered series of conditions that are estimated to have values that compare favorably to an associated desired value range to complete the sequence (e.g., ordering may be strict or flexible). The plurality of N sequences may include any number of sequences that either link to one master trigger, represent N pads for capital and triggers, or are each considered alternative paths to a common trigger, where detecting just one indicates that a particular path or branch to the common trigger has been detected.

In an example of operation, the trigger sequence 1 is utilized with three conditions to provide a likelihood of a shift in feeling of a political candidate where the first condition is an Internet capture phrase indicating discussion about the candidate versus another candidate, the second condition is a historical description captured on the Internet with regards to how a previous political candidate was successfully elected or defeated for a similar political position, and a third condition is evidence of voting propensity for a representative sample of the voting population with regards to a plurality of candidates including the candidate.

The computing device obtains the content for the first through third conditions of the trigger sequence 1 and generates a preliminary answer 354 that indicates the likelihood of the shift in feeling of the political candidate. The indication may further include indicating that the path was via the trigger sequence 1 (e.g., as opposed to one or more of the other trigger sequences which may be analyzed in parallel).

FIG. 13C is a logic diagram of an embodiment of a method for providing an answer to a question with regards to likelihood of a sequence trigger detection within a computing system. In particular, a method is presented for use in conjunction with one or more functions and features described in conjunction with FIGS. 1-8L, 13A-13B, and also FIG. 13C. The method includes step 830 where a processing module of one or more processing modules of one or more computing devices of the computing system interprets a received query request from a requester to produce query requirements with regards to a trigger. The interpreting includes one or more of determining content requirements, (e.g., to gather conditions of one or more sequences to determine likelihood of the trigger), determining source requirements, determining answer timing requirements, and identifying a domain associated with the query request (e.g., a type of trigger).

The method continues at step 832 where the processing module IEI processes human expressions of the received query request based on a fact base generated from previous content to produce a preliminary trigger answer. The processing may include formatting portions of the query request in accordance with formatting rules to produce recognizable human expressions of content and question information. For example, the processing module produces the question information to include a request to determine likelihood of the trigger (e.g., identifying scenarios and conditions of the scenarios that lead to the trigger based on previous knowledge of the trigger type).

The processing may further include identifying permutations of identigens within the human expressions, reducing the permutations, mapping the reduced permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., start looking for values of conditions associated with scenarios to support answering the likelihood of trigger question).

When the answer quality level is unfavorable, the method continues at step 834 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 836 where the processing module obtains further content from a plurality of pre-trigger content sources based on the content requirements. For example, the processing module identifies the plurality of pre-trigger content sources, generates content requests based on the content requirements, and sends the plurality of content requests to the plurality of identified pre-trigger content sources, analyzes a plurality of content responses to produce an estimated quality level, indicates favorable quality level when the estimated quality level compares favorably to a minimum quality threshold level (e.g., enough content has been collected to identify in-range values of conditions that indicate one or more scenarios playing out associated with one or more paths to a common trigger), and indicates unfavorable quality level to facilitate collecting more content when the estimated quality level compares unfavorably to the minimum quality threshold level.

The method continues at step 838 where the processing module IEI processes human expressions of the further content based on the fact base to produce an updated preliminary trigger answer that identifies the likelihood of the trigger. For example, the processing module analyzes, based on one or more of the query request, the fact base info associated with the identified domain, and the further content to produce one or more of updated fact base info (e.g., new knowledge), the updated preliminary occurrence answer (e.g., likelihood of the trigger), and an associated answer quality level. The analyzing may include reasoning the further content with the fact base to produce the updated fact base info and the preliminary answer to include the likelihood of the trigger.

When the updated answer quality level is favorable, the method continues at step 840 where the processing module issues a query response to the requester that predicts the likelihood of the trigger. The issuing includes one or more of analyzing the preliminary answers in accordance with the query requirements and the rules to generate the updated quality level, generating the query response to include the answer associated with favorable quality level, and sending the query response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 14A is a schematic block diagram of another embodiment of a computing system that includes user interface optimization sources 850, the artificial intelligence (AI) server 20-1 of FIG. 1, and the user device 12-1 of FIG. 1. The user interface optimization sources 850 includes the content sources 16-1 through 16-N of FIG. 1 and the user devices 12-1 through 12-N of FIG. 1. In particular, content sources associated with user interface optimization content provide one or more of publicly available information with regards to user interfaces (e.g., approaches, parameters, etc.), historical user interface parameters, user interface test data, user interface parameters from similar user devices, user interface parameters utilized by one or more other users that share at least one commonality aspect with a user of the user device 12-1, assessments of user interface requirements, special needs user interfaces, language translation supporting user interface parameter optimizations, message board threads by users of similar user devices where the threads include discussion for interpretation with regards to user interface information, etc.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A.

Generally, an embodiment of this invention presents solutions where the computing system functions to provide an answer to a question with regards to optimizing user interface parameters, where the user device utilizes a user interface approach, and where the user interface approach utilizes user interface parameters to provide optimized operation. The user interface includes a variety of interfaces including a visual output device, a user input device, an audio output device, a visual input device, a sensor input. Examples of specific user interfaces is discussed in more detail with reference to FIG. 3.

In an example of operation of the providing the answer with regards to the likelihood of the sequence trigger detection, the query module 124 interprets a received query request 136 to produce query requirements. The interpreting includes one or more of determining content requirements, determining source requirements, determining answer timing requirements, and identifying at least one domain associated with the query request 136. For example, the query module 124 determines the content requirements with regards to optimization of a user interface, determines the source requirements to include the user interface optimization sources 850 and determines the answer timing requirements to include a timeframe associated with utilization of the user interface. The query module 124 further identifies a particular type of user interface as the domain when receiving the query request 136 that includes a question "what are optimized user interface parameters for this user device?"

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next two days prior to utilization of the user interface associated with a question of the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., knowledge pertaining to user interface optimization) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base (e.g., fact base info 600) to produce the preliminary answer, and generating the answer quality level based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the user interface optimization sources 850, determines the content selection requirements to include content associated with the user interface (e.g., utilization of a similar user interface to indicate optimized user interface parameters), and determines the content acquisition timing requirements to include a time span for collection if any (e.g., the next two days).

Having produced the content requirements, the collections module 120 issues a plurality of content requests 126 to a plurality of content sources identified by the content requirements (e.g., to the content sources 16-1 through 16-N, to other user devices). For example, the collections module 120 identifies the plurality of content sources, generates the content requests based on the content requirements (e.g., looking for content associated with utilization and optimization of user interfaces), and sends the plurality of content requests 126 to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level and indicating a favorable response quality level when the estimated response quality level compares favorably to a minimum response quality threshold level (e.g., enough content has been accumulated to reliably produce new knowledge that is relevant to the optimization of the user interface).

When the response quality level is favorable, the collections module 120 issues a collections response 134 to the IEI module 122, where the collections response 134 includes further content. For example, the collections module 120 generates the collections response 134 to include the further content and the estimated response quality level and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which includes guidance for optimization of selection of a user interface approach and/or user interface parameters of one or more user interface approaches.

When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer.

When the quality level of the received answer is favorable, the query module 124 issues a query response 140 to the user device 12-1. The query response 140 includes the answer (e.g., how to establish optimized user interface parameters for these are device 12-1) associated with the favorable quality level of the answer.

FIG. 14B is a logic diagram of an embodiment of a method for providing an answer to a question with regards to optimizing user interface parameters within a computing system. In particular, a method is presented for use in conjunction with one or more functions and features described in conjunction with FIGS. 1-8L, 14A and also FIG. 14B. The method includes step 860 where a processing module of one or more processing modules of one or more computing devices of the computing system interprets a received query request from a requester to produce query requirements with regards to optimizing user interface parameters. The interpreting includes one or more of determining content requirements, (e.g., to gather content associated with the optimization of the user interface parameters), determining source requirements, determining answer timing requirements, and identifying a domain associated with the query request (e.g., a user interface operation).

The method continues at step 862 where the processing module IEI processes human expressions of the received query request based on a fact base generated from previous content to produce a preliminary set of user interface parameters. The processing includes formatting portions of the query request in accordance with formatting rules to produce recognizable human expressions of content and question information. For example, the processing module produces the question information to include a request to determine the user interface parameters.

The processing further includes identifying permutations of identigens within the human expressions, reducing the permutations, mapping the reduced permutations to entigens to produce knowledge, processing the knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., start looking for content associated with utilizing a particular user interface over the next two days).

When the answer quality level is unfavorable, the method continues at step 864 where the processing module generates content requirements. The generating of the content requirements includes determining, based on one or more of the query requirements, preliminary answer, and the answer quality level, one or more of content selection requirements, source selection requirements, and acquisition timing requirements.

The method continues at step 866 where the processing module obtains further content from a plurality of user interface optimization content sources based on the content requirements. For example, the processing module identifies the plurality of user interface optimization content sources, generates content requests based on the content requirements, and sends the plurality of content requests to the plurality of identified user interface optimization content sources.

The processing module analyzes a plurality of content responses to produce an estimated quality level, indicates favorable quality level when the estimated quality level compares favorably to a minimum quality threshold level (e.g., enough content has been collected to produce new knowledge with regards to optimization of the user interface). The processing module indicates unfavorable quality level to facilitate collecting more content when the estimated quality level compares unfavorably to the minimum quality threshold level.

The method continues at step 868 where the processing module IEI processes human expressions of the further content based on the fact base to produce an updated preliminary set of user interface parameters (e.g., a preliminary answer). For example, the processing module analyzes, based on one or more of the query request, the fact base info associated with the identified domain, and the further content to produce one or more of updated fact base info (e.g., new knowledge), the updated preliminary answer (e.g., the updated preliminary set of user interface parameters), and an associated answer quality level. The analyzing may include reasoning the further content with the fact base to produce the updated fact base info and the preliminary answer to include the updated preliminary set of user interface parameters.

When the updated answer quality level is favorable, the method continues at step 870 where the processing module issues a query response to the requester that includes an optimized set of user interface parameters. The issuing includes one or more of analyzing the preliminary answers in accordance with the query requirements and the rules to generate the updated quality level, generating the query response to include the answer associated with favorable quality level, and sending the query response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 15A is a schematic block diagram of another embodiment of a computing system that includes artifact content sources 880, the artificial intelligence (AI) server 20-1 of FIG. 1, and the user device 12-1 of FIG. 1. The artifact content sources 880 includes the content sources 16-1 through 16-N of FIG. 1. The content sources associated with artifact content provide artifact content. Examples include of historical unfavorable document artifact information, contract information, contract templates, contract boilerplate passages based on contract types, social media content (e.g., message board threads utilized by document creation and review practitioners), public records of property and title, contract litigation history, Internet traffic and Internet traffic summaries. Examples of artifact content further include people information (e.g., medical records, court records, school records, police reports, terrorist watchlist, be on the lookout (BOLO) information, gun registration lists, group affiliations, etc.), physical world data (environmental, structural, machine, etc.), community beliefs (e.g., social media), and news outlet information (e.g., press releases, periodicals, radio broadcast, television news, financial market news, etc.), etc.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A.

Generally, an embodiment of this invention presents solutions where the computing system 10 supports providing an answer to a question with regards to identifying an undesired document artifact in a document. Examples of the document include a letter of intent, a term sheet, a lease agreement, a purchase agreement, or any other agreement between two or more parties, etc.

The undesired document artifact includes one or more passages that may unfavorably conflict with each other and/or a single passage that has unfavorable implications for at least one party associated with the document. For example, a legal agreement is drafted by a first party to include two passages that unfavorably conflict (e.g., say different things with regards to a term of the agreement, cause confusion, cause an unfavorable outcome to another party, leave something out that is important) and the computing system identifies the two unfavorably conflicting passages. The two conflicting passages may further manifest when a first passage is from a reference document (e.g., a known reliable term sheet) and the second passages from a document under review (e.g., a draft agreement). Several embodiments of the invention are presented. A second embodiment is discussed with reference to FIGS. 15C-15F.

In an example of operation of a first embodiment of the providing the answer with regards to the identification of the undesired document artifact, the query module 124 interprets a received query request 136 to produce query requirements. The interpreting includes one or more of determining content requirements, determining source requirements, determining answer timing requirements, and identifying at least one domain associated with the query request 136.

In an example of the interpreting, the query module 124 receives the query request 136 that includes a question "what hidden artifacts within this [document] may be unfavorable?" The query module 124 determines the content requirements with regards to document unfavorable artifact detection, determines the source requirements to include the artifact content sources 880, determines the answer timing requirements to include a timeframe associated with completion of document review and amendments, and identifies a particular type of document as the domain.

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next six hours prior to completion of reviewing and amending the document associated with the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules and fact base information 600 (e.g., knowledge pertaining to finding unfavorable artifacts within documents) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with rules, mapping the reduced permutations of identigens to entigens to generate knowledge, processing the knowledge in accordance with the fact base (e.g., fact base info 600) to produce the preliminary answer, and generating the answer quality level (e.g., completeness measure) based on the preliminary answer and the request (e.g., the IEI request 244, the query request 136).

When the answer quality level is unfavorable, the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the artifact content sources 880, determines the content selection requirements to include content associated with the document type (e.g., other documents and discovered artifacts) and determines the content acquisition timing requirements to include a time span for collection if any (e.g., the next six hours).

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements (e.g., looking for content associated with detecting undesired document artifacts), and sends the plurality of content requests 126 to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level and indicating a favorable response quality level when the estimated response quality level compares favorably to a minimum response quality threshold level (e.g., enough content has been accumulated to reliably produce new knowledge that is relevant to detecting the undesired document artifacts).

When the response quality level is favorable, the collections module 120 issues a collections response 134 to the IEI module 122, where the collections response 134 includes further content. For example, the collections module 120 generates the collections response 134 to include the further content and the estimated response quality level and sends the collections response 134 to the IEI module 122.

The IEI module 122 analyzes the further content based on one or more of the IEI request 244 and the fact base information 600 to produce one or more of updated fact base information (e.g., new knowledge for storage in the SS memory 96) and a preliminary answer with an associated preliminary answer quality level. For example, the IEI module 122 reasons the further content with the fact base information 600 to produce the preliminary answer which includes identification of one or more undesired artifacts within the document and may further include a suggested remedy.

When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer (e.g., identification of the undesired document artifacts) associated with the favorable quality level of the answer.

FIG. 15B is a data flow diagram for the example of operation of the first embodiment of identifying an undesired document artifact within a computing system. The data flow diagram includes the IEI module 122 of FIG. 15A and fact base information 600 in the form of content sources 890. The content sources 890 includes a plurality of artifact sources A1-AN groupings table 892. Each groupings table 892 includes multiple fields including fields for a group (GRP) identifier (ID) 586, word strings 588, identigen (IDN) string 626, and an entigen (ENI) 628. For instance, the groupings tables 892 of the content sources 890 includes word strings and identifiers associated with examples of undesired document artifacts such as which party compensates which other party and how much.

As an example of operation of providing an answer to a query, the IEI module 122 interprets the IEI request 244, facilitates obtaining the fact base information 600, and generates the preliminary answer based on the rules 316 and associated time frames relevant to the question of the IEI request 244. For example, the IEI module 122 generates the preliminary answer to indicate that "unfavorable artifacts include uncertainty of A compensating B, a conflicting compensation amount, and a conflicting delivery date".

FIGS. 15C-15E are further data flow diagrams for examples of operation of a second embodiment of identifying the undesired document artifact within the computing system. The second embodiment includes high-level steps of obtaining raw content (source content 310), generating entigen groups for meanings of phrases of related topics in step 894, identifying entigen groups with a meaning difference in step 896 and providing difference abatement in step 898. Each of the steps will be discussed in greater detail with reference to FIGS. 15C-15F.

FIG. 15C illustrates an example of operation of the second embodiment of the identifying the undesired document artifact where the raw content 310 is obtained where the raw content includes one or more documents of at least some related topics. For example, a reference document and a document under review (e.g., a rental term sheet and a draft rental agreement). As another example, a single document with many passages discussing a related topic (e.g., the draft rental agreement). As yet another example, two or more documents that pertain to a related topic (e.g., two versions of a draft rental agreement). Many more permutations of documents are possible where the documents include a plurality of phrases for analysis.

The step 894 generates entigen groups for meanings of the phrases of the related topic. The generating includes comparing words of each phrase to characters of a dictionary (e.g., of a particular language) to identify valid words. The identifying includes, for each word, identifying, utilizing an identigens list, a set of identigens that correspond to different meanings of same word. Identigen ordering rules, of the particular language, are applied to each set of identigens for adjacent identigens and strings of two or more identigens to determine valid sequences of adjacent and sequential identigens to select valid entigens for each set of identigens to produce an entigen group for each phrase or portion of a phrase. Each entigen group represents a meaning of a phrase.

Having generated the entigen groups, the step 896 identifies the entigen groups with a meaning difference for two or more related topic phrases. For example, a first entigen group that corresponds to a first phrase (e.g., which could be a phrase under review) is compared to a second entigen group of a second phrase (e.g., which could be a reference phrase) to produce the meaning difference. The meaning difference includes a conflict when meanings of entigens of the two or more entigen groups are different. The meaning difference further includes missing portions of one of the phrases compared to the other phrase when one or more entigens are missing from an entigen group that is similar to another entigen group.

Having identified the entigen groups with the meaning difference, the step 898 provides the difference abatement. The difference abatement includes one or more of updating phrases that are conflicting or missing information and updating entigen groups that correspond to the phrases for updating. The difference abatement further includes one or more of indicating the meaning difference and indicating the conflicting or missing information with reference to the one or more phrases that have conflicting or missing information. A specific example of operation is discussed in greater detail with reference to FIG. 15D for a conflicting information scenario and another specific example of operation is discussed in greater detail with reference to FIG. 15E for a missing information scenario.

FIG. 15D illustrates another example of operation of the second embodiment of the identifying the undesired document artifact where the undesired document artifact is conflicting information. In the example, a draft rental agreement includes a first phrase "The renter shall pay the landlord rent of $1000 every month.", a second phrase "The landlord is to be paid the rent every four weeks", and a third phrase "The landlord shall be paid a rent of USD $1000.

The step 894 generates first, second and third entigen groups from the first second and third phrases. The first entigen group is generated from the first phrase where the first entigen group includes a renter entigen connected to a pays rent entigen which is connected to a landlord entigen. A $1000 characteristic entigen is connected to the pays rent entigen and a monthly characteristic entigen is connected to the pays rent entigen.

The second entigen group is generated from the second phrase where the second entigen group includes a paid rent entigen connected to the landlord entigen and a every four weeks characteristic entigen connected to the paid rent entigen. The third entigen group is generated from the third phrase where the third entigen group includes a $1000 characteristic entigen connected to the paid rent entigen which is connected to the landlord entigen.

The step 896 identifies the entigen groups with the meaning difference. For example, the first and second entigen groups have similar, but not identical, meaning since a landlord is being paid rent in both entigen groups. The meaning difference is with regards to the characteristic entigens describing the pain of the rent. For example, the first entigen group describes the rent characteristic as monthly while the second entigen group describes the rent characteristic as every four weeks. While similar, monthly is not identical to every four weeks.

The step 898 provides the difference abatement where the words of the first and second conflicting phrases are identified that conflict. For example, the word "month" of the first phrase is identified to be in conflict with the words "4 weeks" of the second phrase.

FIG. 15E illustrates another example of operation of the second embodiment of the identifying the undesired document artifact where the undesired document artifact is the missing information. In the example, a rental agreement term sheet (e.g., a reference document) includes a reference first phrase "rent: $1000, period: monthly, payer: renter, payee: landlord, term: 12 months." Further in the example, a draft rental agreement includes a second phrase "The renter shall pay the landlord rent of $1000 every month".

The step 894 generates a reference entigen group 1 and an entigen group 2 respectively from reference phrase 1 and the phrase 2. The reference entigen group 1 is generated from the reference phrase 1 to include a renter entigen connected to a pays rent entigen which is connected to a landlord entigen. A $1000 characteristic entigen is connected to the pays rent entigen, a monthly characteristic entigen is connected to the pays rent entigen, and a for 12 months characteristic entigen is connected to the pays rent entigen.

The entigen group 2 is generated from the phrase 2 to include the renter entigen connected to the pays rent entigen connected to the landlord entigen. The entigen group 2 further includes a $1000 characteristic entigen connected to the pays rent entigen, and a monthly characteristic entigen connected to the pays rent entigen.

The step 896 identifies the entigen groups with the meaning difference. For example, the reference entigen group 1 and entigen group 2 have similar, but not identical, meaning since a landlord is being paid rent in both entigen groups of $1000 on a monthly basis. The meaning difference is with regards to the term characteristic entigen present in the reference entigen group 1 but missing from the entigen group 2. While similar, the entigen group 2 of the draft rental agreement is missing the term characteristic for 12 months.

The step 898 provides the difference abatement where the words of the first and second phrases of the missing information are identified. For example, the words "for a term of 12 months etc." of the first phrase is missing from words of the phrase 2.

FIG. 15F is a logic diagram of the second embodiment of the method identifying an undesired document artifact within a computing system. In particular, a method is presented for use in conjunction with one or more functions and features described in conjunction with FIGS. 1-8L, 15A-15E, and also FIG. 15F. The method includes step 900 where a processing module of one or more processing modules of one or more computing devices of the computing system generates a plurality of entigen groups from a plurality of phrases of a related topic (e.g., the rental agreement).

The plurality of entigen groups represents most likely meanings of the plurality of phrases. For example, the generating includes generating a first entigen group from a first phrase of a first document and a second entigen group from a second phrase of the first document (e.g., when looking for conflicts within a common document). In another example, the generating includes generating the first entigen group from the first phrase of the first document and the second entigen group from a second phrase of a second document (e.g., when looking for missing information or conflicts between a reference document in a document under review).

The method continues at step 902 where the processing module identifies the first entigen group and the second entigen group of the plurality of entigen groups. A first meaning of the first entigen group is similar to a second meaning of the second entigen group. The first meaning is similar to, but not identical to, the second meaning. In an alternative embodiment, the identifying further includes identifying a third entigen group of the plurality of entigen groups. A third meaning of the third entigen group is similar to the first meaning of the first entigen group and to the second meaning of the second entigen group. The third meaning is similar to, but not identical to, the first meaning and the second meaning.

The method continues at step 904 where the processing module determines a meaning difference between the first meaning and the second meaning (e.g., conflicting meanings, missing meanings). For example, the processing module compares entigens of the first entigen group to entigens of the second entigen group to identify the meaning difference (e.g., different entigens of different meanings, missing entigens). When the embodiment includes the identifying of the third entigen group, the determining of the meaning difference further includes determining the meaning difference between each of the third meaning, the first meaning, and the second meaning.

The method continues at step 906 where the processing module determines a meaning priority for the meanings. The determining of the meaning priority includes a variety of approaches. A first approach to determining the meaning priority includes, when the second phrase has a phrase under review status and the first phrase has a reference phrase status, indicating the first meaning has the priority over the second meaning, where the second entigen group is generated from the second phrase and the first entigen group is generated from the first phrase.

A second approach to determining the meaning priority includes, when the first phrase has the phrase under review status and the second phrase has the reference phrase status, indicating the second meaning has the priority over the first meaning. A third approach to determining the meaning priority includes, when the first entigen group compares more favorably to the third entigen group of the plurality of entigen groups than the second entigen group compares to the third entigen group, indicating the first meaning has the priority over the second meaning, where the third meaning of the third entigen group is similar to, but not identical to, the first meaning.

A fourth approach to determining the meaning priority includes, when the second entigen group compares more favorably to the third entigen group than the second entigen group compares to the third entigen group, indicating the second meaning has the priority over the first meaning. The third meaning of the third entigen group is similar to, but not identical to, the second meaning.

The method branches to step 912 when the second meaning has the priority over the first meaning. The method branches to step 916 when the third meaning has the priority over the first meaning and the second meaning. The method continues to step 908 when the first meaning has the priority over the second meaning.

When the first meaning has priority over the second meaning, the method continues at step 908 where the processing module updates the second entigen group in accordance with the meaning difference to produce an updated second entigen group. The updating of the second entigen group using the updated second meaning to produce the updated second entigen group includes a variety of approaches.

A first approach to updating of the second entigen group includes combining the second meaning and a priority portion of the first meaning in accordance with the meaning difference to produce the updated second meaning. For example, the "four weeks" is replaced with "monthly" in the conflicting rental agreement example. As another example, the "12 month" term is added in the missing information rental agreement example.

A second approach to updating of the second entigen group includes receiving, in response to a request for the updated second meaning, the updated second meaning, where the request for the updated second meaning includes the meaning difference. For example, the processing module issues the request to a responding entity (e.g., a user device) and receives the response from the responding entity with guidance in the form of the updated second meaning. For instance, the processing module receives guidance to utilize the "monthly" meaning rather than the "four weeks" meaning from the responding entity.

A third approach to updating of the second entigen group includes interpreting the meaning difference to produce the updated second meaning. For example, the processing module compares the "monthly" meaning and the "four weeks meaning" to each other and/or two meanings from other rental agreements to determine that the "monthly" meaning is a more appropriate updated second meaning.

The method continues at step 910 where the processing module updates the second phrase utilizing the updated second entigen group. The plurality of phrases includes the second phrase and the second entigen group corresponds to the second phrase. For example, the processing module generates text for the second phrase using the updated second entigen group to include "the landlord is to be paid the rent every month" in the rental agreement example.

When the second meaning has priority over the first meaning, the method continues at step 912 where the processing module updates the first entigen group in accordance with the meaning difference to produce an updated first entigen group. The updating of the first entigen group includes utilizing an updated first meaning by a variety of approaches. A first approach includes combining the first meaning and a priority portion of the second meaning in accordance with the meaning difference to produce the updated first meaning. A second approach includes receiving, in response to a request for the updated first meaning, the updated first meaning, where the request for the updated first meaning includes the meaning difference. A third approach includes interpreting the meaning difference to produce the updated first meaning.

The method continues at step 914 where the processing module updates the first phrase utilizing the updated first entigen group. The plurality of phrases includes the first phrase and the first entigen group corresponds to the first phrase.

When the embodiment includes the identifying of the third entigen group, and when the third meaning has priority over the first meaning and the second meaning, the method continues at step 916 where the processing module updates the first entigen group in accordance with the meaning difference to produce the updated first entigen group and updates the second entigen group in accordance with the meaning difference to produce the updated second entigen group. For example, in the rental agreement example, when a further term sheet reference document includes the third phrase that produces the third entigen group specifying that the word "tenant" shall be utilized rather than "renter", the processing module updates the first and second entigen groups to portray meanings including "tenant" rather than "renter".

The method continues at step 918 where the processing module updates the first phrase utilizing the updated first entigen group and updates the second phrase utilizing the updated second entigen group. For example, the processing module generates the updated first phrase of "The tenant shall pay the landlord rent of $1000 every month" and generates the updated second phrase of "The landlord shall receive the rent every four weeks from the tenant".

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 16A is a schematic block diagram of another embodiment of a computing system that includes trusted content sources 938, the artificial intelligence (AI) server 20-1 of FIG. 1, and the user device 12-1 of FIG. 1. The trusted content sources 938 includes the content sources 16-1 through 16-N of FIG. 1. In particular, content sources associated with trusted content provide one or more of content associated with historically favorable accuracy levels of content (e.g., more likely true than not), known levels of fact worthiness, known to be able to extract knowledge from content, etc.

The AI server 20-1 includes the processing module 50-1 of FIG. 2 and the solid state (SS) memory 96 of FIG. 2. The processing module 50-1 includes the collections module 120 of FIG. 4A, the identigen entigen intelligence (IEI) module 122 of FIG. 4A, and the query module 124 of FIG. 4A. the SS memory 96 includes a single type database 932 (e.g., a single document type format) and a graphical database 934 (e.g., where data is organized in a graphical database format). Generally, an embodiment of this invention presents solutions where the computing system functions to utilize multiple database formats when creating knowledge from content, where the multiple database formats includes the graphical database format.

In an example of operation of the utilizing of the multiple database formats when creating knowledge from content the query module 124 interprets a received query request 136 to produce query requirements with regards to trusted content. The interpreting includes one or more of determining a requirement to generate new knowledge, determining content requirements, determining source requirements, determining answer timing requirements, and identifying at least one domain associated with the query request 136. For example, the query module 124 determines the content requirements with regards to creating new knowledge stored by multiple database formats, determines the source requirements to include the trusted content sources 938, determines the answer timing requirements to include a timeframe associated with the collection of content, and identifies a domain of the query request 136 when receiving the query request 136.

Having produced the query requirements, the query module 124 issues at least one of an IEI request 244 and a collections request 132 based on the query request 136. For example, the query module 124 generates the IEI request 244 and sends the IEI request 244 to the IEI module 122 when the source requirements suggest that the IEI module 122 is able to provide an immediate response. As another example, the query module 124 generates the collections request 132 and sends the collections request 132 to the collections module 120 when the source requirements suggest that a future time frame is associated with the query request 136 and more content is required. For instance, the query module 124 issues the collections request 132 to the collections module 120 to facilitate collecting content over the next 10 minutes for the domain associated with the query request 136 and subsequently issues the IEI request 244 to the IEI module 122 to generate the response to the query.

When receiving the IEI request 244, the IEI module 122 formats the IEI request 244 to produce human expressions that include question content and question information. The formatting includes analyzing the IEI request 244 for recognizable human expressions of question content and question information in accordance with rules 316 maintained in the single type database 932 and fact base information 600 maintained in the graphical database 934 (e.g., knowledge pertaining to the domain of the query request 136) obtained from the SS memory 96.

Having produced the human expressions, the IEI module 122 applies "IEI processing" to the human expressions to produce one or more of new knowledge, a preliminary answer, and an answer quality level associated with the preliminary answer. The IEI processing includes identifying permutations of identigens, reducing the permutations in accordance with the rules, mapping the reduced permutations of identigens to entigens to generate knowledge, processing the knowledge in accordance with the fact base 600 (e.g., from the graphical database 934) to produce the preliminary answer where a most favorable graphic representation of the answer is detected, and generating the answer quality level based on the preliminary answer and the request (e.g., the IEI request 244, the query request 136).

When the answer quality level is unfavorable (e.g., ambiguous), the IEI module 122 issues a collections request 132 to the collections module 120 to gather more content to produce knowledge to enable a desired favorable quality level of the answer. The issuing includes generating the collections request 132 based on one or more of the IEI requests 244, the preliminary answer, elements of the fact base information 600 (e.g., the present knowledge base), the rules 316, and the answer quality level.

The collections module 120 interprets one or more collections requests 132 to produce content requirements. The interpreting includes one or more of determining content selection requirements, determining source selection requirements, and determining content acquisition timing requirements. For example, the collections module 120 determines the source selection requirements to include selecting the content sources 16-1 through 16-N of the trusted content sources 938, determines the content selection requirements to include content associated with the domain of the query request 136 (e.g., topics) and determines the content acquisition timing requirements to include a time span for collection if any (e.g., the next 10 minutes).

Having produced the content requirements, the collections module 120 issues a plurality of content requests 126 to a plurality of content sources identified by the content requirements (e.g., to the content sources 16-1 through 16-N). For example, the collections module 120 identifies the plurality of content sources, generates the content requests based on the content requirements (e.g., looking for content associated with the query request 136), and sends the plurality of content requests 126 to the identified plurality of content sources.

Having issued the plurality of content requests 126, the collections module 120 interprets a plurality of content responses 128 to determine whether a response quality level is favorable. The interpreting includes analyzing the plurality of content responses 128 to produce an estimated response quality level and indicating a favorable response quality level when the estimated response quality level compares favorably to a minimum response quality threshold level (e.g., enough content has been accumulated to reliably produce new knowledge that is relevant to the domain). When the response quality level is favorable, the collections module 120 issues a collections response 134 to the IEI module 122, where the collections response 134 includes further content. For example, the collections module 120 generates the collections response 134 to include the further content and the estimated response quality level and sends the collections response 134 to the IEI module 122.

The IEI module 122 analyzes the further content based on one or more of the IEI request 244 and the graphically formatted fact base information 600 utilizing the rules 316 produce one or more of updated fact base information (e.g., new knowledge for storage in the graphical format in the graphical database 934 of the SS memory 96) and a preliminary answer with an associated preliminary answer quality level. For example, the IEI module 122 reasons the further content with the graphically formatted fact base information 600 to produce the preliminary answer which includes identification of a favorable interpretation of a portion of the query request 136.

When the answer quality level is favorable, the IEI module 122 issues an IEI response 246 to the query module 124 where the IEI response 246 includes the preliminary answer associated with a favorable answer quality level. The query module 124 interprets the received answer to produce a quality level of the received answer. For example, the query module 124 analyzes the preliminary answer in accordance with the query requirements and the rules to generate the quality level of the received answer. When the quality level of the received answer is favorable, the query module 124 issues a query response 140 to the user device 12-1, where the query response 140 includes the answer (e.g., the most likely answer based on the graphical database information) associated with the favorable quality level of the answer.

FIG. 16B is a logic diagram of an embodiment of a method for utilizing multiple database formats when creating knowledge from content within a computing system. In particular, a method is presented for use in conjunction with one or more functions and features described in conjunction with FIGS. 1-8L, 16A and also FIG. 16B. The method includes step 940 where a processing module of one or more processing modules of one or more computing devices of the computing system interprets a received query request from a requester to produce query requirements with regards to creating knowledge from trusted content sources. The interpreting includes one or more of determining content requirements, (e.g., to identify trust content sources) determining source requirements, determining answer timing requirements, and identifying a domain associated with the query request.

The method continues at step 942 where the processing module IEI processes human expressions of the received query request based on a fact base generated from previous content and stored in a graphical database format to produce a preliminary answer, where the processing utilizes rules stored in a single type database format. The processing may include formatting portions of the query request in accordance with formatting rules stored in the single type database format to produce recognizable human expressions of content and question information. For example, the processing module produces the question information to include a request to generate new knowledge around a domain.

The processing may further include identifying permutations of identigens within the human expressions, reducing the permutations, mapping the reduced permutations to entigens to produce knowledge, representing the knowledge in a graphical database format, processing the graphical database represented knowledge in accordance with a fact base to produce the preliminary answer, and generating an answer quality level associated with the preliminary answer. For instance, the processing module generates a relatively low answer quality level when the question relates to gathering information over a subsequent time frame such that more content must be gathered to produce an answer associated with a higher and more favorable answer quality level (e.g., start looking for content associated with the domain of the query request over the next 10 minutes).

When the answer quality level is unfavorable, the method continues at step 944 where the processing module generates content requirements and obtains further content from a plurality of trusted content sources based on the query requirements. The generating of the content requirements includes determining, based on one or more of the query requirements, preliminary answer, and the answer quality level, one or more of content selection requirements, source selection requirements, and acquisition timing requirements.

The obtaining the further content from a plurality of trusted content sources is based on the content requirements. For example, the processing module identifies the plurality of trusted content sources, generates content requests based on the content requirements, and sends the plurality of content requests to the plurality of identified trusted content sources. The processing module further analyzes a plurality of content responses to produce an estimated quality level, indicates favorable quality level when the estimated quality level compares favorably to a minimum quality threshold level (e.g., enough content has been collected to produce new knowledge with regards to the domain of the query request), and indicates unfavorable quality level to facilitate collecting more content when the estimated quality level compares unfavorably to the minimum quality threshold level.

The method continues at step 946 where the processing module IEI processes human expressions of the further content based on the fact base to produce additional knowledge, for the producing utilizes the rules stored in the single type database format and produces the additional knowledge in the graphical database format. For example, the processing module analyzes, based on one or more of the query request, the fact base info associated with the identified domain, and the further content to produce updated fact base info (e.g., new knowledge). The analyzing may include reasoning the further content with the fact base to produce the updated fact base info.

The method continues at step 948 where the processing module facilitates storage of the additional knowledge in a graphical database. The storing includes one or more of analyzing the new knowledge in accordance with the query requirements and the rules to generate a quality level, representing the additional knowledge in the graphical database format, and sending the additional knowledge to the graphical database for storage.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 17A is a schematic block diagram of another embodiment of a content ingestion module 300 within a computing system that includes a character transformation module 960 and a repositioning module 962. The character transformation module 960 and the repositioning module 962 may be implemented utilizing the processing module 50-1 of FIG. 2 and/or of FIG. 3. Generally, an embodiment of this invention presents solutions where the content ingestion module 300 processes source content 310 and/or question content 312 (e.g., collectively content) for ingestion based when creating knowledge from the content, where the processing is in accordance with one or more of lists 330 and rules 316 to produce formatted content 314.

In an example of operation of the processing of the content for ingestion, the character transformation module 960 obtains a phrase of words for analysis from the content. For example, the character transformation module 960 receives source content 310 and/or received question content 312 and extracts words from the received content.

Having obtained the phrase of words, for each word, the character transformation module 960 identifies characters of the word that are to be transformed in accordance with the rules 316 (e.g., character deletion rules, character substitution rules, and the lists 330. For example, the character transformation module 960 identifies from listed characters in the lists 330 for deletion in accordance with a deletion rule of the rules 316. As another example, the character transformation module 960 identifies from further listed characters of the lists 330 for replacements in accordance with a replacement rule of the rules 316. As yet another example, the character transformation module 960 identifies listed characters of the lists 330 to be substituted in accordance with a substitution rule of the rules 316.

Having identified the characters of each word that are to be transformed, the character transformation module 960 transforms the identified characters in accordance with the rules 316 utilizing the list 330 to produce transformed characters 966. For example, the character transformation module 960 deletes unnecessary symbols and punctuation when the transformation processing includes deletion of characters. As another example, the character transformation module 960 eliminates unnecessary sentence starters when the transformation processing includes deletion of words (e.g., delete sentence starter "well"). As yet another example, the character transformation module 960 replaces contractions with the expanded contractions when the transformation processing includes word replacements. As a further example, the character transformation module 960 substitutes characters with other characters when the transformation processing includes character substitution (e.g., replaces "-" with ",").

The repositioning module 962 processes the transformed characters 966 in accordance with the rules 316 (e.g., further including word ordering rules) to produce the formatted content 314. The processing includes repositioning words including one or more of moving words and/or characters to another position relative to a received ordering to further enhance downstream knowledge extraction in accordance with the rules 316.

FIG. 17B is a logic diagram of an embodiment of a method for ingesting content when creating knowledge from content within a computing system. In particular, a method is presented for use in conjunction with one or more functions and features described in conjunction with FIGS. 1-8L, 17A, and also FIG. 17B. The method includes step 970 where a processing module of one or more processing modules of one or more computing devices of the computing system obtains a phrase of words for ingestion optimization, where knowledge is to be subsequently extracted from an optimized form of the phrase. The obtaining includes one or more of receiving source content, receiving question content, and extracting words from the received content.

For each word, the method continues at step 972 where the processing module identifies characters of the word that are to be transformed in accordance with character transformation rules. The identifying includes one or more of finding listed characters for deletion in accordance with a deletion rule, finding listed characters for replacement in accordance with a replacement rule, and finding listed characters to be substituted in accordance with a substitution rule.

The method continues at step 974 where the processing module transformed the identified characters in accordance with the character transformation rules to produce transformed characters. For example, the processing module deletes unnecessary symbols and punctuation when deleting characters. As another example, the processing module eliminates unnecessary sentence starters.

The method continues at step 976 where the processing module processes the transformed characters in accordance with repositioning rules to produce formatted content. For example, the processing module repositions words including one or more of moving words and characters to another position relative to a received ordering to further enhance downstream knowledge extraction in accordance with the rules.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIG. 18A is a schematic block diagram of another embodiment of an interpretation module 304 within a computing system that includes the grouping matching module 404 of FIG. 6A and the grouping interpretation module 406 of FIG. 6A. The grouping matching module 404 and the grouping interpretation module 406 may be implemented utilizing the processing module 50-1 of FIG. 2 and/or of FIG. 3. Generally an embodiment of this invention presents solutions where the interpretation module 304 interprets identified element information 340 (e.g., ingested content) in accordance with groupings list 334, question information 346, and interpretation rules 320 to produce interpreted information 344 when knowledge is to be subsequently created from the identified element information 340.

In an example of operation of the interpreting of the content, the grouping matching module 404 receives the identified element info 340 that includes a group of possible interpretations of an ingested phrase, where each interpretation is associated with favorable structure and matched elements of the phrase in accordance with element rules. For each possible interpretation, the grouping matching module 404 determines a statistical likelihood of relevance value based on groupings list 334 and outputs the interpretation with the relevance value as rated interpretations info 980 to the grouping interpretation module 406. For example, the grouping matching module 404 represents the interpretation utilizing a graphical database format, correlates the graphical database format to a previously matched phrase and associated graphical database format to produce a score, and output the score as the statistical likelihood of relevance value.

The grouping interpretation module 406 chooses a selection approach from interpretation rules 320. The choosing may be based on a variety of factors including one or more of by user, based on history, based on previous questions, based on knowledge from other knowledge bases, etc. For each interpretation of the rated interpretations info 980, the grouping interpretation module 406 updates the statistical likelihood of relevance value based on question info 346 utilizing the chosen selection approach to associate an updated statistical likelihood of relevance value with the interpretation.

The grouping interpretation module 406 selects an interpretation of the group of possible interpretations that is associated with a most favorable statistical value (e.g., highest, most likely to be true) and indicates a true meaning of the ingested phrase associated with the identified alternative interpretation as the interpreted information 344. The interpreted information 344 may further include other interpretations of the group of possible interpretations and for each possible interpretation, a corresponding updated statistical value (e.g., ranking).

FIG. 18B is a logic diagram of an embodiment of a method for interpreting content when creating knowledge from content within a computing system. In particular, a method is presented for use in conjunction with one or more functions and features described in conjunction with FIGS. 1-8L, 18A, and also FIG. 18B. The method includes step 990 where a processing module of one or more processing modules of one or more computing devices of the computing system obtains identified element information that includes a group of possible interpretations of a portion of ingested content, where each interpretation is associated with favorable structure and matched elements of the portion of ingested content in accordance with element rules. For example, the processing module receives content and applies identigen entigen intelligence (IEI) processing to the content to produce the identified element information. As another example, the processing module receives the identified element information.

For each possible interpretation, the method continues at step 992 where the processing module determines a statistical likelihood of relevance value to produce rated interpretation information, where the rated interpretation information includes the interpretation and the statistical likelihood of relevance value. For example, the processing module represents the interpretation utilizing a graphical database format, correlates the graphical database format to a previously matched phrase of a knowledge base in a graphical database format to produce a score, and outputs the score as the statistical likelihood of relevance value.

The method continues at step 994 where the processing module chooses a selection approach for subsequent selection of a most relevant interpretation of the group of possible interpretations. For example, the processing module chooses based on one or more of by user, based on history, based on previous questions, based on knowledge from other knowledge bases, etc.

For each interpretation of the rated interpretation information, the method continues at step 996 where the processing module updates the statistical likelihood of relevance value based on the chosen selection approach and question context. For example, the processing module updates the graphical database format of the interpretation based on the question context, correlates the updated graphical database format to a previously matched phrase of the knowledge base in the graphical database format to produce an updated score, and outputs the updated score as an updated statistical likelihood of relevance value.

The method continues at step 998 where the processing module selects an interpretation of the group of possible interpretations that is associated with a most favorable updated statistical likelihood of relevance value to indicating meaning. For example, the processing module identifies and interpretation associated with a highest relevance value and outputs each interpretation and each associated relevance value in an ordered fashion.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:
    verifying authenticity of a blockchain-encoded record representing a statement and an entigen group to produce an authenticity indicator, wherein a set of identigens is determined utilizing a knowledge database for each word of the statement to produce a plurality of sets of identigens, wherein a first set of identigens of the plurality of sets of identigens is produced for a first word of the statement, wherein each identigen of the first set of identigens represents a different meaning of the first word, wherein the plurality of sets of identigens is interpreted utilizing the knowledge database to produce the entigen group, wherein the entigen group represents a validated interpretation of the statement, wherein a first entigen of the entigen group corresponds to a selected identigen of the first set of identigens having a selected meaning of the different meanings of the first word, wherein the selected identigen favorably pairs with at least one corresponding sequentially adjacent identigen of another set of identigens of the plurality of sets of identigens; and
    when the authenticity indicator for the blockchain-encoded record indicates an authentic status:
        interpreting, based on an updated knowledge database, an updated plurality of sets of identigens to produce an updated entigen group, wherein an updated set of identigens is determined for each word of the statement to produce the updated plurality of sets of identigens, wherein an updated first set of identigens of the updated plurality of sets of identigens is produced for the first word of the statement, wherein each updated identigen of the updated first set of identigens represents an updated different meaning of the first word, wherein the updated entigen group represents an updated validated interpretation of the statement, wherein an updated first entigen of the updated entigen group corresponds to an updated selected identigen of the updated first set of identigens having an updated selected meaning of the updated different meanings of the first word, wherein the updated selected identigen favorably pairs with at least one corresponding sequentially adjacent updated identigen of another updated set of identigens of the updated plurality of sets of identigens; and updating the blockchain-encoded record to represent the statement and the updated entigen group to facilitate subsequent utilization of the updated validated interpretation of the statement as the updated entigen group.

2. The method of claim 1 further comprises:
obtaining a query entigen group; and
generating a query response to the query entigen group utilizing the updated entigen group.

3. The method of claim 1 further comprises:
identifying another computing device associated with another knowledge database, wherein the other knowledge database does not include the updated entigen group;
updating, utilizing a security credential of the other computing device, the blockchain-encoded record to represent the statement and the updated entigen group to produce a trusted blockchain-encoded record; and
sending the trusted blockchain-encoded record to the other computing device.

4. The method of claim 1 further comprises:
when the computing device is disassociated with the knowledge database:
updating a local knowledge database to include the statement as the entigen group, wherein the local knowledge database is associated with the computing device.

5. The method of claim 1, wherein the verifying authenticity of the blockchain-encoded record representing the statement and the entigen group to produce the authenticity indicator comprises one of:
when utilizing a symmetric key signature approach:
decrypting a signature of the blockchain-encoded record utilizing a first public key of a first public-private key pair to produce a first decrypted transaction hash value, wherein the first public-private key pair is associated with a last transaction computing device,
hashing a portion of the blockchain-encoded record utilizing a second public key of a second public-private key pair to produce a candidate transaction hash value, wherein the second public-private key pair is associated with the computing device, and
establishing the authenticity indicator to indicate the authentic status when the first decrypted transaction hash value is substantially the same as the candidate transaction hash value; and when not utilizing the symmetric key signature approach:
applying signature verification to the signature of the blockchain-encoded record utilizing the first public key and the second public key to produce the authenticity indicator.

6. The method of claim 1, wherein the updating the blockchain-encoded record to represent the statement and the updated entigen group comprises:
hashing the statement and the updated entigen group utilizing a recipient public key of a recipient computing device to produce a next transaction hash value;
encrypting the next transaction hash value utilizing a private key of the computing device to produce a next transaction signature; and
generating a next blockchain-encoded record to include the statement and the updated entigen group and the next transaction signature.

7. A computing device of a computing system, the computing device comprises:
an interface;
a local memory; and
a processing module operably coupled to the interface and the local memory, wherein the processing module functions to:
verify authenticity of a blockchain-encoded record representing a statement and an entigen group to produce an authenticity indicator, wherein a set of identigens is determined utilizing a knowledge database for each word of the statement to produce a plurality of sets of identigens, wherein a first set of identigens of the plurality of sets of identigens is produced for a first word of the statement, wherein each identigen of the first set of identigens represents a different meaning of the first word, wherein the plurality of sets of identigens is interpreted utilizing the knowledge database to produce the entigen group, wherein the entigen group represents a validated interpretation of the statement, wherein a first entigen of the entigen group corresponds to a selected identigen of the first set of identigens having a selected meaning of the different meanings of the first word, wherein the selected identigen favorably pairs with at least one corresponding sequentially adjacent identigen of another set of identigens of the plurality of sets of identigens; and
when the authenticity indicator for the blockchain-encoded record indicates an authentic status:
interpret, based on an updated knowledge database, an updated plurality of sets of identigens to produce an updated entigen group, wherein an updated set of identigens is determined for each word of the statement to produce the updated plurality of sets of identigens, wherein an updated first set of identigens of the updated plurality of sets of identigens is produced for the first word of the statement, wherein each updated identigen of the updated first set of identigens represents an updated different meaning of the first word, wherein the updated entigen group represents an updated validated interpretation of the statement, wherein an updated first entigen of the updated entigen group corresponds to an updated selected identigen of the updated first set of identigens having an updated selected meaning of the updated different meanings of the first word, wherein the updated selected identigen favorably pairs with at least one corresponding sequentially adjacent updated identigen of another updated set of identigens of the updated plurality of sets of identigens; and update the blockchain-encoded record to represent the statement and the updated entigen group to facilitate subsequent utilization of the updated validated interpretation of the statement as the updated entigen group.

8. The computing device of claim 7, wherein the processing module further functions to:

obtain a query entigen group; and generate a query response to the query entigen group utilizing the updated entigen group.

9. The computing device of claim 7, wherein the processing module further functions to:

identify another computing device associated with another knowledge database, wherein the other knowledge database does not include the updated entigen group;

update, utilizing a security credential of the other computing device, the blockchain-encoded record to represent the statement and the updated entigen group to produce a trusted blockchain-encoded record; and send, via the interface, the trusted blockchain-encoded record to the other computing device.

10. The computing device of claim 7, wherein the processing module further functions to:

when the computing device is disassociated with the knowledge database:

update a local knowledge database to include the statement as the entigen group, wherein the local knowledge database is associated with the computing device.

11. The computing device of claim 7, wherein the processing module functions to verify authenticity of the blockchain-encoded record representing the statement and the entigen group to produce the authenticity indicator by one of:

when utilizing a symmetric key signature approach:

decrypting a signature of the blockchain-encoded record utilizing a first public key of a first public-private key pair to produce a first decrypted transaction hash value, wherein the first public-private key pair is associated with a last transaction computing device, hashing a portion of the blockchain-encoded record utilizing a second public key of a second public-private key pair to produce a candidate transaction hash value, wherein the second public-private key pair is associated with the computing device, and establishing the authenticity indicator to indicate the authentic status when the first decrypted transaction hash value is substantially the same as the candidate transaction hash value; and when not utilizing the symmetric key signature approach:

applying signature verification to the signature of the blockchain-encoded record utilizing the first public key and the second public key to produce the authenticity indicator.

12. The computing device of claim 7, wherein the processing module functions to update the blockchain-encoded record to represent the statement and the updated entigen group by:

hashing the statement and the updated entigen group utilizing a recipient public key of a recipient computing device to produce a next transaction hash value;

encrypting the next transaction hash value utilizing a private key of the computing device to produce a next transaction signature; and generating a next blockchain-encoded record to include the statement and the updated entigen group and the next transaction signature.

13. A non-transitory computer readable memory of a computing device comprises:

a first memory element that stores operational instructions that, when executed by a processing module, causes the processing module to:

verify authenticity of a blockchain-encoded record representing a statement and an entigen group to produce an authenticity indicator, wherein a set of identigens is determined utilizing a knowledge database for each word of the statement to produce a plurality of sets of identigens, wherein a first set of identigens of the plurality of sets of identigens is produced for a first word of the statement, wherein each identigen of the first set of identigens represents a different meaning of the first word, wherein the plurality of sets of identigens is interpreted utilizing the knowledge database to produce the entigen group, wherein the entigen group represents a validated interpretation of the statement, wherein a first entigen of the entigen group corresponds to a selected identigen of the first set of identigens having a selected meaning of the different meanings of the first word, wherein the selected identigen favorably pairs with at least one corresponding sequentially adjacent identigen of another set of identigens of the plurality of sets of identigens; and a second memory element that stores operational instructions that, when executed by the processing module, causes the processing module to:

when the authenticity indicator for the blockchain-encoded record indicates an authentic status:

interpret, based on an updated knowledge database, an updated plurality of sets of identigens to produce an updated entigen group, wherein an updated set of identigens is determined for each word of the statement to produce the updated plurality of sets of identigens, wherein an updated first set of identigens of the updated plurality of sets of identigens is produced for the first word of the statement, wherein each updated identigen of the updated first set of identigens represents an updated different meaning of the first word, wherein the updated entigen group represents an updated validated interpretation of the statement, wherein an updated first entigen of the updated entigen group corresponds to an updated selected identigen of the updated first set of identigens having an updated selected meaning of the updated different meanings of the first word, wherein the updated selected identigen favorably pairs with at least one corresponding sequentially adjacent updated identigen of another updated set of identigens of the updated plurality of sets of identigens; and update the blockchain-encoded record to represent the statement and the updated entigen group to facilitate subsequent utilization of the updated validated interpretation of the statement as the updated entigen group.

14. The computer readable memory of claim 13 further comprises:

a third memory element that stores operational instructions that, when executed by the processing module, causes the processing module to:
  obtain a query entigen group; and
  generate a query response to the query entigen group utilizing the updated entigen group.

15. The computer readable memory of claim 13 further comprises:
a fourth memory element that stores operational instructions that, when executed by the processing module, causes the processing module to:
  identify another computing device associated with another knowledge database, wherein the other knowledge database does not include the updated entigen group;
  update, utilizing a security credential of the other computing device, the blockchain-encoded record to represent the statement and the updated entigen group to produce a trusted blockchain-encoded record; and
  send the trusted blockchain-encoded record to the other computing device.

16. The computer readable memory of claim 13 further comprises:
a fifth memory element that stores operational instructions that, when executed by the processing module, causes the processing module to:
  when the computing device is disassociated with the knowledge database:
    update a local knowledge database to include the statement as the entigen group, wherein the local knowledge database is associated with the computing device.

17. The computer readable memory of claim 13, wherein the processing module functions to execute the operational instructions stored by the first memory element to cause the processing module to verify authenticity of the blockchain-encoded record representing the statement and the entigen group to produce the authenticity indicator by one of:
  when utilizing a symmetric key signature approach:
    decrypting a signature of the blockchain-encoded record utilizing a first public key of a first public-private key pair to produce a first decrypted transaction hash value, wherein the first public-private key pair is associated with a last transaction computing device,
    hashing a portion of the blockchain-encoded record utilizing a second public key of a second public-private key pair to produce a candidate transaction hash value, wherein the second public-private key pair is associated with the computing device, and
    establishing the authenticity indicator to indicate the authentic status when the first decrypted transaction hash value is substantially the same as the candidate transaction hash value; and
  when not utilizing the symmetric key signature approach:
    applying signature verification to the signature of the blockchain-encoded record utilizing the first public key and the second public key to produce the authenticity indicator.

18. The computer readable memory of claim 13, wherein the processing module functions to execute the operational instructions stored by the second memory element to cause the processing module to update the blockchain-encoded record to represent the statement and the updated entigen group by:
  hashing the statement and the updated entigen group utilizing a recipient public key of a recipient computing device to produce a next transaction hash value;
  encrypting the next transaction hash value utilizing a private key of the computing device to produce a next transaction signature; and
  generating a next blockchain-encoded record to include the statement and the updated entigen group and the next transaction signature.

* * * * *